(12) United States Patent
Teach et al.

(10) Patent No.: US 7,448,412 B2
(45) Date of Patent: Nov. 11, 2008

(54) MICROVALVE ASSEMBLIES AND RELATED STRUCTURES AND RELATED METHODS

(75) Inventors: William O. Teach, Frankfort, IL (US);
James C. Laski, Bourbonnais, IL (US);
Paul W. Gibson, Manteno, IL (US);
Donald C. Harris, Crete, IL (US);
Kevin R. Douglas, Lockport, IL (US)

(73) Assignee: AFA Controls LLC, Wilmington, DE (US)

( * ) Notice: Subject to any disclaimer, the term of this patent is extended or adjusted under 35 U.S.C. 154(b) by 251 days.

(21) Appl. No.: 11/188,294

(22) Filed: Jul. 22, 2005

(65) Prior Publication Data
US 2006/0016486 A1 Jan. 26, 2006

Related U.S. Application Data

(60) Provisional application No. 60/590,483, filed on Jul. 23, 2004, provisional application No. 60/590,669, filed on Jul. 23, 2004.

(51) Int. Cl.
*F15C 1/04* (2006.01)
(52) U.S. Cl. .............. 137/831; 137/596.17; 251/129.06
(58) Field of Classification Search ............ 137/596.17, 137/829, 831–832; 251/129.06
See application file for complete search history.

(56) References Cited

U.S. PATENT DOCUMENTS

| 2,851,618 A | 8/1958 | Krawinkel |
| 2,927,255 A | 3/1960 | Diesel |
| 2,942,077 A | 6/1960 | Diesel |
| 3,038,449 A | 6/1962 | Murphy, Jr. et al. |
| 3,772,537 A | 11/1973 | Clifford et al. |
| 3,796,976 A | 3/1974 | Heng et al. |

(Continued)

FOREIGN PATENT DOCUMENTS

CH 677136 4/1991

(Continued)

OTHER PUBLICATIONS

Breng et al. "Electrostatic Micromechanic Actuators" *Micromechanical Microengineering 2*, pp. 256-261, IOP Publishing Ltd., UK, (1992).

(Continued)

*Primary Examiner*—Stephen M Hepperle
*Assistant Examiner*—Craig M Schneider
(74) *Attorney, Agent, or Firm*—Myers Bigel Sibley & Sajovec

(57) ABSTRACT

A valve chip may include a substrate having first and second faces and openings between the first and second faces, and a plurality of flexible valve flaps on one of the faces of the substrate with each flexible valve flap being associated with at least one of the openings. The valve chip may be packaged by forming a frame having an opening therein, and securing the valve chip in the opening of the frame. More particularly, the valve chip may be secured in the opening so that central portions of the first and second faces of the substrate are exposed through the opening in the frame and so that a fluid seal is provided between the frame and edges of the substrate. Related valves, valve assemblies, and methods are also discussed.

129 Claims, 31 Drawing Sheets

U.S. PATENT DOCUMENTS

| | | | |
|---|---|---|---|
| 3,989,357 A | 11/1976 | Kalt | |
| 4,317,611 A | 3/1982 | Petersen | |
| 4,336,536 A | 6/1982 | Kalt et al. | |
| 4,516,091 A | 5/1985 | Sasser | |
| 4,518,011 A | 5/1985 | Stoll | |
| 4,530,317 A | 7/1985 | Schutten | |
| 4,554,519 A | 11/1985 | Adam | |
| 4,581,624 A | 4/1986 | O'Connor | |
| 4,585,209 A * | 4/1986 | Aine et al. | 251/129.02 |
| 4,598,585 A | 7/1986 | Boxenhorn | |
| 4,662,746 A | 5/1987 | Hornbeck | |
| 4,692,727 A | 9/1987 | Wakino et al. | |
| 4,710,732 A | 12/1987 | Hornbeck | |
| 4,736,202 A | 4/1988 | Simpson et al. | |
| 4,747,670 A | 5/1988 | Devio et al. | |
| 4,756,508 A | 7/1988 | Giachino et al. | |
| 4,789,803 A | 12/1988 | Jacobsen et al. | |
| 4,794,370 A | 12/1988 | Simpson et al. | |
| 4,826,131 A | 5/1989 | Mikkor | |
| 4,857,757 A | 8/1989 | Sato et al. | |
| 4,971,106 A | 11/1990 | Tsutsui et al. | |
| 5,016,072 A | 5/1991 | Greiff | |
| 5,043,043 A | 8/1991 | Howe et al. | |
| 5,051,643 A | 9/1991 | Dworsky et al. | |
| 5,061,049 A | 10/1991 | Hornbeck | |
| 5,065,978 A | 11/1991 | Albarda et al. | |
| 5,083,857 A | 1/1992 | Hornbeck | |
| 5,097,354 A | 3/1992 | Goto | |
| 5,164,688 A | 11/1992 | Larson | |
| 5,168,249 A | 12/1992 | Larson | |
| 5,172,262 A | 12/1992 | Hornbeck | |
| 5,179,499 A | 1/1993 | MacDonald et al. | |
| 5,202,785 A | 4/1993 | Nelson | |
| 5,203,208 A | 4/1993 | Bernstein | |
| 5,212,582 A | 5/1993 | Nelson | |
| 5,216,273 A | 6/1993 | Doering et al. | |
| 5,233,459 A | 8/1993 | Bozler et al. | |
| 5,258,591 A | 11/1993 | Buck | |
| 5,260,596 A | 11/1993 | Dunn et al. | |
| 5,268,696 A | 12/1993 | Buck et al. | |
| 5,271,724 A | 12/1993 | Van Lintel | |
| 5,278,368 A | 1/1994 | Kasano et al. | |
| 5,311,360 A | 5/1994 | Bloom et al. | |
| 5,323,999 A | 6/1994 | Bonne et al. | |
| 5,344,454 A * | 9/1994 | Clarke et al. | 623/23.72 |
| 5,349,855 A | 9/1994 | Bernstein et al. | |
| 5,353,656 A | 10/1994 | Hawkey et al. | |
| 5,367,136 A | 11/1994 | Buck | |
| 5,367,584 A | 11/1994 | Ghezzo et al. | |
| 5,392,650 A | 2/1995 | O'Brien et al. | |
| 5,408,355 A | 4/1995 | Rauch et al. | |
| 5,408,877 A | 4/1995 | Greiff et al. | |
| 5,441,597 A | 8/1995 | Bonne et al. | |
| 5,460,202 A * | 10/1995 | Hanley et al. | 137/627.5 |
| 5,479,042 A | 12/1995 | James et al. | |
| 5,488,863 A | 2/1996 | Mochida et al. | |
| 5,492,596 A | 2/1996 | Cho | |
| 5,496,436 A | 3/1996 | Bernstein et al. | |
| 5,507,911 A | 4/1996 | Greiff | |
| 5,515,724 A | 5/1996 | Greiff et al. | |
| 5,530,342 A | 6/1996 | Murphy | |
| 5,535,902 A | 7/1996 | Greiff | |
| 5,536,988 A | 7/1996 | Zhang et al. | |
| 5,543,765 A | 8/1996 | Cachier | |
| 5,544,001 A | 8/1996 | Ichiya et al. | |
| 5,552,925 A | 9/1996 | Worley | |
| 5,578,976 A | 11/1996 | Yao | |
| 5,616,864 A | 4/1997 | Johnson et al. | |
| 5,619,061 A | 4/1997 | Goldsmith et al. | |
| 5,620,933 A | 4/1997 | James et al. | |
| 5,627,396 A | 5/1997 | James et al. | |
| 5,629,565 A | 5/1997 | Schlaak et al. | |
| 5,629,790 A | 5/1997 | Neukermans et al. | |
| 5,635,638 A | 6/1997 | Geen | |
| 5,635,639 A | 6/1997 | Greiff et al. | |
| 5,635,640 A | 6/1997 | Geen | |
| 5,635,739 A | 6/1997 | Grieff et al. | |
| 5,638,946 A | 6/1997 | Zavracky | |
| 5,640,133 A | 6/1997 | MacDonald et al. | |
| 5,644,177 A | 7/1997 | Guckel et al. | |
| 5,650,568 A | 7/1997 | Greiff et al. | |
| 5,652,374 A | 7/1997 | Chia et al. | |
| 5,656,778 A | 8/1997 | Roszhart | |
| 5,661,592 A | 8/1997 | Bornstein et al. | |
| 5,666,258 A | 9/1997 | Gevatter et al. | |
| 5,673,139 A | 9/1997 | Johnson | |
| 5,673,785 A | 10/1997 | Schlaak et al. | |
| 5,677,823 A | 10/1997 | Smith | |
| 5,696,662 A | 12/1997 | Bauhahn | |
| 5,723,894 A | 3/1998 | Ueno et al. | |
| 5,759,870 A | 6/1998 | Yun et al. | |
| 5,785,295 A | 7/1998 | Tsai | |
| 5,818,683 A | 10/1998 | Fujii | |
| 5,862,003 A | 1/1999 | Saif et al. | |
| 5,897,097 A | 4/1999 | Biegelsen et al. | |
| 5,914,553 A | 6/1999 | Adams et al. | |
| 5,921,280 A | 7/1999 | Ericksen et al. | |
| 5,975,485 A | 11/1999 | Tsai et al. | |
| 6,003,833 A | 12/1999 | Tasi et al. | |
| 6,032,689 A | 3/2000 | Tsai et al. | |
| 6,032,923 A | 3/2000 | Biegelsen et al. | |
| 6,036,597 A | 3/2000 | Arner | |
| 6,057,814 A | 5/2000 | Kalt | |
| 6,067,183 A | 5/2000 | Furlani et al. | |
| 6,089,534 A | 7/2000 | Biegelsen et al. | |
| 6,098,661 A | 8/2000 | Yim et al. | |
| 6,116,517 A | 9/2000 | Heinzl et al. | |
| 6,116,863 A | 9/2000 | Ahn et al. | |
| 6,120,002 A | 9/2000 | Biegelsen et al. | |
| 6,126,140 A | 10/2000 | Johnson et al. | |
| 6,127,908 A | 10/2000 | Bozler et al. | |
| 6,142,444 A | 11/2000 | Kluge | |
| 6,168,395 B1 | 1/2001 | Quenzer et al. | |
| 6,179,586 B1 | 1/2001 | Herb et al. | |
| 6,223,088 B1 | 4/2001 | Scharnberg et al. | |
| 6,227,824 B1 | 5/2001 | Stehr | |
| 6,229,683 B1 | 5/2001 | Goodwin-Johansson | |
| 6,229,684 B1 | 5/2001 | Cowen et al. | |
| 6,236,491 B1 | 5/2001 | Goodwin-Johansson | |
| 6,397,880 B1 | 6/2002 | Stoll et al. | |
| 6,499,509 B2 * | 12/2002 | Berger et al. | 137/625.65 |
| 6,581,638 B2 * | 6/2003 | Frisch et al. | 137/596.17 |
| 6,590,267 B1 | 7/2003 | Goodwin-Johansson | |
| 6,621,141 B1 | 9/2003 | Van Schuylenbergh et al. | |
| 6,633,078 B2 | 10/2003 | Hamaguchi et al. | |
| 6,663,078 B1 | 12/2003 | Stoll et al. | |
| 6,684,469 B2 | 2/2004 | Horning et al. | |
| 6,730,072 B2 * | 5/2004 | Shawgo et al. | 604/890.1 |
| 6,986,500 B2 * | 1/2006 | Giousouf et al. | 251/129.01 |
| 7,014,165 B2 * | 3/2006 | Ji et al. | 251/65 |
| 2001/0039968 A1 | 11/2001 | Dettmann | |
| 2003/0106420 A1 | 6/2003 | Yoshino | |
| 2004/0022681 A1 | 2/2004 | Hantschel et al. | |
| 2004/0124384 A1 | 7/2004 | Biegelsen et al. | |
| 2004/0144939 A1 | 7/2004 | Giousouf et al. | |
| 2006/0016481 A1 | 1/2006 | Douglas et al. | |

FOREIGN PATENT DOCUMENTS

| | | |
|---|---|---|
| DE | 3006231 | 8/1981 |
| DE | 4235593 | 10/1993 |
| DE | 44 17 251 | 11/1995 |
| DE | 195 22 806 | 1/1997 |
| EP | 0 435 237 | 7/1994 |

| EP | 0400482 | 11/1994 |
| EP | 478956 | 5/1995 |
| EP | 834759 | 4/1998 |
| EP | 665590 | 9/1999 |
| EP | 0 485 739 | 9/2000 |
| EP | 0 829 649 | 10/2002 |
| FR | 2642812 | 2/1989 |
| GB | 2 334 000 | 8/1999 |
| WO | WO 02/22492 A2 | 3/2002 |

OTHER PUBLICATIONS

Burkert Contromatic Corporation "Technical Principles of Valves" brochure (no date).

Buser et al "Very High Q-factor Resonators in Monocrystalline Silicon" *Sensors and Actuators* pp. 323-327 (1990).

Elwenspoek et al. "Active Joints for Microrobot Limbs" *J. Micromechanical Microengineering 2*, pp. 221-223, IOP Publishing Ltd., UK. (1992).

Elwenspoek et al. "Static and Dynamic Properties of Active Joints" *The 8.sup.th Annual Conference on Solid-State Sensors and Actuators, and Eurosensors* (Jun. 1995) pp. 412-415.

Gunawan et al. "Micromachined Corner Cube Reflectors as a Communication Link" *Sensors and Actuators* (1995) pp. 580-583.

Haji-Babaei et al. "Integrable Active Microvalve with Surface Micromachined Curled-Up Actuator" *IEEE International Conference on Solid-State Sensors and Actuators* (Jun. 1997) pp. 833-836.

Jaecklin et al "Mechanical and Optical Properties of Surface Micromachined Torsional Mirrors in Silicon, Polysilicon and Aluminum" *The 7th International Conference on Solid-State Sensors and Actuators* (No date) pp. 958-961.

Jaecklin et al. "Optical Microshutters and Torsional Micromirrors for Light Modulator Arrays", *IEEE*. (1993).

Klaassen et al. "Silicon Fusion Bonding and Deep Reactive Ion Etching; A New Technology for Microstructures" *The 8.sup.th International Conference on Solid State Sensors and Actuators, and Eurosensors* (Jun. 1995) pp. 556-559.

Kohl, et al. "Development of Stress-Optimised Shape Memory Microvalves" *Sensors and Accuators* 72(3): 243-250 (1999).

Legtenberg et al. "Electrostatic Curved Electrode Actuators" *IEEE Micro Electro Mechanical Systems* (Jan.-Feb. 1995) pp. 37-42.

Ptersen "Silicon Torsional scanning Mirror" *IBM J. Res. Develop.*, vol. 24, No. 5. (Sep. 1980).

Schiele et al. "Surface-Micromachined Electrostatic Microrelay" *sensors ans Actuators A 66*, Elsevier Science S.A. (1998).

PCT Search Report and Written Opinion of the International Searching Authority for PCT/US2005/026030.

International Search Report and Written Opinion of the International Searching Authority for International Patent Application No. PCT/US2005/026029 mailed on Jan. 27, 2006.

Wu "Inductive Links with Integrated Receiving Coils for MEMS and Implantable Applications" Dissertation, University of Notre Dame, Sep. 2003.

Koeneman et al. "Feasibility of Micro Power Supplies for MEMS" *Journal of Microelectromechanical Systems* 6(4): 355-362 (1997).

Lisec et al. "A Bistable Pneumatic Microswitch for Driving Fluidic Components" 8th *International Conference on Solid-State Sensors ans Actuators, and Eurosensors IX* pp. 309-312 (1995).

* cited by examiner

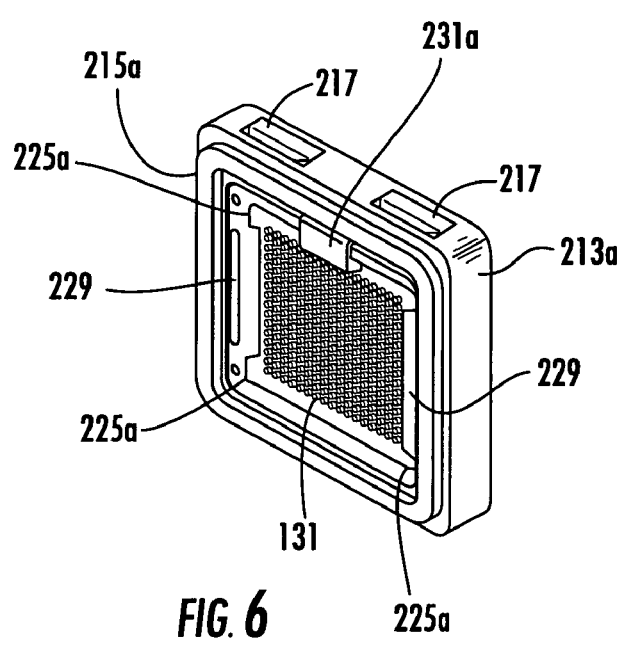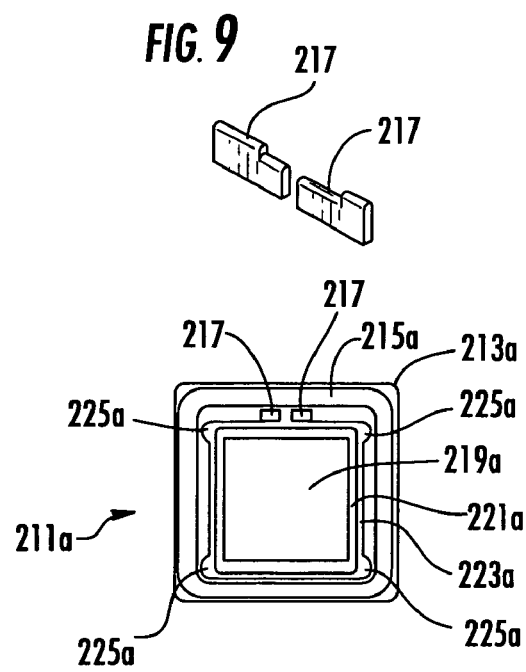

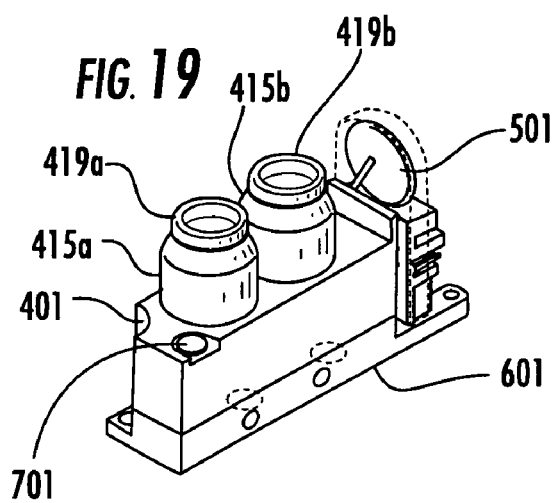
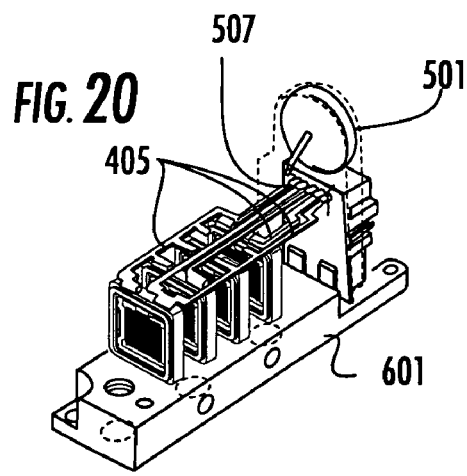
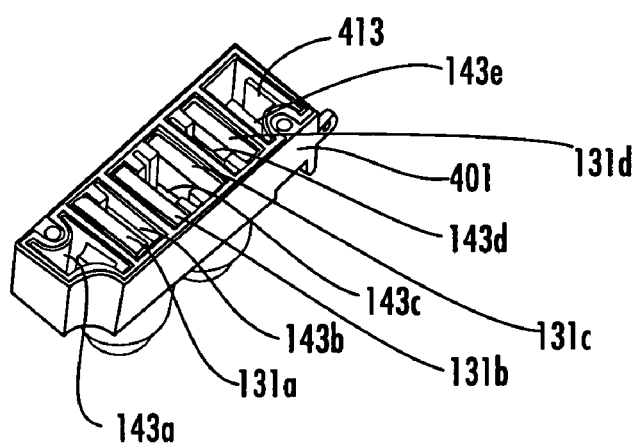
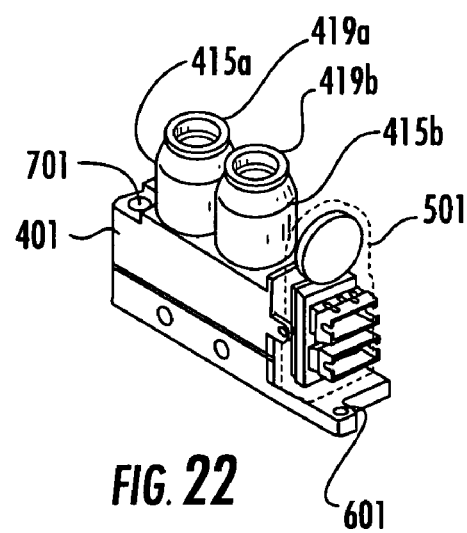

| LOGIC RELATIONSHIP BETWEEN INPUTS AND OUTPUTS | | | | | | | | | | | |
|---|---|---|---|---|---|---|---|---|---|---|---|
| CONFIGURATION DECRIPTION | CONFIGURATION SELECTION | | | INPUT SIGNALS | | HIGH VOLTAGE OUTPUTS (F) | | | | LED OUTPUT | |
| | C1 | C2 | C3 | A | B | 1 | 2 | 3 | 4 | A | B |
| 5 WAY 3 POS - CYL PORTS EXHAUSTED | 0 | 0 | X | 0 | 0 | 0 | 1 | 1 | 0 | 1 | 1 |
| | 0 | 0 | X | 0 | 1 | 0 | 1 | 0 | 1 | 0 | 1 |
| | 0 | 0 | X | 1 | 0 | 1 | 0 | 1 | 0 | 1 | 0 |
| | 0 | 0 | X | 1 | 1 | 0 | 1 | 1 | 0 | 1 | 1 |
| ON POWER LOSS - GO TO 00 STATE | 0 | 0 | 0 | X | X | 0 | 1 | 1 | 0 | 0 | 0 |
| ON POWER LOSS - HOLD STATE | 0 | 0 | 1 | X | X | HOLD POSITION | | | | 0 | 0 |
| 5 WAY 3 POS - ALL PORTS BLOCKED | 0 | 1 | X | 0 | 0 | 1 | 1 | 1 | 1 | 1 | 1 |
| | 0 | 1 | X | 0 | 1 | 0 | 1 | 0 | 1 | 0 | 1 |
| | 0 | 1 | X | 1 | 0 | 1 | 0 | 1 | 0 | 1 | 0 |
| | 0 | 1 | X | 1 | 1 | 1 | 1 | 1 | 1 | 1 | 1 |
| ON POWER LOSS - GO TO 00 STATE | 0 | 1 | 0 | X | X | 1 | 1 | 1 | 1 | 0 | 0 |
| ON POWER LOSS - HOLD STATE | 0 | 1 | 1 | X | X | HOLD POSITION | | | | 0 | 0 |
| 5 WAY 3 POS - CYL PORTS ENEGIZED | 1 | 0 | X | 0 | 0 | 1 | 0 | 0 | 1 | 1 | 1 |
| | 1 | 0 | X | 0 | 1 | 0 | 1 | 0 | 1 | 0 | 1 |
| | 1 | 0 | X | 1 | 0 | 1 | 0 | 1 | 0 | 1 | 0 |
| | 1 | 0 | X | 1 | 1 | 1 | 0 | 0 | 1 | 1 | 1 |
| ON POWER LOSS - GO TO 00 STATE | 1 | 0 | 0 | X | X | 1 | 0 | 0 | 1 | 0 | 0 |
| ON POWER LOSS - HOLD STATE | 1 | 0 | 1 | X | X | HOLD POSITION | | | | 0 | 0 |
| 5 WAY 2 POSITION | 1 | 1 | X | X | 0 | 0 | 1 | 0 | 1 | 1 | 1 |
| | 1 | 1 | X | X | 1 | 1 | 0 | 1 | 0 | 0 | 1 |
| ON POWER LOSS - GO TO 0 STATE | 1 | 1 | 0 | X | X | 0 | 1 | 0 | 1 | 0 | 0 |
| ON POWER LOSS - HOLD STATE | 1 | 1 | 1 | X | X | HOLD POSITION | | | | 0 | 0 |

FIG. 43

| SEQUENCE TO TRAVERSE FROM ONE STATE TO ANOTHER |||
|---|---|---|
| FROM | TO | TRANSITION SEQUENCE |
| 0101 | 1010 | 1101,1001,1011,1010 |
| 1010 | 0101 | 1011,1001,1101,0101 |
| 0101 | 1111 | 1101,1111 |
| 1111 | 0101 | 1101,0101 |
| 0101 | 0110 | 0111,0110 |
| 0110 | 0101 | 0111,0101 |
| 0101 | 1001 | 1101,1001 |
| 1001 | 0101 | 1101,0101 |
| 1010 | 1111 | 1011,1111 |
| 1111 | 1010 | 1011,1010 |
| 1010 | 0110 | 1011,1111,0111,0110 |
| 0110 | 1010 | 1110,1010 |
| 1010 | 1001 | 1110,1001 |
| 1001 | 1010 | 1011,1010 |
| POLARITY REVERSAL | | TRANSITION SEQUENCE |
| | 0101 | 1101,1001,1011,1$\bar{0}$1$\bar{0}$,1011,1001,1101,0101 |
| | 1010 | 1011,1001,1101,$\bar{0}$1$\bar{0}$1,1101,1001,1011,1010 |
| | 1111 | 1101,$\bar{0}$1$\bar{0}$1,1101,1001,1011,1$\bar{0}$1$\bar{0}$,1011,1111 |
| | 0110 | 0111,$\bar{0}$1$\bar{0}$1,1101,1001,1011,1$\bar{0}$1$\bar{0}$,1011,1111,0111,0110 |
| | 1001 | 1101,$\bar{0}$1$\bar{0}$1,1101,1001,1011,1$\bar{0}$1$\bar{0}$,1011,1001 |

FIG. 44

| PIN DEFINITIONS | |
|---|---|
| PINS | DESCRIPTION |
| VDD | NOMINAL 24V POWER SUPPLY SIGNAL/PIN. |
| GND | GROUND / POWER SUPPLY RETURN SIGNAL/PIN. |
| VBAT | POSITIVE BATTERY SUPPLY SIGNAL/PIN. FOR EXAMPLE, A 3V LITHIUM BATTERY MAY BE USED TO MAINTAIN CHARGE ON THE FOUR OUTPUT PINS WHEN VDD FAILS. |
| GBAT | NEGATIVE BATTERY RETURN SIGNAL/PIN. MAY BE BENEFICIAL FOR COMPLETELY SWITCHING OUT BATTERY FOR NORMAL OPERATION SO THAT NO DRAIN OCCURS WHEN VDD IS ACTIVE. |
| C1,C2,C3 | CONFIGURATION SELECT SIGNAL/PINS. THE PINS MAY BE JUMPERED OR HARDWIRED AT TIME OF ASSEMBLY TO GND (FOR A "0") OR LEFT FLOATING (FOR A "1"). WITH THREE CONFIGURATION SELECTION SIGNAL/PINS, ONE OF 8 DEVICE CONFIGURATIONS MAY BE SELECTED TO PROVIDE FUNCTIONALITY OF A PARTICULAR MECHANICAL DEVICE. THE DIFFERENT CONFIGURATIONS MAY PROVIDE DIFFERENT OPERATIONS DURING POWER LOSS AND/OR WHEN INPUT CONTROL SIGNALS A AND B ARE EQUAL. THE POWER SUPPLY SIGNAL VDD MAY BE USED TO PULL ANY FLOATING CONFIGURATIONS SELECT SIGNALS UP DURING NORMAL OPERATIONS, THE CONFIGURATION SELECT SIGNALS MAY BE LATCHED DURING LOSS OF THE POWER SUPPLY SIGNAL VDD SO THAT LIMITED BATTERY POWER IS NOT CONSUMED PULLING UP CONFIGURATIONS SELECT SIGNALS DURING POWER LOW. |
| A,B | INPUT CONTROL SIGNAL/PINS. A CURSORY INSPECTION OF THE TABLE 1 REVEALS THAT OUTPUTS F1 AND F3 ESSENTIALLY REFLECT INPUT A, LIKEWISE FOR F2 AND F4 WITH RESPECT TO INPUT B. THESE TWO INPUTS REQUIRE CIRCUITRY TO PREVENT SWITCHING DUE TO SPURIOUS ARTIFACTS ($t_{sup}$) |
| F1, F2, F3, F4 | HIGH VOLTAGE OUTPUT SIGNALS/PINS. EACH HV OUTPUT SIGNAL MAY DRIVE A FULLY ACTUATED CAPACITANCE OF APPROXIMATELY 2nF. FOR A SWITCHING SPEED OF 100μs (microseconds), A PEAK CURRENT OF APPROXIMATELY 4 ma (2nf * 200V/100μs) MAY BE REQUIRED. A MAXIMUM LEAKAGE FOR EACH OF THE VALVE CHIPS MAY BE APPROXIMATELY 10 pA WITH A 200 VOLT ELECTRICAL POTENTIAL APPLIED THERETO. |
| HCom0, HComE | HIGH VOLTAGE COMMON ODD AND EVEN SIGNALS/PINS. VOLTAGES OF HV OUTPUT SIGNALS/PINS F1 AND F3 ARE APPLIED WITH RESPECT TO THE HCom0 COMMON SIGNAL/PIN. VOLTAGES OF HV OUTPUT SIGNALS/PINS F2 AND F4 ARE APPLIED WITH RESPECT TO THE HComE SIGNAL/PIN. BECAUSE THE VALVE CHIPS ARE ELECTROSTATICALLY ACTUATED, ACTUATION IS ACHIEVED BY PROVIDING A DIFFERENCE IN VOLTAGE POTENTIAL, BUT THE POLARITY OF THE DIFFERENCE DOES NOT MATTER. THIS TRAIT MAY BE USED TO REDUCE CHARGE BUILD-UP. BY PERIODICALLY REVERSING THE DIRECTION/POLARITY OF THE VOLTAGE DIFFERENCE BETWEEN THE HIGH VOLTAGE OUTPUTS AND THE COMMON SIGNALS/PINS, EFFECTS DUE TO CHARGE BUILD UP MAY BE REDUCED. PROVIDING TWO DIFFERENT COMMON SIGNALS/PINS MAY SIMPLIFY A SEQUENCING OPERATION USED TO REVERSE POLARITY. |

FIG. 45A

| | |
|---|---|
| HVDD | HIGH VOLTAGE SUPPLY SIGNAL/PIN. THE HV SUPPLY SIGNAL/PIN MAY PROVIDE THE HIGH VOLTAGE POTENTIAL THAT IS SWITCHED TO THE HV OUTPUT SIGNALS/PINS F1-F4. A RELATIVELY LARGE, HIGH VOLTAGE, EXTERNAL STORAGE CAPACITOR MAY BE COUPLED TO THE ASIC 2001 ON THIS SIGNAL/PIN FOR THE REGULATION AND ENERGY STORAGE. COMBINATIONS OF ON-CHIP AND/OR EXTERNAL CIRCUITRY MAY BE PROVIDED TO LOCALLY GENERATE THIS THE HIGH VOLTAGE SUPPLY SIGNAL FROM VDD AND/OR VBat. |
| LXH | INDUCTOR SWITCH HIGH SIGNAL/PIN. A SIMPLE YET EFFECTIVE METHOD OF GENERATING. THE HIGH VOLTAGE SUPPLY SIGNAL HVDD MAY BE GENERATED FROM A LOW VOLTAGE SUPPLY BY SWITCHING CURRENT THROUGH AN INDUCTOR AT A CONTROLLED DUTY CYCLE. THE LXH SIGNAL/PIN MAY PROVIDE APPROPRIATE SWITCHING CHARACTERISTICS GENERATE AN APPROXIMATELY 200 V HVDD SIGNAL USING AN APPROXIMATELY 24 V VDD SIGNAL. |
| LXL | INDUCTOR SWITCH LOW SIGNAL/PIN. A SEPARATE CIRCUIT MAY BE USED TO GENERATE THE HIGH VOLTAGE SUPPLY SIGNAL HVDD FROM A 3V BATTERY, AND THE LXL SIGNAL/PIN MAY PROVIDE APPROPRIATE SWITCHING CHARACTERISTICS. THE HIGH VOLTAGE GENERATION CIRCUIT 2013 MAY BOOST THE V BATTERY SIGNAL VBAT TO 24V WHICH IS FED BACK TO THE VDD SIGNAL/PIN, AND THE HIGH VOLTAGE GENERATION CIRCUIT CAN THEN CONVERT THE 24 V SIGNAL TO THE 200 V HVDD SIGNAL AS DISCUSSED ABOVE WITH REGARD TO THE LDH SIGNAL/PIN. |
| HVA | HIGH VOLTAGE ADJUST SIGNAL/PIN. A RESISTOR HVAR COUPLED TO THE HVA SIGNAL/PIN MAY SET A VOLTAGE LEVEL AT WHICH THE HIGH VOLTAGE GENERATION CIRCUIT 2013 CEASES BOOSTING. A VOLTAGE OF THE HV SUPPLY SIGNAL/PIN HVDD MAY THUS BE ADJUSTED, FOR EXAMPLE, IN THE RANGE OF APPROXIMATELY 50 VOLTS TO APPROXIMATELY 200 VOLTS. MOREOVER, A POWER DOWN MODE MAY BE PROVIDED FOR BATTERY MODE OPERATING DURING LOSS OF THE EXTERNAL POWER SUPPLY. |
| LED-A, LED-B, | LIGHT EMITTING DIODE SIGNALS/PINS. THE LIGHT EMITTING DIODE (LED) DRIVER CIRCUIT 2027 MAY GENERATE THE LED SIGNALS IN ACCORDANCE WITH LOGICAL OPERATIONS SHOWN IN TABLE 1. SHORT CIRCUIT PROTECTION MAY ALSO BE PROVIDED, AND THE LEDS MAY BE INACTIVE DURING LOSS OF PRIMARY EXTERNAL POWER. BOTH LED SIGNALS/PINS MAY BE CAPABLE OF SOURCING UP TO 30MA AT 2.2VDC. |

FIG. 45B

| SELECTED DESIGN PARAMETERS |||
|---|---|---|
| PARAMETER | SPEC | NOTES |
| VDD | 24V +/- 10% | MAIN POWER SUPPLY SIGNAL. AT LEVELS BELOW THE SPECIFIED MINIMUM, POWER LOSS MAY BE DETECTED AND HV OUTPUTS SIGNALS F1-F4 MAY BE SWITCHED TO A POWER LOSS STATE |
| IDD | 200MA | VDD CURRENT MAXIMUM. A RELATIVELY ARBITRARY LIMIT MAY BE USED TO INDICATE A NON-CRITICAL NATURE OF OVERALL POWER CONSUMPTION. WITH A LOWER WORST CASE CURRENT, LOWER THE OPERATING TEMPERATURE MAY BE PROVIDED, BETTER NOISE MARGINS MAY BE PROVIDED, HIGHER THE RELIABILITY MAY BE PROVIDED, ETC |
| $I_{bat}$ | 1 TO 10μa TARGET | AVERAGE CURRENT FROM BATTERY DURING POWER LOSS MODES. UNDER NORMAL POWERED CONDITIONS, THERE MAY BE INSIGNIFICANT CURRENT DRAWN FROM THE BATTERY. IF THE AVERAGE BATTERY CURRENT EXCEEDS A TARGET VALUE, A LARGER BATTERY MAY NEED TO BE USED. |
| $V_{il}$ | -3 to +5 V | INPUT LOW VOLTAGE FOR C1, C2, C3, A AND B. BOARD LEVEL COMPONENTS MAY BE USED TO PROVIDE THAT THIS SPECIFICATION IS MET SO THAT THE INPUT DIODES TO SUBSTRATE ARE NOT FORWARD BIASED. |
| $V_{ih}$ | 10 V to 30 V | INPUT HIGH VOLTAGE FOR A AND B. BOARD LEVEL COMPONENTS MAY BE USED TO PROVIDE THAT THIS SPECIFICATION IS MET SO THAT THE INPUT DIODES TO VDD ARE NOT FORWARD BIASED. |
| $t_{rev}$ | 1 second to 1 hour | POLARITY REVERSAL TIME. A MAXIMUM LENGTH OF ELAPSED TIME TO WAIT IN AN OUTPUT STATE BEFORE A POLARITY REVERSAL OPERATION IS PERFORMED WHILE MAINTAINING THE SAME OUTPUT STATE MAY BE DETERMINED. THE POLARITY REVERSAL TIME MAY BE ON THE ORDER OF SECONDS OR POSSIBLY MINUTES |
| $t_{del}$ | 1 ms to 1 second | TRANSITION DELAY TIME. A MINIMUM LENGTH OF ELAPSED TIME TO WAIT BEFORE SWITCHING TO A PARTICULAR OUTPUT STATE DURING OUTPUT STATE TRANSITIONS. THE TRANSITION DELAY TIME MAY BE ON THE ORDER OF MILLISECONDS. |
| $t_{max}$ | 250Hz | MAXIMUM CYCLE FREQUENCY OF INPUTS. THE MAXIMUM CYCLE FREQUENCY MAY BE USED TO SET AN AVERAGE POWER TO BE GENERATED BY THE HIGH VOLTAGE GENERATION CIRCUIT DURING NORMAL OPERATION. |
| $t_{sw}$ | 100μs | MAXIMUM SWITCH TIME. A TIME TO CHARGE AND DISCHARGE HIGH VOLTAGE OUTPUT SIGNALS F1-F4. THIS PARAMETER MAY ALSO DETERMINE A CURRENT CAPABILITY OF A FINAL STAGE |

*FIG. 46A*

| $T_{SUP}$ | 1 μs | MINIMUM TIME PRIMARY INPUTS MAY BE HELD CONSTANT BEFORE TRANSITION IS DETECTED. THIS PARAMETER MAY BE USED BY THE DEGLITCH/DEBOUNCE LOGIC CIRCUIT 2017 TO REDUCE GLITCHES FROM INPUT SIGNALS A AND B SO THAT FALSE SWITCHING OF THE HV OUTPUT SIGNALS F1-F4 MAY BE REDUCED |
|---|---|---|
| $T_{OP}$ | 0-70°C | AMBIENT OPERATING TEMPERATURE |

FIG. 46B

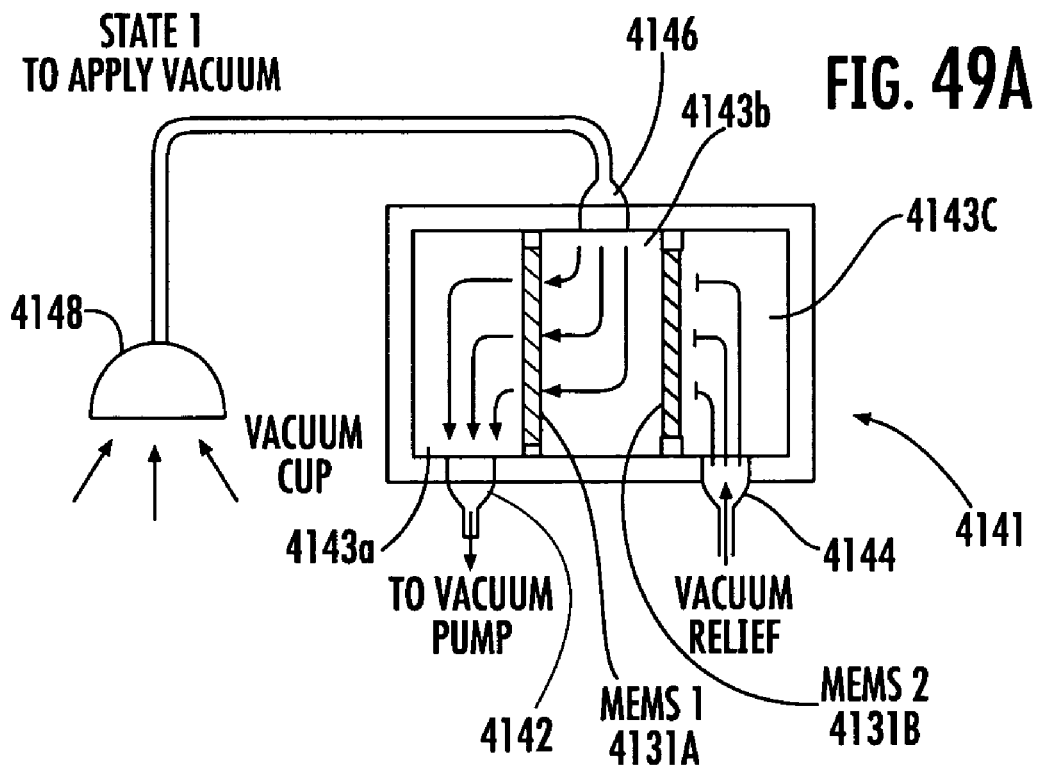
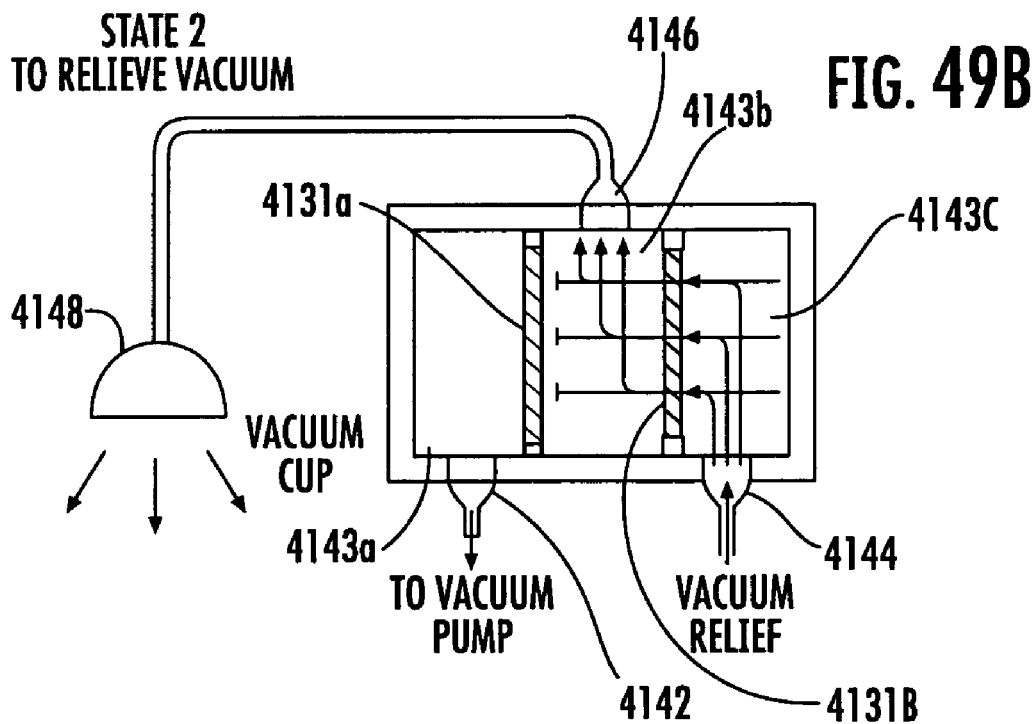

US 7,448,412 B2

MICROVALVE ASSEMBLIES AND RELATED STRUCTURES AND RELATED METHODS

RELATED APPLICATIONS

This application claims the benefit of and priority to U.S. Provisional Application No. 60/590,483 filed Jul. 23, 2004, and to U.S. Provisional Application No. 60/590,669 filed Jul. 23, 2004. The disclosures of both of the above referenced provisional applications are hereby incorporated herein in their entirety by reference. This application is also related to U.S. Utility Application Ser. No. 11/188,139 filed concurrently herewith and entitled "Methods Of Operating Microvalve Assemblies And Related Structures and Devices", the disclosure of which is hereby incorporated herein in its entirety by reference.

FIELD OF THE INVENTION

The present invention relates to the field of valves, and more particularly to microvalves and microvalve assemblies and related methods.

BACKGROUND

A conventional solenoid driven pneumatic valve may be used to control a fluid flow. When electrically energized or de-energized, a solenoid driven pneumatic valve may cut off and/or permit one or more fluid flows. An actuator of a solenoid driven pneumatic valve is an electromagnet. When the valve is energized, a magnetic field builds up to pull and/or push a plunger against the action of a spring. When de-energized, the plunger returns to its original position by action of the spring. Solenoid driven pneumatic valves are discussed, by way of example, in the reference "Technical Principles Of Valves" (omega.com, One Omega Drive, Stamford, Conn., 06907, J-3 to J-7), the disclosure of which is hereby incorporated herein in its entirety by reference.

A flow of air (or other fluid) through a valve may be a function of a number of controlled port connections and a number of switching positions. Directional valve functionalities may be described by referring to them as a combination of "ways" and "positions", such as, for example, a 4-way 2-position valve also referred to as a 4/2-way valve. The term "way" defines a number of controlled flow paths the valve has (indicated by arrows in ISO symbology). With respect to the term "position", a pneumatic directional valve may have two or three switching positions (indicated by squares in ISO symbology).

In a conventional 5-way, 2-position solenoid driven pneumatic valve (a 5/2 valve), fluid flows may be controlled between first and second actuator ports, first and second exhaust ports, and an air supply port. When the solenoid is energized, the 5/2 valve may provide fluid coupling between the air supply port and the first actuator port, and between the second actuator port and the second exhaust port. When the solenoid is de-energized, the 5/2 valve may provide fluid coupling between the air supply port and the second actuator port, and between the first actuator port and the first exhaust port. A 5/2 valve may thus be used to control operation of a pneumatic actuator coupled to the actuator ports.

A solenoid driven pneumatic valve, however, may be subject to mechanical wear that may reduce a useful life thereof. In addition, functionalities provided by a solenoid driven pneumatic valve may be limited. Moreover, a solenoid driven pneumatic valve may be unable to maintain an energized position in the event of a loss of power.

SUMMARY

According to some embodiments of the present invention, a valve assembly may include a main housing defining five chambers, four valves, and a controller. A first chamber may be coupled to a low pressure exhaust port, a second chamber may be coupled to a first actuator port, a third chamber may be coupled to a high pressure supply port, a fourth chamber may be coupled to a second actuator port, and a fifth chamber may be coupled to a low pressure exhaust port. Moreover, a first valve may be between the first and second chambers wherein the first valve allows or substantially blocks fluid communication between the first chamber and the second chamber responsive to a first electrical signal; a second valve may be between the second and third chambers wherein the second valve allows or substantially blocks fluid communication between the second chamber and the third chamber responsive to a second electrical signal; a third valve may be between the third and fourth chambers wherein the third valve allows or substantially blocks fluid communication between the third chamber to the fourth chamber responsive to a third electrical signal; and a fourth valve may be between the fourth and fifth chambers wherein the fourth valve allows or substantially blocks fluid communication between the fourth chamber and the fifth chamber responsive to a fourth electrical signal.

Moreover, the controller may be configured to generate the first, second, third, and fourth electrical signals for the respective valve assemblies, and the controller may be configured to advance the valves through a sequence of conditions. In a first condition, the second and fourth valves may be opened and the first and third valves may be closed so that fluid communication is allowed between the second and third chambers and between the fourth and fifth chambers and so that fluid communication is substantially blocked between the first and second chambers and between the third and fourth chambers. In a second condition after the first condition, the second valve may be opened and the first, third, and fourth valves may be closed so that fluid communication is allowed between the second and third chambers and so that fluid communication is substantially blocked between the first and second chambers, between the third and fourth chambers, and between the fourth and fifth chambers. In a third condition after the second condition, the second and third valves may be opened and the first and fourth valves may be closed so that fluid communication is allowed between the second and third chambers and between the third and fourth chambers and so that fluid communication is substantially blocked between the first and second chambers and between the fourth and fifth chambers. In a fourth condition after the third condition, the third valve may be opened and the first, second, and fourth valves may be closed so that fluid communication is allowed between the third and fourth chambers and so that fluid communication is substantially blocked between the first and second chambers, between the second and third chambers, and between the fourth and fifth chambers. In a fifth condition after the fourth condition, the first and third valves may be opened and the second and fourth valves may be closed, so that fluid communication is allowed between the first and second chambers and between the third and fourth chambers and so that fluid communication is substantially blocked between the second and third chambers and between the fourth and fifth chambers.

According to additional embodiments of the present invention, a valve assembly may include a housing having a first chamber coupled to a low pressure exhaust port, a second chamber coupled to a first actuator port, a third chamber coupled to a high pressure supply port, a fourth chamber coupled to a second actuator port, and a fifth chamber coupled to a low pressure exhaust port. The valve assembly may also include a first valve between the first and second chambers, a second valve between the second and third chambers, a third valve between the third and fourth chambers, and a fourth valve between the fourth and fifth chambers.

The second and fourth valves may be opened and the first and third valves may be closed to provide a first condition so that fluid communication is allowed from the third chamber to the second chamber and from the fourth chamber to the fifth chamber and so that fluid communication is substantially blocked between the first and second chambers and between the third and fourth chambers. After the first condition, the second valve may be opened and the first, third, and fourth valves may be closed to provide a second condition so that fluid communication is allowed from the third chamber to the second chamber and so that fluid communication is substantially blocked between the first and second chambers, between the third and fourth chambers, and between the fourth and fifth chambers. After the second condition, the second and third valves may be opened and the first and fourth valves may be closed to provide a third condition so that fluid communication is allowed from the third chamber to the second chamber and from the third chamber to the fourth chamber and so that fluid communication is substantially blocked between the first and second chambers and between the fourth and fifth chambers.

After the third condition, the third valve may be opened and the first, second, and fourth valves may be closed to provide a fourth condition so that fluid communication is allowed from the third chamber to the fourth chamber and so that fluid communication is substantially blocked between the first and second chambers, between the second and third chambers, and between the fourth and fifth chambers. After the fourth condition, the first and third valves may be opened and the second and fourth valves may be closed to provide a fifth condition so that fluid communication is allowed from the second chamber to the first chamber and from the third chamber to the fourth chamber and so that fluid communication is substantially blocked between the second and third chambers and between the fourth and fifth chambers.

According to yet additional embodiments of the present invention, a valve may include a substrate having first and second opposing faces, a plurality of holes through the substrate between the first and second faces, and a pair of input pads thereon. A plurality of flexible valve flaps may be provided on the substrate with each flexible valve flap being associated with at least one respective hole in the substrate, and the flexible valve flaps may be configured to open or substantially block respective holes responsive to an electrical signal applied to the pair of input pads. In addition, a frame may surround and support the substrate at edges thereof so that central portions of the first and second faces of the substrate are exposed through an opening in the frame and so that a fluid seal is provided between the frame and edges of the substrate.

According to more embodiments of the present invention, a valve chip may include a substrate having first and second faces and openings between the first and second faces, and a plurality of flexible valve flaps on one of the faces of the substrate with each flexible valve flap being associated with at least one of the openings. A frame may be formed having an opening therein, and the valve chip may be secured in the opening of the frame. More particularly, central portions of the first and second faces of the substrate may be exposed through the opening in the frame and a fluid seal may be provided between the frame and edges of the substrate.

According to still more embodiments of the present invention, a valve assembly may include a main housing defining first, second, and third chambers, and defining a first valve enclosure between the first and second chambers and a second valve enclosure between the second and third chambers. First, second, third, and fourth electrical housing leads may be provided in the main housing with portions of each of the first and second electrical housing leads being exposed in the first valve enclosure and with portions of the third and fourth electrical housing leads being exposed in the second valve enclosure.

A first valve in the first valve enclosure may be electrically coupled with the first and second electrical housing leads wherein the first valve is configured to allow or substantially block fluid communication between the first and second chambers responsive to electrical signals provided on the first and second electrical housing leads. A second valve in the second valve enclosure may be electrically coupled with the third and fourth electrical housing leads wherein the second valve is configured to allow or substantially block fluid communication between the second and third chambers responsive to electrical signals provided on the third and fourth electrical housing leads. Moreover, a controller may be electrically coupled to the first, second, third, and fourth electrical housing leads, and the controller may be configured to generate the electrical signals to allow or substantially block fluid communication between the first and second chambers and between the second and third chambers.

BRIEF DESCRIPTION OF THE DRAWINGS

FIG. 5 is a front view of a packaging frame for a valve chip according to some embodiments of the present invention.

FIG. 6 is a plan view of a packaged valve chip according to some embodiments of the present invention.

FIG. 9 is a plan view of electrical leads for a packaging frame according to some embodiments of the present invention.

FIG. 19 is a front perspective view of a valve assembly according to some embodiments of the present invention with encapsulation of the electronics sub-assembly shown transparent.

FIG. 20 is a perspective view of the valve assembly of FIG. 19 according to some embodiments of the present invention with non-metallic portions of the main housing excluded to show an orientation of leads of the main housing relative to valve chip assemblies.

FIG. 21 is a bottom perspective view of the main housing of FIG. 19 with packaged valve chip assemblies inserted in enclosures thereof.

FIG. 22 is a back perspective view of the valve assembly of FIG. 19 assembly according to some embodiments of the present invention with encapsulation of the electronics sub-assembly shown transparent.

FIG. 43 is a table illustrating logic relationships between inputs and outputs of custom circuits according to some embodiments of the present invention.

FIG. 44 is a table illustrating sequences for state transitions and polarity reversals according to some embodiments of the present invention.

FIGS. 45A and 45B are tables illustrating pin definitions for custom circuits according to some embodiments of the present invention.

FIGS. 46A and 46B are tables illustrating design parameters for custom circuits according to some embodiments of the present invention.

FIGS. 49A and 49B are schematic diagrams illustrating a valve assembly for vacuum applications according to some embodiments of the present invention.

DETAILED DESCRIPTION

Figure 1:
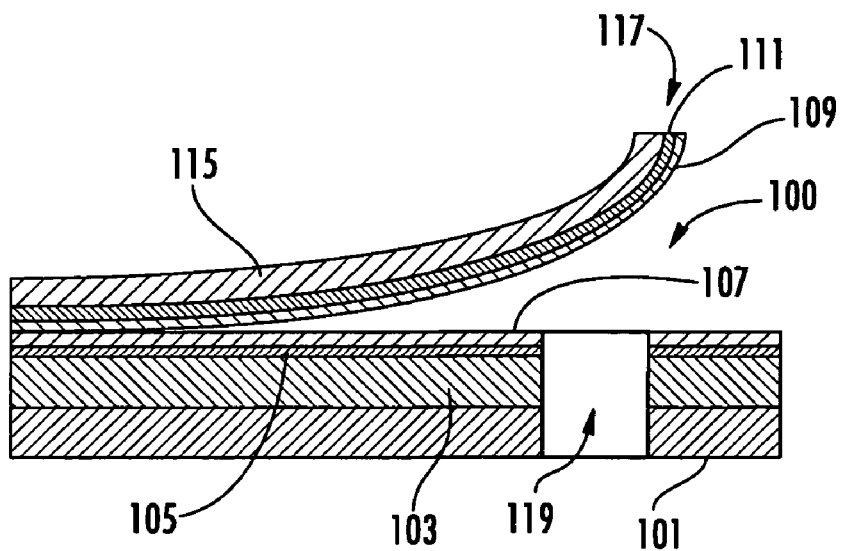
FIG. 1 is a cross-sectional view of an electro-statically actuated valve according to some embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In the drawings, thickness and/or widths of layers, regions, and/or lines are exaggerated for clarity. It will also be understood that when an element such as a layer, region or substrate is referred to as being on another element, it can be directly on the other element or intervening elements may also be present. In contrast, if an element such as a layer, region or substrate is referred to as being directly on another element, then no other intervening elements are present. Similarly, an element is referred to as being "connected to" or "coupled to" another element, it can be directly connected to or coupled to the other element or intervening elements may also be present. In contrast, when an element is referred to as being directly connected to or directly coupled to another element, then no other intervening elements are present. As used herein, the term and/or includes any and all combinations of one or more of the associated listed items.

Furthermore, relative terms, such as beneath, over, under, upper, and/or lower may be used herein to describe one element's relationship to another element as illustrated in the figures. It will be understood that relative terms are intended to encompass different orientations of the device in addition to the orientation depicted in the figures. For example, if the device in one of the figures is turned over, elements described as below other elements would then be oriented above the other elements. The exemplary term below, can therefore, encompasses both an orientation of above and below.

It will be understood that although the terms first, second, third, etc. are used herein to describe various regions, layers, sections and/or steps, these regions, layers, sections and/or steps should not be limited by these terms. These terms are only used to distinguish one region, layer, section, or step from another region, layer, section, or step. Thus, a first region, layer, section, or step discussed below could be termed a second region, layer, section, or step, and similarly, a second region, layer, section, or step could be termed a first region, layer, section, or step without departing from the teachings of the present invention. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In a pneumatic actuator, two actuator chambers are separated by a piston, and pressure differentials in the actuator chambers are used to move the piston. A rod can be used to transfer movement of the piston to a device being actuated outside the actuator. Valve assemblies according to some embodiments of the present invention can be used to control air flow into and out of one or both actuator chambers of a pneumatic actuator.

Valve assemblies according to some embodiments of the present invention may include a plurality of arrays of valves with each array of valves provided on a separate substrate. Each valve may include a valve orifice(s) through a substrate and an electro-statically actuated flexible valve flap used to gate the valve orifice(s). More particularly, each flexible valve flap may be anchored to the substrate at a first end and free at all other edges. In addition, the free end of each flexible valve flap may curl away from the substrate so that each flexible valve flap is normally open in the absence of an applied electro-static force. Valve flaps may be provided on a top surface of the substrate, and flow through an open valve orifice(s) may be from a high pressure on the bottom surface of the substrate to a low pressure on the top surface of the substrate.

The structure of an individual valve according to some embodiments of the present invention is illustrated in FIG. 1. As shown in FIG. 1, the valve 100 may include a substrate 101 (such as a silicon substrate), a fixed electrode 105 provided between first and second insulating layers 103 and 107 on a top surface of the substrate 101, and a flexible electrode 111 provided between third and fourth insulating layers 109 and 115. The fixed and flexible electrodes 105 and 111, for example, may each include a layer of a metal such as Ti, Cr, Au, Al, Cu, W, Pt, and/or other flexible conductive material such as a conductive polymer (e.g., polyanniline) and/or conductive oxide film (e.g., ITO). When using certain conductive metal films (e.g., Au, Ag, Al, Cu, and/or Pt), a thin adhesion layer (e.g., Ti and/or Cr) may be provided on upper and/or lower surfaces of the conductive metal film to provide proper adhesion to the insulating layers of the flexible flap. One or more of the insulating layers 103, 107, 109, and 115 may be layers of a polymer material, such as a polyimide or other photosensitive polymer. In alternative embodiments, one of the second insulating layer 107 or the third insulating layer 109 may be omitted, and/or the first insulating layer 103 may be omitted. In addition or in an alternative, insulating layer 107 and/or insulating layer 109 may include a ceramic dielectric such as silicon oxide ($SiO_2$).

The third and fourth insulating layers 109 and 115 and the flexible electrode 111 define a flexible valve flap 117 adjacent a respective valve-orifice(s) 119 through the substrate 101. The valve hole may be formed by wet chemical etching and/or by deep reactive ion etching through the substrate. The flexible valve flap 117 may be configured to curl away from the top surface of the substrate to a normally open position in the absence of an attractive electro-static force between the fixed and flexible electrodes 105 and 111 to allow fluid passage from a bottom surface of the substrate 101 through the valve-orifice(s) 119 and past the flexible valve flap 117 on the top surface of the substrate 101. The valve 100 may be closed by creating an attractive electro-static force between the fixed and flexible electrodes 105 and 111 so that the flexible valve flap 117 blocks the valve orifice(s) 119. More particularly, the valve flap 117 can be made to curl to the normally open position away from the top of the substrate 101 by fabricating the insulating layers 109 and 115 to have predetermined stresses therein. Microelectromechanical electrostatic valve devices are discussed, for example, in U.S. Pat. No. 6,590,267 to Scott H. Goodwin-Johansson et al., entitled "Microelectromechanical Flexible Membrane Electrostatic Valve Devices And Related Fabrication Methods," the disclosure of which is hereby incorporated herein in its entirety by reference. Electro-statically actuated valves may be provided according to embodiments of the present invention using valve flaps as discussed above with respect to FIG. 1 or using other moveable valve members such as micromachined diaphragms.

Figure 2:
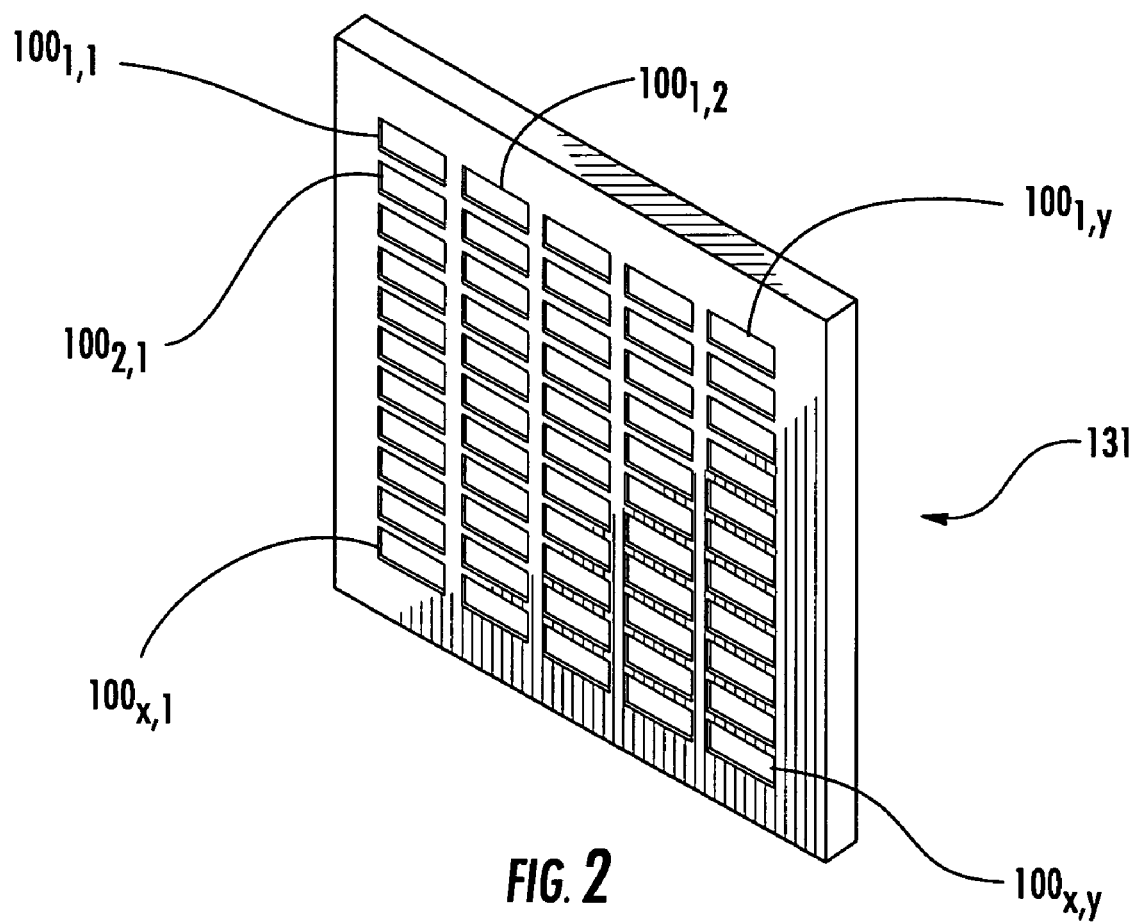
FIG. 2 is a plan view of a valve chip including an array of electro-statically actuated valves according to some embodiments of the present invention.

An array of valves $100_{1-x,1-y}$ may be provided on the top surface of a single substrate to provide the valve chip 131 shown in FIG. 2. As shown in FIG. 2, a plurality of valves $100_{1-x,1-y}$ may be arranged in rows and columns on the chip 131, with each valve $100_{1-x,1-y}$ including a respective valve orifice(s) 119 (or hole(s)) and flexible valve flap 117 (as shown in FIG. 1). Moreover, the fixed electrodes 105 of each valve $100_{1-x,1-y}$ on the valve chip 131 may be electrically connected to each other, and the flexible electrodes 111 of each valve $100_{1-x,1-y}$ on the chip 131 may be electrically connected to each other so that a voltage potential can be provided between the fixed and flexible electrodes to create an electro-static attraction there between. While a plurality of valves (with each valve including one valve flap and one orifice) are illustrated in FIG. 2, other arrangements may be provided for valve chips according to embodiments of the present invention. For example, a valve chip according to some embodiments of the present invention may include a single valve with a single valve flap and a single orifice. In an alternative, a valve chip may include one or more valves with at least one valve including a single valve flap used to open and close a plurality of orifices.

Accordingly, the array of valves $100_{1-x,1-y}$ can be opened and closed in unison. More particularly, a closing electrical potential can be applied between the fixed electrodes 105 of the array and the flexible electrodes 111 of the array to create an attractive electro-static force so that all of the flexible valve flaps 117 close all of the valve orifices 119 on the valve chip 131. Similarly, an opening electrical potential can be applied between the fixed electrodes 105 of the array and the flexible electrodes 111 to remove the attractive electro-static force so that all of the flexible valve flaps 117 open all of the valve orifices 119 on the chip 131. By providing the array of commonly actuated valves $100_{1-x,1-y}$ on the chip 131, the valve chip 131 can regulate a greater flow of fluid than would otherwise be possible with a single valve. Valve chips of different flow sizes (Cv) may thus be provided with flow sizes of up to 1.0 Cv. Flow sizes, for example, in the range of approximately 0.001 Cv to approximately 10 Cv may be provided. (As used herein, the flow coefficient Cv is based on the imperial units system and is defined as the flow of water through a valve at 60° F. in US gallon/minute at a pressure drop of 1 lb/in$^2$.) Flow sizes may be determined, for example, by a number of valves, a size of valve orifices, etc. A larger valve chip may thus provide a greater flow size. In an alternative, valves on a same chip could be individually addressed and operated separately.

Figure 3:
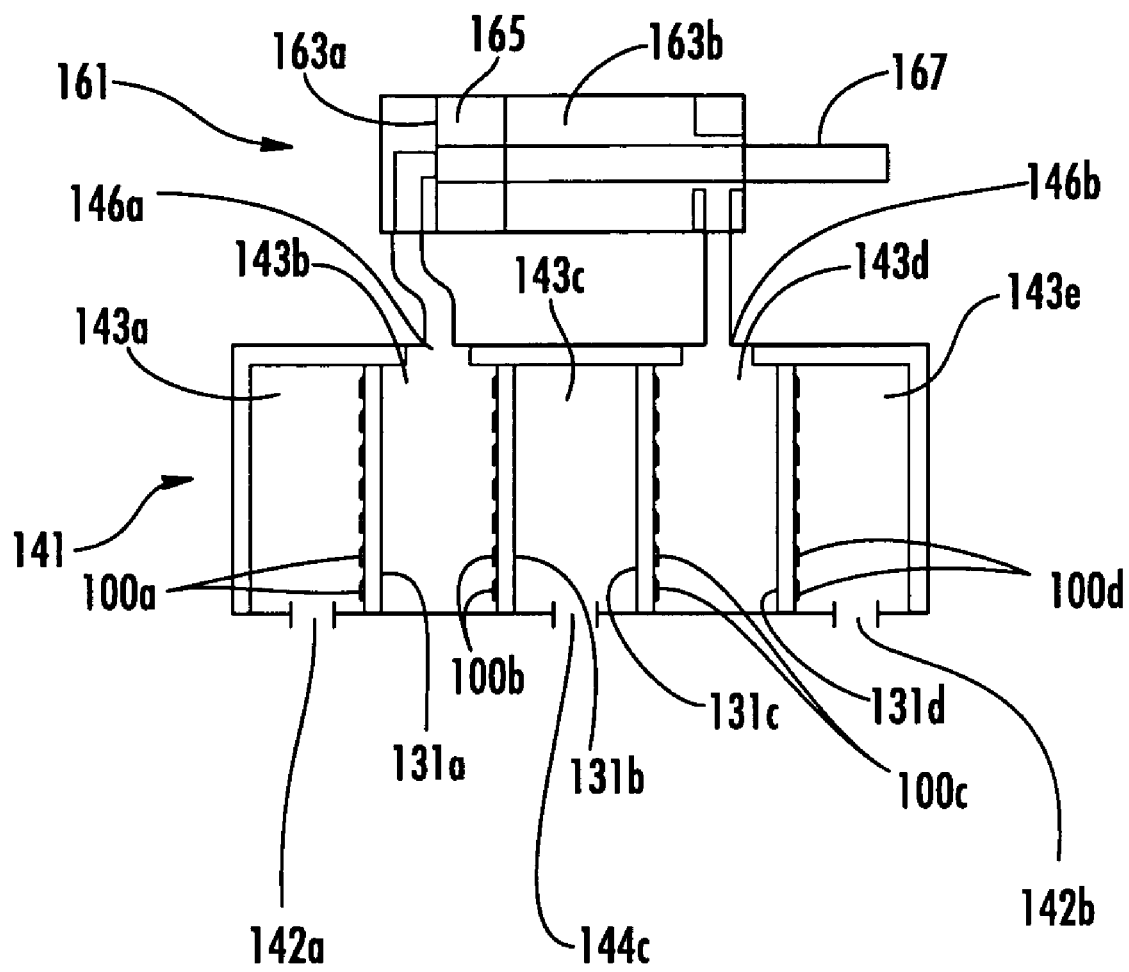
FIG. 3 is a schematic diagram of a valve assembly according to some embodiments of the present invention, depicted here controlling a pneumatic actuator.

A schematic diagram of valve assemblies 141 according to some embodiments of the present invention is illustrated in FIG. 3. As shown in FIG. 3, four valve chips 131*a-d* separate five chambers 143*a-e* of the valve assembly 141. More particularly, valve chip 131*a* separates chambers 143*a* and 143*b*; valve chip 131*b* separates chambers 143*b* and 143*c*; valve chip 131*c* separates chambers 143*c* and 143*d*; and valve chip 131*d* separates chambers 143*d* and 143*e*. The chambers 143*a* and 143*e* are coupled to respective low pressure exhaust ports 142*a* and 142*b*; the chambers 143*b* and 143*d* are coupled through ports 146*a* and 146*b* to respective chambers 163*a* and 163*b* (separated by moveable piston 165) of the pneumatic actuator 161; and the chamber 143*c* is coupled to a high pressure supply port 144*c*. Accordingly, the valve chip 131*a* is configured to allow or block fluid flow from chamber 143*b* to chamber 143*a*. The valve chip 131*b* is configured to allow or block fluid flow from chamber 143*c* to chamber 143*b*. The valve chip 131*c* is configured to allow or block fluid flow from chamber 143*c* to chamber 143*d*. The valve chip 131*d* is configured to allow or block fluid flow from chamber 143*d* to chamber 143*e*.

According to some embodiments of the present invention, the valve assembly 141 and the pneumatic actuator 161 (also referred to as a cylinder) may be produced separately and then coupled together. A customer may thus separately purchase valve assemblies and pneumatic actuators from the same or different vendors. According to other embodiments of the present invention, the valve assembly may be embedded (or integrated) in the pneumatic actuator so that the two are produced and/or sold as one unit.

Sequential conditions of operation of the valve assembly 141 of FIG. 3 are discussed in greater detail below with respect to FIGS. 4A-F according to some embodiments of the present invention. In one possible startup condition illustrated in FIG. 4A, valve flaps of all valves 100*a-d* on the valve chips 131*a-d* are closed in a first condition at startup. The valves are maintained closed by applying attractive electrostatic forces to the valve flaps of the valves. In this startup condition, there is gauge pressure in the supply chamber 143*c* only, and there is no gauge pressure in any of the other chambers 143*a-b* and 143*d-e*. During operations after startup, gauge pressure will be present in the supply chamber 143*c* and at least one of chambers 143*b* or 143*d*. The piston 165 and rod 167 are shown in the retracted position at startup by way of example.

Figure 4A:
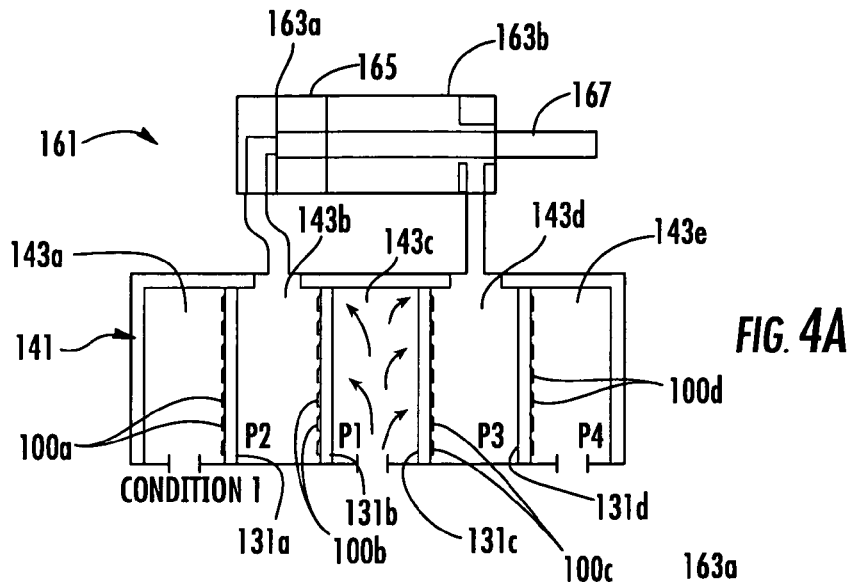
FIGS. 4A-F are schematic diagrams illustrating sequences of operations of valve assemblies according to some embodiments of the present invention.
Figure 4B:
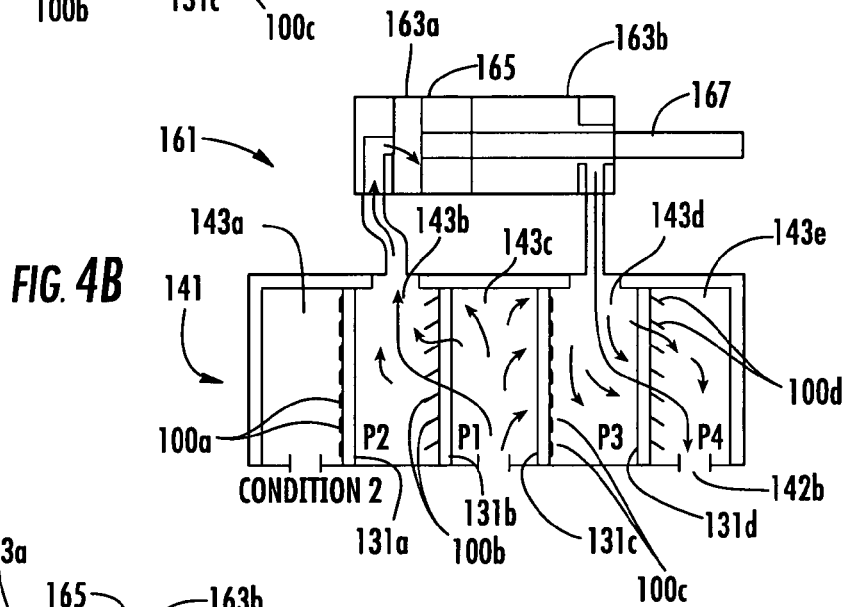

In a second condition of FIG. 4B, valve flaps of valves 100*b* and 100*d* on valve chips 131*b* and 131*d* are opened while valve flaps on valves 100*a* and 100*c* of valve chips 131*a* and 131*c* are closed. Because of the pressure differentials from chamber 143*c* to 143*b* and from chamber 143*d* to 143*e*, valve flaps of valves 100*a* and 100*c* can be opened by reducing/eliminating attractive electrostatic forces applied thereto so that the valve flaps curl to the normally open position. Accordingly, the pressure of chambers 143*b* and 163*a* rises, the piston 165 and rod 167 extend, and chambers 163*b* and 143*d* are exhausted through chamber 143*e* and exhaust port 142*b*.

Figure 4C:
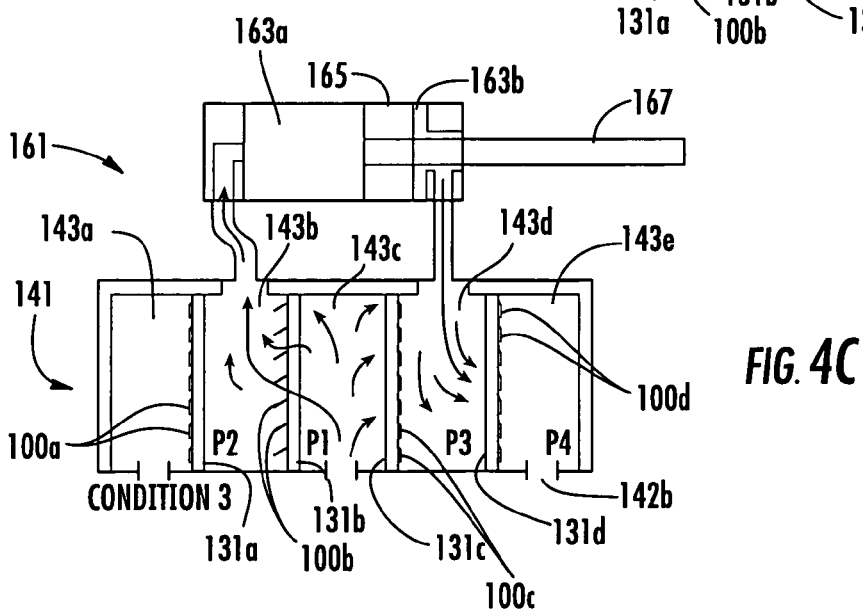
Figure 4D:
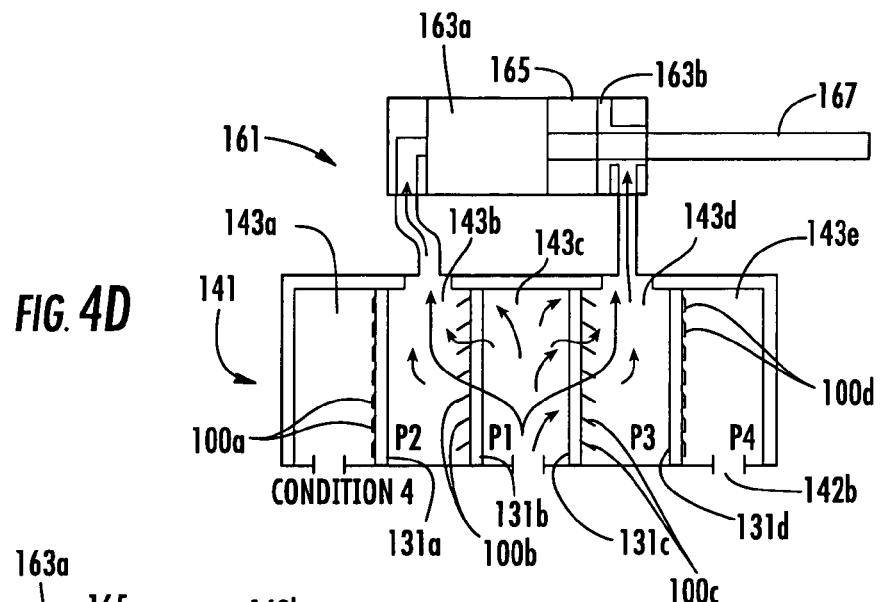

In a third condition of FIG. 4C, a sufficient equilibrium between the pressures of chambers 143*d* and 143*e* may be achieved so that the valve flaps of valves 100*d* of valve chip 131*d* can be closed, and an attractive electrostatic force on the valve flaps is used to close the valves 100*d* of valve chip 131*d*. In a fourth condition of FIG. 4D, valve flaps of valves 100*c* can be opened because chamber 143*d* was previously exhausted in the condition of FIG. 4C. An electrostatic force used to close valve flaps of valves 100*c* is removed so that valves 100*c* are opened as valve flaps thereof curl to the normally open position as shown in FIG. 4D while the valves 100*b* are maintained open. By opening valves 100*c* before the piston 165 is fully extended, an increasing pressure in chambers 143*d* and 163*b* may slow the piston motion.

Figure 4E:
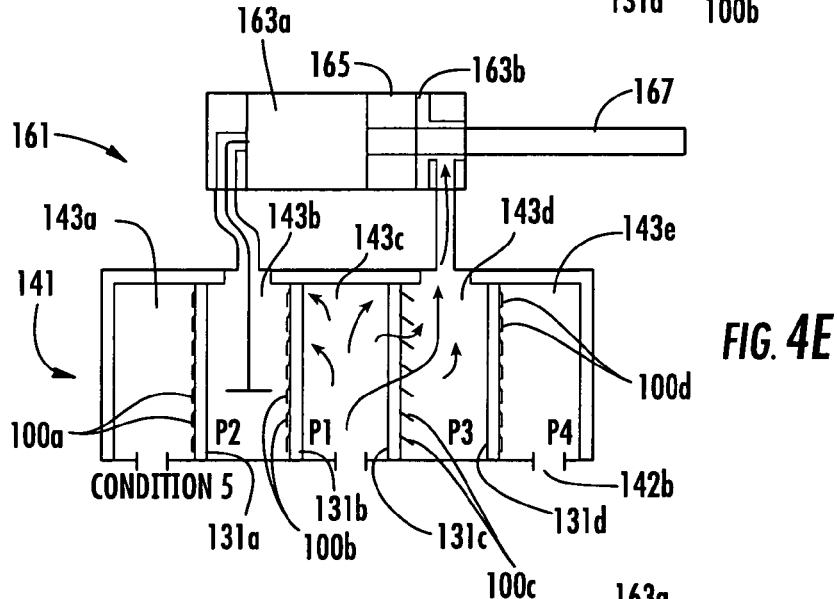

In a fifth condition of FIG. 4E, an equilibrium can be achieved between chambers 143*b* and 143*c* and the valve flaps of valves 100*b* on valve chip 131*b* can be closed by applying an attractive electrostatic force. Moreover, a pressure of chamber 143*b* can be increased relative to that of chamber 143*a*.

Figure 4F:
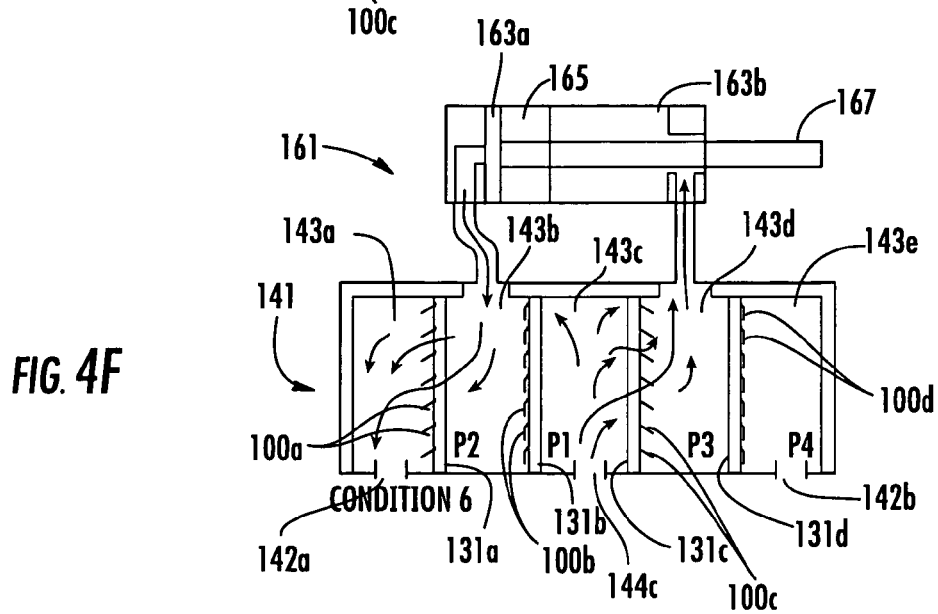

In a sixth condition of FIG. 4F after increasing a pressure of chamber 143*b* relative to that of chamber 143*a*, the valve flaps of valves 100*a* on valve chip 131*a* can be opened by removing an electrostatic force used to close the valve flaps of valves 100*a* so that the valve flaps curl to the normally open position. Accordingly, the pneumatic actuator chamber 163*a* is coupled to low pressure exhaust port 142*a* through chambers 143*a* and 143*b*, and the pneumatic actuator chamber 163*b* is coupled to high pressure supply port 144*c* through chambers 143*c* and 143*d*. In the condition of FIG. 4F, the piston 165 and rod 167 retract. Once pressures in chambers 143*c* and 143*d* equalize and pressures in chambers 143*a* and 143*b* equalize, the valves 100*a* and 100*c* of valve chips 131*a* and 131*c* can be closed by applying attractive electrostatic forces to the valve flaps thereof and operations of FIGS. 4A-4F can be repeated to extend and retract the piston 165 and rod 167.

According to some embodiments of the present invention, the valve chips 131*a-d* of the valve assembly 141 may sequence through the conditions of FIG. 4B to FIG. 4C to FIG. 4D to FIG. 4E to FIG. 4F to move the piston 165 and rod 167 from an extended position to a retracted position. The valve chips 131*a-d* of the valve assembly 141 may sequence through the conditions of FIG. 4F to FIG. 4E to FIG. 4D to FIG. 4C to FIG. 4B to move the piston 165 and rod 167 from a retracted position to an extended position.

Sequencing operations discussed above with respect to FIGS. 4A-F may thus be used to extend and retract the piston 165. It will be understood, however, that not every command to extend the piston will result in extension or complete extension of the piston, and that not every command to retract the piston will result in retraction or complete retraction of the piston. For example, a next command may be received/initiated before a previous extension/retraction has been completed. More particularly, a next command may be received/initiated before a previous extension/retraction has been completed, for example, if a fault condition is detected, if a safety sensor is tripped, and/or if a power outage is detected.

In an alternative, the valve chips of the valve assembly may sequence from the condition of FIG. 4F to the condition of FIG. 4D with valve chips 131a and 131d closed and with the valve chips 131b and 131c opened. In another alternative, the valve chips of the valve assembly sequence from the condition of FIG. 4F to a condition with the valve chips 131b and 131c closed and the valve chips 131a and 131d opened.

Sequencing techniques discussed above with respect to FIGS. 4A-F may increase a maximum pressure against which the valve assembly can operate to extend and retract the actuator. Any inherent operational restrictions to opening the valves in an array can be reduced because a higher pressure is present on the bottom surfaces of the valve chips. Restrictions may occur when closing a valve with a force from air pressure approximating an electro-static closing force of the valve. The valves may thus be selectively opened and closed to allow reduction of pressure differentials between adjacent chambers. By reducing pressure differentials between adjacent chambers, a condition can be created whereby valve flaps of a valve chip can be closed against a significantly lower pressure differential than was originally present. A relatively small delay of time (for example, on the order of about 100 microseconds) may be sufficient to reduce the pressure differential when closing valve flaps of a valve chip in a state where a relatively high pressure differential may have otherwise been present.

Microelectromechanical valves are discussed, for example, in: U.S. Pat. No. 6,590,267 to Scott H. Goodwin-Johansson et al., entitled "Microelectromechanical Flexible Membrane Electrostatic Valve Devices And Related Fabrication Methods"; U.S. Pat. No. 6,236,491 to Scott H. Goodwin-Johansson et al., Entitled "Micromachined Electrostatic Actuator With Air Gap"; and/or International Publication No. WO 02/22492. The disclosures of each of these patents and publications is hereby incorporated herein in its entirety by reference.

Figure 7:
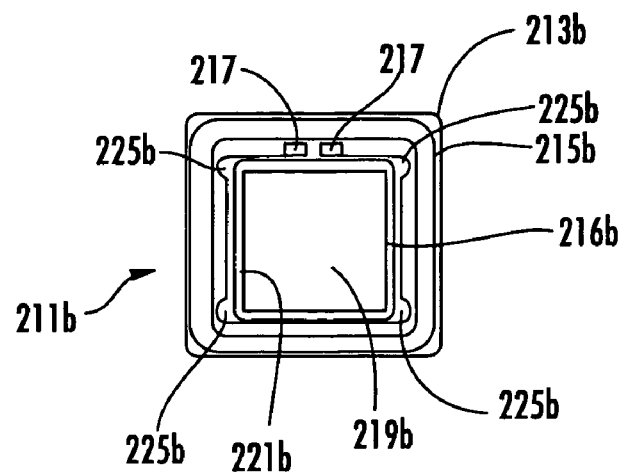
FIG. 7 is a front view of a packaging frame for a valve chip according to some embodiments of the present invention.
Figure 8:
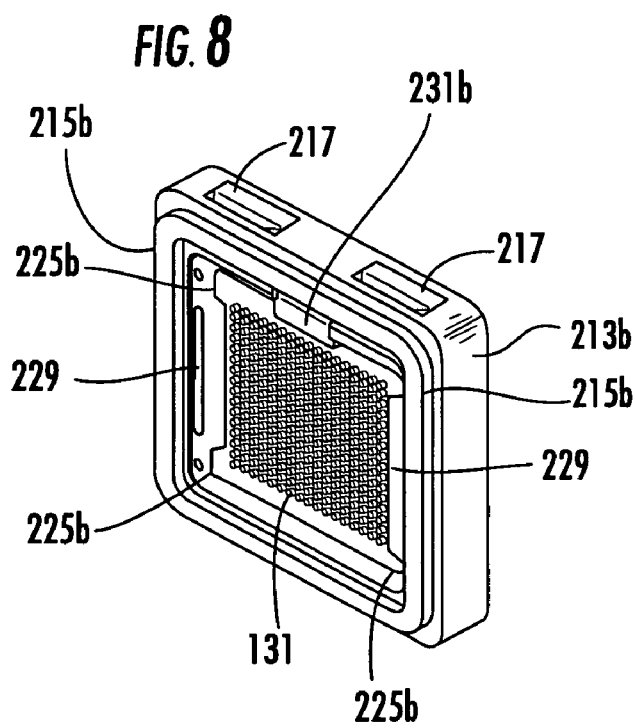
FIG. 8 is a plan view of a packaged valve chip according to some embodiments of the present invention.

Moreover, a valve chip may be packaged using a frame according to some embodiments of the present invention as illustrated, for example, in FIGS. 5-9. Alternative embodiments of a packaged valve chip (each including a valve chip 131 as discussed above with respect to FIG. 2) are illustrated in FIGS. 6 and 8. Corresponding embodiments of packaging frames without valve chips are illustrated in FIGS. 5 and 7, and embodiments of electrical leads without a frame are illustrated in FIG. 9.

As shown, for example, in FIG. 5, a packaging frame 211a according to some embodiments of the present invention may include a body 213a, a gasket 215a, and electrical leads 217. The frame 211a has a window 219a therein and a recessed ledge 221a surrounding the window 219a. In addition, a trough 223a may surround the ledge 221a. A combined width of the ledge 221a and trough 223a may be in the range of approximately 0.025 inches to approximately 0.060 inches. More particularly, a combined width of the ledge 221a and trough 223a may be in the range of approximately 0.050 inches to approximately 0.060 inches. The electrical leads 217 may be formed of stamped metal, and the electrical leads 217 may be plated with tin (approximately 150 micro inches) and then plated with gold (approximately 40 micro-inches).

The body 213a may be formed of injection molded insulating material (such as a plastic material, an elastomeric material, a polymer, a co-polymer, and/or derivatives thereof), and the gasket 215a may be formed of an injection molded flexible sealing material such as rubber, viton, and/or silicone. The gasket 215a may provide a static fluid seal with respect to a main housing of a valve assembly.

More particularly, the body 213a may be formed by injection molding insulating material (such as a plastic material, an elastomeric material, a polymer, a co-polymer, and/or derivatives thereof) with the electrical leads 217 being provided as inserts in the mold. Moreover, the gasket 215a may be formed together with the body 213a using a two-shot molding process and/or an overmolding process. The ledge 221a may be recessed relative to a surrounding portion of the body 213a so that a valve chip can be supported at edges thereof on one side by the ledge with top and bottom surfaces of the valve chip exposed for fluid communication therethrough. In addition, the ledge 221a may be sufficiently recessed so that a subsequently placed valve chip is also recessed within the body 213a. Moreover, portions of the electrical leads 217 are exposed adjacent the window 219a for electrical connection (such as by wire bonding, solder bumping, conductive epoxy, or other means known to those having skill in the art) to a subsequently placed valve chip. In addition, notches 225a in the body 213a may be provided adjacent portions of the ledge 221a to allow room for a tool to place a valve chip on the ledge with other portions of the body 213a fitting more closely to the valve chip. Portions of the body 213a surrounding the leads 217 may be angled (for example, at approximately 30 degrees) to provide wire bonding tip clearance. While injection molding is discussed herein by way of example, other molding techniques such as insert molding and/or blow molding may be used.

An adhesive can then be provided in the trough 223a, and a valve chip 131 can be placed on the ledge 221a, with the trough 223a providing for placement, retention, and/or control of spreading of the adhesive until it is fully cured. More particularly, an adhesive bead having a width of approximately 0.015 inches may be used. The valve chip may be placed on the ledge 221a with accuracy of approximately 0.005 inches using optical sensor equipment. Accordingly, indication marks may be molded into the body 213a of the packaging frame. More particularly, indication marks may be molded to include perpendicular intersecting lines having an appearance similar to that of an "L", a "T", a "+", or other similar characters. Moreover, the indication marks may have a depth of approximately 0.010 inches.

An adhesive used to secure the valve chip 131 on the ledge 221a may be cured at approximately 150 degrees C. (302 degrees F.) for approximately 1 hour. In an alternative, the adhesive may be cured for a longer time at a lower temperature. Polycarbonate, for example, may be used for the body 213a and polycarbonate may have a melting temperature in the range of approximately 430 degrees F. to approximately 480 degrees F. To reduce deformation of the body 213a, however, adhesive cure temperatures may be maintained in the range of approximately 125 degrees F. to approximately 200 degrees F. In an alternative, a UV cured epoxy may be used as an adhesive.

Portions 229 of the body 213a may be deformed around the exposed edges of the valve chip 131 to provide the structure illustrated in FIG. 6. The adhesive may provide a fluid seal between the valve chip 131 and the body 213a, and the deformed portions 229 may secure the valve chip within the body 213a. More particularly, portions 229 of the body 213a may be deformed using a heated tool (such as a heat stake) to retain the valve chip 131 within the body 213a. Accordingly, edges of the valve chip 131 may be supported on one side by the ledge 221a and on the other side by the deformed portions 229 of the body 213a. Moreover, a surface of the valve chip 131 adjacent the leads 217 may be recessed approximately 0.010 inches relative to the leads 217 and approximately 0.030 inches relative to a surface of the body 213a surrounding the notches 225a, ledge 221a, and trough 223a.

On the valve chip 131 all fixed electrodes may be electrically connected to a first input pad (such as a first gold bond pad), and all flexible electrodes may be electrically connected to a second input pad (such as a second gold bond pad), and the input pads may be electrically connected (e.g., via wire bonding such as gold wire bonding, solder bumping, conductive epoxy, or other means known to those having skill in the art) to exposed portions of respective electrical leads 217 adjacent the window 219a. A glob-top potting 231a can be used to protect the electrical connection between the input pads of the valve chip 131 and the electrical leads 217. Portions of the electrical leads 217 are exposed on an edge of the body 213 for electrical coupling to a main housing of a valve assembly.

According to alternate embodiments shown, for example, in FIG. 7, a packaging frame 211b according to some embodiments of the present invention may include a body 213b, a housing gasket 215b, and electrical leads 217. The frame 211b has a window 219b (also referred to as a through hole) therein and a recessed ledge 221b surrounding the window 219b. In addition, a chip gasket 216b may be provided on the ledge 221b.

A width of the ledge 221b may be in the range of approximately 0.025 inches to approximately 0.060 inches. More particularly, a width of the ledge 221b may be in the range of approximately 0.050 inches to approximately 0.060 inches. The electrical leads 217 may be formed of stamped metal, and the electrical leads 217 may be plated with tin (approximately 150 micro inches) and then plated with gold (approximately 40 micro-inches). The body 213b may be formed of injection molded insulating material (such as a plastic material, an elastomeric material, a polymer, a co-polymer, and/or derivatives thereof), and the gaskets 215b and 216b may be formed of an injection molded flexible sealing material such as rubber, viton, and/or silicone. The gasket 215b may provide a static fluid seal with respect to a main housing. The gasket 216b may provide a static fluid seal with respect to a valve chip placed thereon.

More particularly, the body 213b may be formed by injection molding insulating material (such as a plastic material, an elastomeric material, a polymer, a co-polymer, and/or derivatives thereof) with the electrical leads 217 being provided as inserts in the mold. Moreover, the gaskets 215b and 216b may be formed together with the body 213b using a two-shot molding process and/or an overmolding process. The ledge 221b may be recessed relative to a surrounding portion of the body 213b so that a valve chip can be supported at edges thereof on one side by the ledge 221b and the gasket 216b with top and bottom surfaces of the valve chip exposed for fluid communication therethrough. In addition, the ledge 221b may be sufficiently recessed so that a subsequently placed valve chip is also recessed within the body 213b. Moreover, portions of the electrical leads 217 are exposed adjacent the window 219b for electrical connection (such as by wire bonding, solder bumping, conductive epoxy, or other means known to those having skill in the art) to a subsequently placed valve chip. In addition, notches 225b in the body 213b may be provided adjacent portions of the ledge 221b to allow room for a tool to place a valve chip on the ledge with other portions of the body 213b fitting more closely to the valve chip. Portions of the body 213b surrounding the leads 217 may be angled (for example, at approximately 30 degrees) to provide wire bonding tip clearance.

A valve chip 131 can be placed on the gasket 216b, with the gasket 216b providing a static fluid seal with respect to a valve chip placed thereon. In an alternative to the gasket 216b or in addition, a stamped adhesive tape may be used to secure the valve chip to the ledge. The valve chip may be placed on the gasket 216b with accuracy of approximately 0.005 inches using optical sensor equipment. Accordingly, indication marks may be molded into the body 213b of the packaging frame. More particularly, indication marks may be molded to include perpendicular intersecting lines having an appearance similar to that of an "L", a "T", a "+", or other similar character. Moreover, the indication marks may have a depth of approximately 0.010 inches.

Portions 229 of the body 213b may be deformed around the exposed edges of the valve chip 131 to provide the structure illustrated in FIG. 8. The deformed portions 229 may secure the valve chip against the gasket 216b within the body 213b. More particularly, portions 229 of the body 213b may be deformed using a heated tool (such as a heat stake) to retain the valve chip 131 within the body 213b. Accordingly, edges of the valve chip 131 may be supported on one side by the ledge 221b and gasket 216b and on the other side by the deformed portions 229 of the body 213b. Moreover, a surface of the valve chip 131 adjacent the leads 217 may be recessed approximately 0.010 inches relative to the leads 217 and approximately 0.030 inches relative to a surface of the body 213b surrounding the notches 225b and ledge 221b.

Moreover, the valve chip 131 may be packaged before releasing the valve flaps 117. More particularly, the valve flaps 117 may be formed on a sacrificial oxide, and the sacrificial oxide may be maintained while the valve chip 131 is being assembled in the packaging frame. The sacrificial oxide may then be removed using a dry (vapor) HF (hydrofluoric acid) release without significantly damaging the packaging frame. More particularly, the packaging frame may be formed of viton and/or other materials which may be resistant to damage from a dry (vapor) HF release. While sacrificial oxide layers are discussed by way of example, other sacrificial layers (such as sacrificial metal layers) may be used with other suitable vapor and/or wet chemical etchants.

In an alternative, valve flaps of a valve chip may be released by removing sacrificial oxide using a wet HF acid etch either before dicing from a wafer including a plurality of valve chips, after dicing but before packaging, or after packaging. More particularly, the sacrificial oxide layer may be removed from the valve chip using a 49% HF solution for approximately 10 minutes, and the wet etch may be followed by a de-ionized (DI) water rinse, an isopropyl alcohol rinse, and first and second methanol rinses for 20 minutes each to remove any residual HF and/or water. After the wet processing, the valve chip with the released valve flaps may be primed with methanol for a supercritical dry cycle to reduce any surface tension that may otherwise result in stiction between valve flaps and the substrate.

More particularly, the valve chip may be loaded into a dryer chamber and covered with methanol, and liquid $CO_2$ is then used to displace the methanol from the chamber at a pressure of approximately 1200 psig. Once all of the methanol is displaced, the chamber is heated past the supercritical point (approximately 31 degrees C.) to transition the $CO_2$ from the liquid to gas phase, and the pressure is released to vent the system of $CO_2$ vapor. Because supercritical $CO_2$ has extremely low surface tension, $CO_2$ is less likely to pull the valve flaps down as it transitions from liquid to gas. Commercially available and/or custom supercritical dryers may be used.

Visual inspection can be used to determine that an acceptable number of the valve flaps on a valve chip are successfully released. In particular, a surface of the valve chip has a different color than exposed silicon under the flappers which is visible when the valve flaps are released and the valve chip is unpowered, and the color variations could be inspected. In an alternative, light can be projected through the wafer after release, and an optical detector could detect light differences between the powered (closed) and unpowered (open) valve chip. In either example, machine vision systems could be used to perform the inspections.

On the valve chip 131 all fixed electrodes may be electrically connected to a first input pad (such as a first gold bond pad), and all flexible electrodes may be electrically connected to a second input pad (such as a second gold bond pad), and the input pads may be electrically connected to exposed portions of respective electrical leads 217 adjacent the window 219b, for example, using wire bonding such as gold wire bonding, solder bumping, conductive epoxy, or other means known to those having skill in the art. A glob-top potting 231b can be used to protect the electrical connections between the input pads of the valve chip 131 and the electrical leads 217. Portions of the electrical leads 217 are exposed on an edge of the body 213b for electrical coupling to a main housing.

Moreover, tooling used to mold packaging frames according to some embodiments of the present invention illustrated in FIGS. 5-8 may be adaptable so that packaging frames with the same outer dimensions are molded with different window dimensions using substantially the same mold tooling. For example, a same mold base could be used to form different packaging frames with different mold lids being used to provide different window sizes, shapes, and/or locations. Accordingly, packaging frames may be efficiently fabricated for valve chips of different sizes. More particularly, a smaller window may be provided for a smaller valve chip for an application requiring a lower fluid flow capacity, and the smaller window may be provided adjacent the electrical leads (instead of being centered) to provide proximity for wire bonding. By providing the packaging frames with the same outer dimensions for different valve chip sizes, a same main housing may receive packaged valve chips of different capacities/sizes to provide different operating characteristics.

In addition, a baffle may be provided on the body (213a or 213b) of the frame (211a or 211b) to deflect pressure spikes and/or reduce stress on the electrostatic valve flaps of the valve chip 131. More particularly, the baffle may be provided on the body (213a or 213b) within the gasket (215a or 215b) adjacent the side of the valve chip 131 including the flexible valve flaps and input pads. Moreover, the baffle may be provided as a plate that is secured to the body (213a or 213b) with an adhesive.

Figure 23:
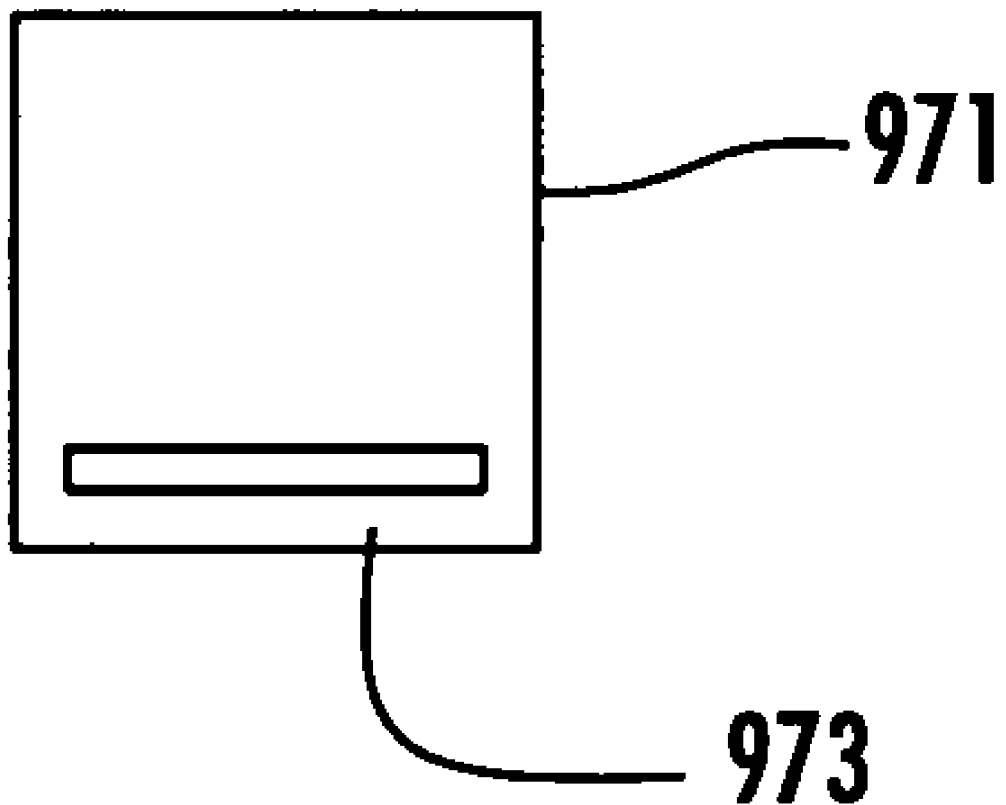
FIG. 23 is a front view of a baffle according to some embodiments of the present invention.

An example of a baffle 971 is illustrated in FIG. 23. As shown, the baffle 971 includes an orifice 973 there through, and dimensions of the baffle 971 may be such that the baffle is slightly longer and wider than the valve chip 131 but slightly less than interior dimensions of the gasket (215a or 215b). Accordingly, the baffle 971 may be secured adjacent and spaced apart from the valve chip 131 and within the gasket (215a or 215b). Moreover, a recess may be provided in the body (213a or 213b) of the frame in which the baffle 971 can be placed, and the recess may define a spacing between the baffle 971 and the valve chip 131. Moreover, the baffle 971 may be placed such that the orifice 973 is adjacent a portion of the valve chip 131 most distant from the electrical leads 217.

By including the baffle 971, valve flaps of the valve chip 131 may be protected during handling and subsequent assembly. In addition, the baffle 971 may provide a more laminar flow though the valve chip 131, and/or increase the speed of sequencing a valve assembly including packaged valve chips with the baffle. In an alternative, use of the baffle may eliminate the need for sequencing. While the baffle 971 is illustrated with a single elongate orifice, different shapes, configurations, and/or orientations may be provided, and/or a plurality of orifices may be provided.

The use of a baffle may provide a baffle chamber between the baffle and the associated valve chip with the valve flaps of the valve chip physically protected in the baffle chamber during handling and/or assembly. Moreover, an orifice(s) in the baffle may sufficiently restrict fluid flow so that a maximum force applied to the valve flaps of the valve chip may be reduced. In addition, a volume of the baffle chamber may be sufficiently small relative to the associated chamber of the valve housing so that a laminar fluid flow through the valve chip can be attained more quickly and so that fatigue of the valve flaps can be reduced. Baffles and sequencing operations (as discussed with respect to FIGS. 4A-F) can thus be used separately or in combination to increase pressures against which the valve chips can operate, to reduce fatigue, to improve flows, etc.

Moreover, baffles with orifices of different sizes may be provided for different valve chips in a same valve assembly. A 5-way valve, for example, with baffles providing greater flows into actuator ports and more restricted flows out of actuator ports may provide relatively smooth piston motion and maximum piston velocities may be reduced.

Figure 13:
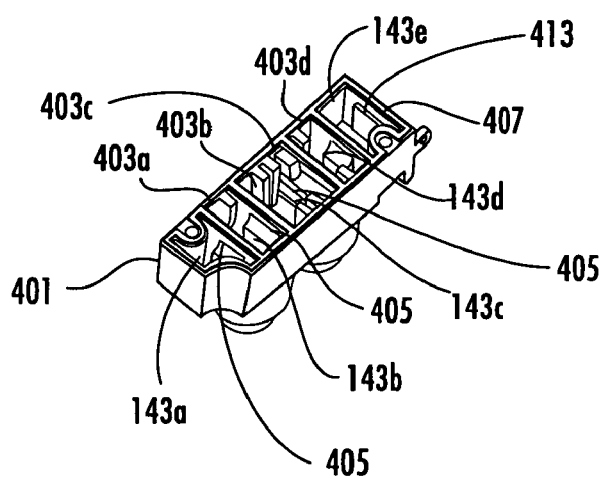
FIG. 13 is a bottom perspective view of the main housing of FIG. 10 according to some embodiments of the present invention.

The packaged valve chips can be plugged in and out of a main housing as discussed in greater detail with respect to FIGS. 13 and 21. Accordingly, a valve assembly including one or more packaged valve chips may be repairable and/or adaptable. A valve assembly with a malfunctioning valve chip may thus be repaired by removing the packaged valve chip that is not working and inserting a new packaged valve chip. In addition, functionality of a valve assembly may be changed by replacing original packaged valve chips with new packaged valve chips having a different characteristic (such as different flow capacity and/or size of valve chip).

Figure 10:
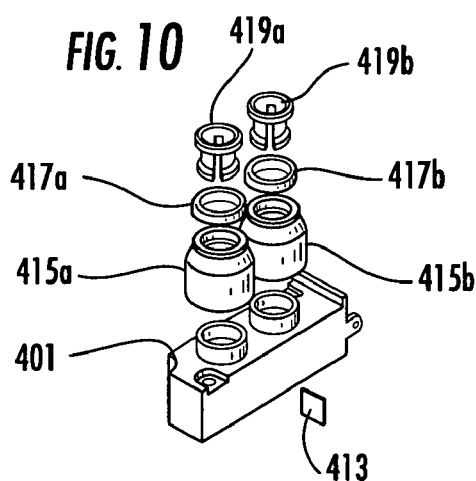
FIG. 10 is an exploded view of a main housing according to some embodiments of the present invention.
Figure 11:
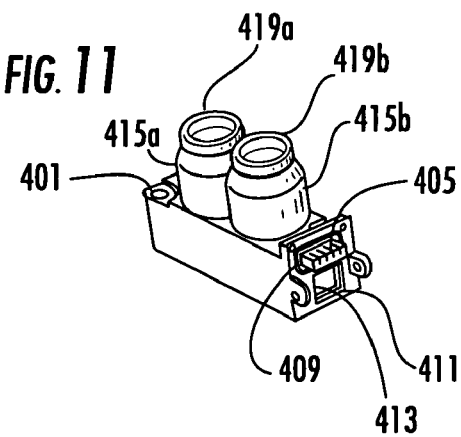
FIG. 11 is a back perspective view of the main housing of FIG. 10 shown assembled according to some embodiments of the present invention.
Figure 12:
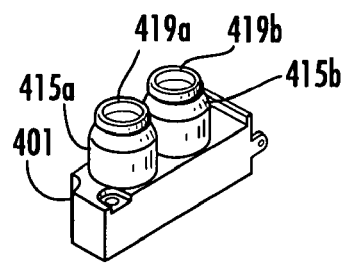
FIG. 12 is a front perspective view of the main housing of FIG. 10 shown assembled according to some embodiments of the present invention.

A main housing according to some embodiments of the present invention is illustrated in FIGS. 10-13. More particularly, an exploded view of a main housing 401 and associated components is illustrated in FIG. 10, and a bottom perspective view of the main housing is illustrated in FIG. 13. As shown in the bottom view of FIG. 13, the main housing 401 defines the valve assembly chambers 143a-e discussed above with respect to FIGS. 3 and 4A-F. The main housing 401 also includes enclosures 403a-d configured to receive packaged valve chips (such as discussed above with respect to FIGS. 6 and 8) perpendicular to a length of the main housing. In addition, main housing 401 includes conductive leads 405 therein used to transmit signals to metal leads 217 of the packaged valve chips in enclosures 403a-d. In addition, a base gasket 407 may be included to provide a fluid seal with respect to a base of the assembly (illustrated in FIG. 18), and a PCB gasket 409 may be included to provide a seal for an external connection to the leads 405 of the main housing.

The main housing 401 may be formed by injection molding an insulating material (such as a plastic material, an elastomeric material, a polymer, a co-polymer, and/or derivatives thereof) with conductive leads 405 insert molded therein, and the gaskets 407 and/or 409 may be formed of a flexible sealing material using a two-shot molding process and/or an overmolding process. More particularly, the molding tool creates the five separate chambers 143a-e for high pressure air supply and low pressure exhaust as discussed above with respect to FIGS. 3 and 4A-F. When injection molding the main housing, a hole 411 may be included in the outside of the housing to accommodate formation of interior holes between chambers 143a-e. The hole 411 in the outside of the housing may be sealed with a plug 413 that may be glued, welded or otherwise affixed to seal the hole 411. In addition, baffles may be provided adjacent valve chips to deflect pressure spikes and/or reduce stress on the electrostatic valve flaps. Baffles, for example, may be provided as plates in the main housing 401 adjacent low pressure sides of the valve chips 131. As discussed above, baffles may be provided on packaging frames used to package the valve chips before insertion into the main housing. Baffles may provide a more laminar flow though the valve chips, a speed of sequencing a valve assembly including baffles may be increased, and/or baffles may eliminate a need for sequencing.

The main housing 401 may also have banjo fittings 415a-b, O-rings 417a-b, and collets 419a-b (also referred to as quick connect fittings and/or cartridges) affixed thereto. More particularly, the collets 419a-b may be push-in style cartridges. More particularly, the banjo fittings 415a-b may be affixed to the main housing 401, for example, using ultrasonic welding and/or an adhesive, and the banjo fittings 415a-b are in fluid communication with the chambers 143b and 143d of the valve assembly. The O-rings 417a-b and the collets 419a-b may then be inserted in the banjo fittings 415a-b for retention of air-tubes providing fluid communication with the pneumatic actuator chambers 163a-b (shown in FIG. 3). The main housing 401 can be used to provide either a three-way valve or a five-way valve depending on the number of packaged devices used and locations thereof to control fluid flow by placing the plug 413 at either the outermost edge of the fifth chamber (5-way) or between the third and fourth chambers (3-way).

As discussed above, a microelectromechanical systems (MEMS) valve chip 131 may be packaged in a frame to provide a packaged valve chip as illustrated, for example, in FIGS. 6 and/or 8. Packaged valve chips may be plugged in and out of respective enclosures 403a-d of the main housing 401 so that the valve assembly is adaptable and/or repairable. The gasket 215a or 215b of the packaged valve chip provides a fluid seal with the respective enclosure 403a-d so that fluid communication between enclosures is only provided through openings in respective valve chips. Moreover, the valve chip 131 in a packaged valve chip is directional and the gasket 215a or 215b should mate with a predetermined side of the particular enclosure so that the packaged valve chip is oriented in the main housing 401 to provide the fluid flows between chambers 143a-e discussed above with respect to FIGS. 4A-F.

In some embodiments of the present invention, it may be desirable to provide different fluid flows through different flow paths of the valve assembly. For example, different enclosures 403a-d of the main housing 401 may be populated with packaged valve chips providing different flow characteristics. More particularly, some of the enclosures 403a-d may be populated with packaged valve chips with relatively fewer and/or smaller valve orifices (holes), others of the enclosures may be populated with packaged valve chips with relatively more and/or larger valve orifices (holes), and all of the packaged valve chips may have the same exterior dimensions. In addition, packaged valve chips with relatively fewer and/or smaller valve orifices (holes) may be provided with baffles having relatively fewer and/or smaller baffle orifices (holes), and packaged valve chips with relatively more and/or larger orifices (holes) may be provided with baffles having relatively more and/or larger baffle orifices (holes). In an alternative, different flows may be provided by different packaged valve chips having the same number and sizes of valve orifices (holes) by providing baffles having different numbers and/or sizes of baffle orifices (holes).

As discussed above, an interior dimension of a window of a frame used to package a valve chip can be varied to accommodate valve chips of different sizes without varying outer dimensions of the packaged valve chip assembly. A same main housing 401 may thus receive packaged valve chip assemblies in enclosures 403a-d having different flow capacity characteristics. Stated in other words, the size of a MEMS valve chip may be varied to provide different flow characteristics (for example, in the range of approximately 0.001 Cv to approximately 10 Cv) while maintaining a same envelope geometry of the packaged valve chip.

In addition, exposed portions of the metal leads 217 on an edge of the packaged valve may mate with corresponding leads of the main housing 401 to provide communication of electrical signals from outside the main housing with fixed and flexible electrodes of the valve chips plugged into enclosures 403a-d of the main housing 401.

While not shown in FIGS. 10-13, filters may be provided in one or more of the chambers 143a-e to protect the microvalves. For example, a filter in chamber 143c may protect microvalves from particles and/or other debris from a high pressure supply, and filters in chambers 143b and 143d may protect microvalves from particles and/or other debris introduced from the actuator during the exhaust cycle.

An electronics sub-assembly 501 for valve assemblies according to some embodiments of the present invention is illustrated in FIGS. 14-17. More particularly, a printed circuit board 503 may include electronic circuitry and/or software and/or firmware used to control operations of the valve chips 131 included in the main housing 401. For example, the printed circuit board 503 may include electronic circuitry and/or software to control and/or drive the valve chips 131 in accordance with operations discussed above with respect to FIGS. 4A-F as instructed by a remote device such as a programmable logic controller (PLC).

The printed circuit board may include integrated circuit chips 505, resistors, capacitors, and/or inductors thereon. In addition, leads 507 on the printed circuit board 503 may provide electrical coupling with leads of the main housing 401, and one or more connectors 509 (such as Molex connectors) may provide electrical connection to a remote controller such as a PLC. The printed circuit board may be configured to provide a plurality of different operating characteristics with one particular programming characteristic being selected using jumpers 511 or other means such as a dip switch(es), shunt(s) 510, etc. More particularly, the printed circuit board may include one or more custom circuits (for example, including application specific integrated circuit ASIC devices) as discussed below with respect to FIGS. 41-44, 45A-B, and 46A-B. Additional operations of valve assemblies and/or electronic sub-assemblies thereof are discussed in the U.S. Provisional Application No. 60/590,699 to Kevin Douglas et al., entitled "Methods Of Operating Electrostatically Actuated Microvalve Assemblies And Related Structures" and filed Jul. 23, 2004 (hereinafter "Douglas et al."). The disclosure of this provisional application is hereby incorporated herein in its entirety by reference.

Figure 15:
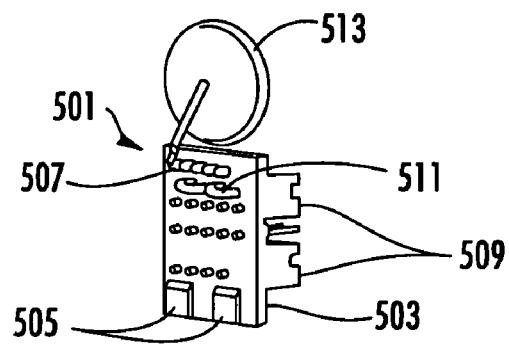
FIG. 15 is a front perspective view of a printed circuit board of the electronics sub-assembly of FIG. 14 according to some embodiments of the present invention.

During normal operation, the printed circuit board 503 may receive operating power along with control signals through connector(s) 509. An alternate power source such as a battery 513 may also be provided so that the printed circuit board can sequence the valve chips 131 to a predetermined default condition in the event of a power outage. While a battery is shown in FIG. 15, other alternate power sources (such as a capacitive storage device and/or a fuel cell) could be used. The printed circuit board 503 may also include a high voltage drive circuit (such as a multiple stage charge pump) used to drive the valve chip electrodes. For example, a 24V external power supply may be provided through the connector 509, and a high voltage drive circuit may generate a 150V output used to drive the valve chip electrodes through leads 507, leads 405, and leads 217. The printed circuit board may also include a transient voltage suppression (TVS) device 517 (such as a pair of serially connected and opposing zener diodes).

A controller of the electronic sub-assembly may be configured to monitor the external power supply, and upon detecting interruption of the external power supply, to advance the valve chips 131a-d to a predetermined default condition and to hold that default condition using energy provided from the alternate power source. Upon detecting interruption of the external power supply, for example, the current condition of the valve chips 131a-d may be maintained. In an alternative, upon detecting interruption of the external power supply, the controller may close the valve chips 131a-d so that fluid communication is blocked between each of the chambers 143a-e. In another alternative, upon detecting interruption of the external power supply, the controller may close valve chips 131b-c and open valve chips 131a and 131d. In still another alternative, upon detecting interruption of the external power supply, the controller may close valve chips 131a and 131d and open valve chips 131b-c.

Figure 14:
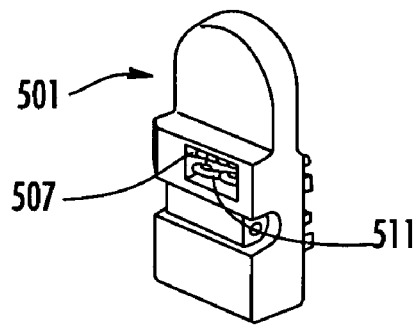
FIG. 14 is a perspective view of an electronics sub-assembly according to some embodiments of the present invention.
Figure 16:
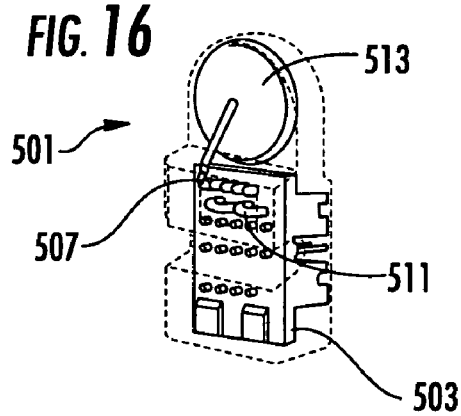
FIG. 16 is a transparent view of the electronics sub-assembly of FIG. 14 according to some embodiments of the present invention.
Figure 17:
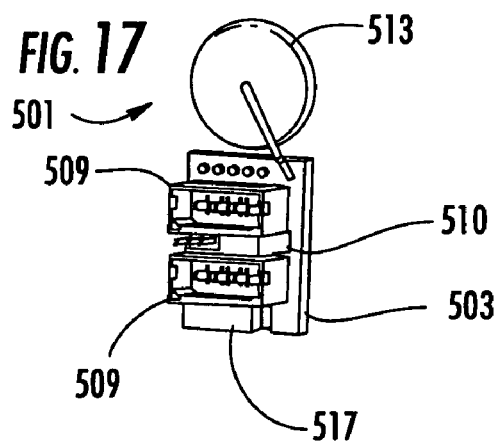
FIG. 17 is a back perspective view of a printed circuit board of the electronics sub-assembly of FIG. 14 according to some embodiments of the present invention.

The electronics sub-assembly 501 including the printed circuit board 503 and the battery 513 may be encapsulated in an insulating material (such as a plastic material, an elastomeric material, a polymer, a co-polymer, and/or derivatives thereof) as illustrated in FIGS. 14 and 16, for example, using an over-molding process. More particularly, an epoxy may be used that can be cured at a relatively low temperature and pressure to protect the electronics therein. An external geometry of the encapsulated electronics sub-assembly may be provided that fits on the main housing 401 so that the leads 507 of the printed circuit board 503 mate with the leads 405 of the main housing 401.

In an alternative, a battery or other electrical power storage device may be removable from the electronics sub-assembly and/or a battery may be provided outside the encapsulation of the electronics sub-assembly. Accordingly, the battery may be more easily replaced. For example, a battery may be provided in a cable used to supply power and/or control signals to the electronics sub-assembly. Moreover, the electronics sub-assembly may include circuitry configured to charge the battery during normal operations using externally provided power. Accordingly, a life of a battery may be extended.

Figure 18:
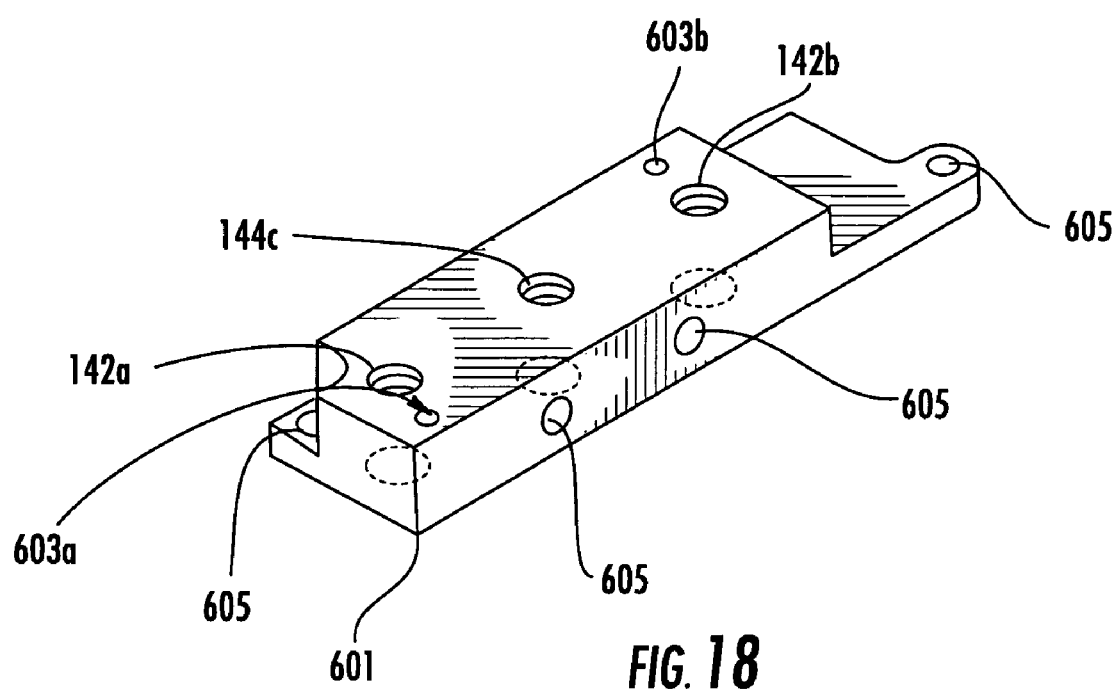
FIG. 18 is a perspective view of a base of a valve assembly according to some embodiments of the present invention.

A base 601 for valve assemblies according to some embodiments of the present invention is illustrated in FIG. 18. The base 601 may be formed using a metal casting process. More particularly, the base 601 may be formed of a metal such as aluminum or stainless steel, and the exhaust ports 142a-b and the supply port 144c may be threaded tapped holes. Additional screw tapped holes 603a-b may be used to secure the main housing 401 onto the base 601. In addition, clearance and/or mounting holes 605 (perpendicular to and/or parallel with the ports) may be provided in the base for mounting the valve assembly.

By using a cast metal as the base, an integrity of the threads in the holes may be more easily maintained. Moreover, an epoxy finish may be provided on a cast aluminum base for protection and/or aesthetic purposes. In an alternative, the base 601 may be formed from an injection molded material (such as a plastic material, an elastomeric material, a polymer, a co-polymer, and/or derivatives thereof) using metallic inserts at threaded locations.

The valve assembly may be completed by plugging packaged valve chips (such as illustrated in FIGS. 6 and 8) into enclosures in the bottom of the main housing 401 (as shown in FIG. 21); securing the main housing (including the packaged valve chips therein) to the base 601 using screws 701; and plugging the electronics sub-assembly onto the main housing as shown in FIGS. 19 and 21-22. FIG. 20 illustrates the valve assembly with non-metallic portions of the main housing not shown so that leads of the main housing are visible, and so that interconnections of leads 217, 405, and 507 are visible.

The same main housing, base, and electronics sub-assembly can be configured for either 5-way or 3-way valve operations. For 5-way operations, as discussed above with respect to FIGS. 4A-F, four packaged valve chips may be plugged into respective enclosures in the bottom of the main housing as shown, for example, in FIG. 21. For 3-way valve operations, a packaged valve chip may be plugged into each of the two enclosures most distant from the electronics sub-assembly, and a sealing plug 413 may be plugged into the two enclosures closest to the electronics sub-assembly so that chambers 143d-e are permanently sealed. As discussed above, a same electronics sub-assembly may be configured to provide one of a plurality of modes of operation defined in memory (such as ROM, PROM, EPROM, EEPROM, etc.) depending on a selection made using a jumper(s), a switch(es), a shunt(s), a fuse(s), or other selection device that can be set during and/or after manufacture. For example, a same electronics sub-assembly can be used to control either 5-way, 4-way, 3-way, or 2-way operations depending on a switch, shunt, fuse, and/or jumper setting. For example, 3-way and 5-way valve operations are discussed in Douglas et al.

In further alternatives, a main housing, base, and electronics sub-assembly can be configured for 4-way and/or 2-way valve operations. For 4-way operations, the base may be modified so that fluid coupling is provided between exhaust chambers 143a and 143e and a same exhaust port. Otherwise, 4-way operations may be provided with four valve chips as discussed above with respect to FIGS. 4A-F. In an alternative, 2-way operations may be provided using a single valve chip to provide a unidirectional on/off flow device. A 2-way device could be provided using the components of FIGS. 10-13 with one valve chip and plugs substituted for other valve chips. In an alternative, a 2-way device could be provided using a smaller housing with one input port, one output port, and one enclosure for a single valve chip.

According to some embodiments of the present invention, air paths can be independently controlled between each of the five chambers 143a-e in a valve assembly configured for 5-way operations, so that the same valve assembly may function as an "All Cylinder Ports Exhausted" valve, as an "All Cylinder Ports Blocked" valve, or as an "All Cylinder Ports Energized" valve. A valve assembly according to some embodiments of the present invention may thus replicate the functionality of any commercially available valve type based on programming of the electronics sub-assembly, selection of a program of the electronics sub-assembly, and/or insertion of packaged valve chip assemblies and/or sealing plugs into enclosures of the main housing.

Moreover, valve assemblies according to some embodiments of the present invention may provide independent control of airflow so that novel valve types may be implemented.

With a back-up power source such as a battery, for example, a unique functionality may be provided when system power is lost. More particularly, the valve and pneumatic actuator may retain a last position during a power failure (as opposed to assuming a default condition).

In addition, circuits, such as custom integrated circuit devices (e.g., application specific integrated circuit devices), for the electronics sub-assembly may provide different programs allowing the same physical valve assembly (including valve chips main housing, base, electronics sub-assembly, etc.) to provide functionality of any valve type. One of a plurality of programs of the electronics sub-assembly may be selected, for example, by pulling input pins to specific voltage levels, by programming a chip(s) of the electronic sub-assembly using an interface (such as a serial interface), selectively destroying fusible links, cutting and/or maintaining one or more jumpers, placing and/or omitting a shunt between two or more pins, selecting a position of a switch(es), etc.

Valve assemblies according to additional embodiments of the present invention may use pulse width modulation to control a flow of fluid through the electro-statically actuated valves. For example, pulse width modulation may be used to open and close electro-statically actuated valve flaps at a predetermined frequency with a duty-cycle being used to determine a fluid flow through the valve. For example, a 100% duty cycle may provide a full flow, a 50% duty cycle may provide half flow, and 0% duty cycle may provide no flow. By using pulse width modulation to actuate valve chips 131a-d, for example, a speed at which the rod 167 extends and retracts may be controlled. Moreover, an acceleration and/or deceleration of the rod 167 may be controlled as the rod extends and/or retracts by varying the duty cycle as the rod extends or retracts. For example, respective valve chips may be actuated at a greater duty cycle at the beginning of extending and/or retracting to overcome inertia, and the respective valve chips may be actuated at a reduced duty cycle as the rod approaches the fully extended and/or retracted positions.

Moreover, one or more filters may be provided in valve assemblies according to some embodiments of the present invention. Filters may be provided, for example, at high pressure supply port 144c and/or actuator ports 146a and 146b. In addition or in an alternative, filters may be provided at exhaust ports 142a and 142b. Filters at supply port 144c and/or exhaust ports 142a and 142b may be provided on and/or in the base 601 of FIG. 18. Filters at actuator ports 146a and 146b may be provided inside or outside the main housing 401, inside or outside banjo fittings 415a and 415b, and/or at collets 419a and 419b. The use of filters may protect the valve assemblies from contaminants such as dust, oil, and/or water that may degrade operation of the valve assemblies by plugging valve orifices and/or reducing a seal between valve flaps and respective orifices when a valve is closed.

Figures 24, 25:
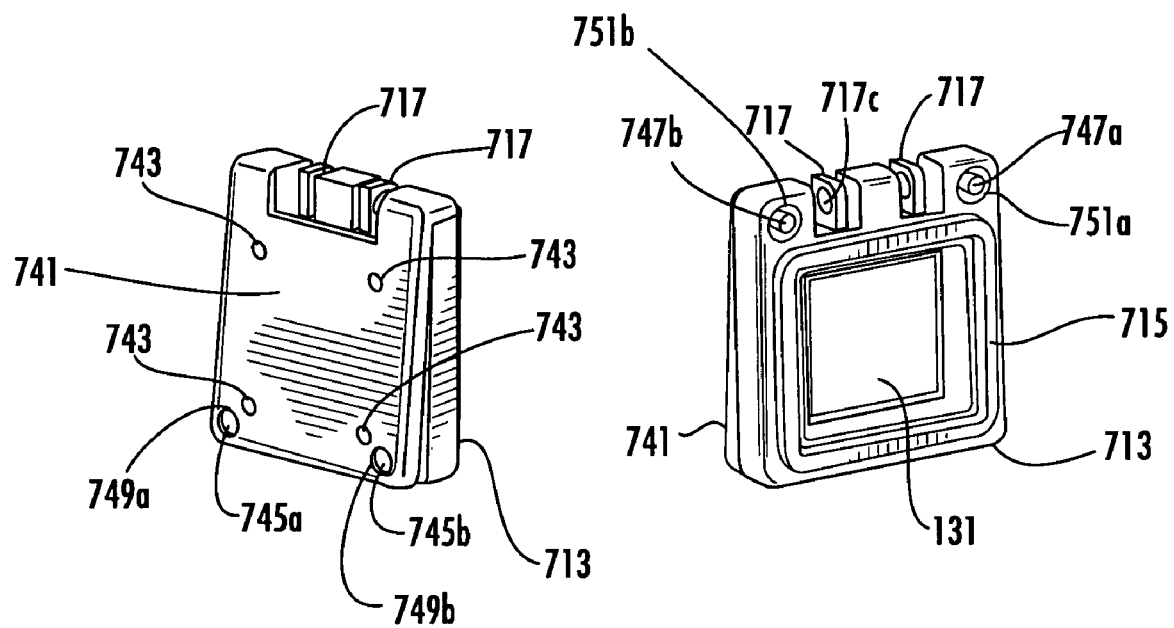
FIGS. 24 and 25 are plan views from different sides of a packaged valve chip according to some embodiments of the present invention.
Figure 26:
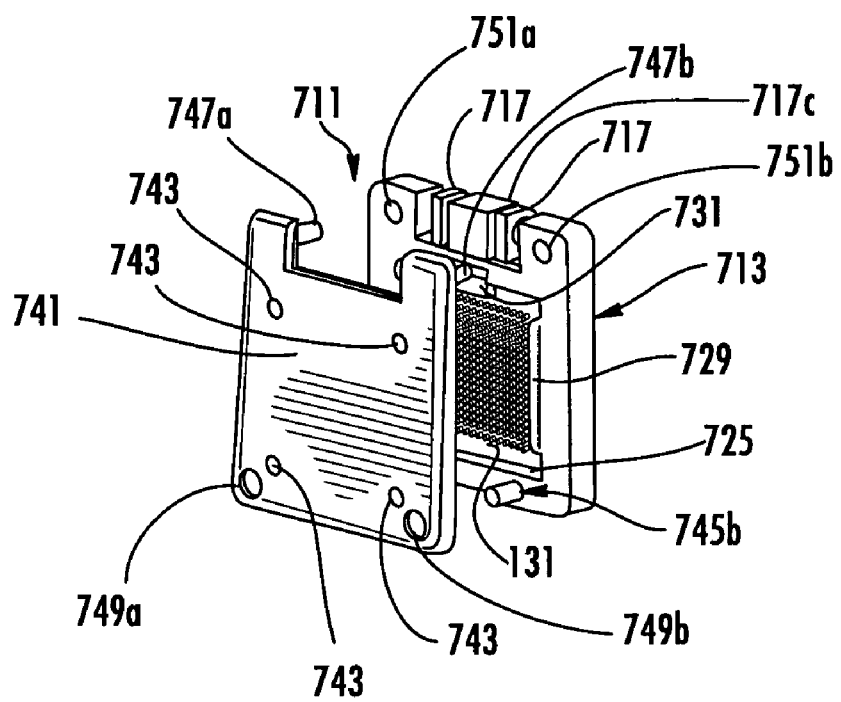
FIG. 26 is an exploded view of packaged valve chips according to some embodiments of the present invention.
Figure 27:
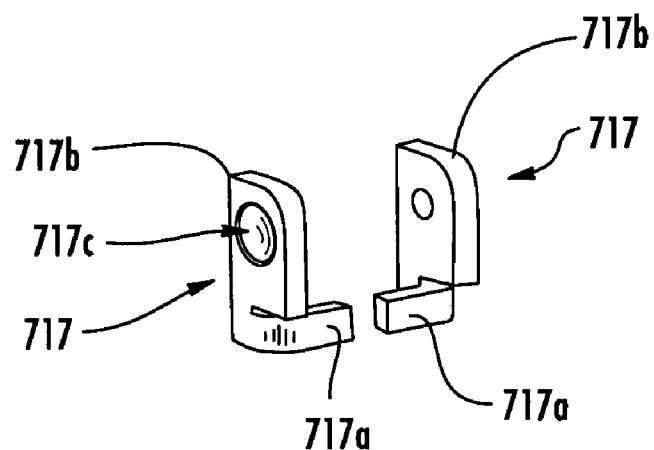
FIG. 27 is a plan view of electrical leads for a packaging frame according to embodiments of the present invention.

Additional embodiments of a packaged valve chip (including a valve chip 131 as discussed above with respect to FIG. 2) with a wedge shaped baffle 741, a frame 711, and leads 717, are illustrated in FIGS. 24-26. Electrical leads 717 according to some embodiments of the present invention are illustrated in FIG. 27 separate from the frame 711.

As shown, for example, in FIGS. 24-26, a packaging frame 711 according to some embodiments of the present invention may include a body 713, a gasket 715, and electrical leads 717. The frame 711 may have a window therein, a recessed ledge surrounding the window, and a trough may surround the ledge as discussed above with regard to FIGS. 5-6 and/or 7-8. A combined width of the ledge and trough may be in the range of approximately 0.025 inches to approximately 0.060 inches. More particularly, a combined width of the ledge and trough may be in the range of approximately 0.050 inches to approximately 0.060 inches. The electrical leads 717 may be formed of stamped metal, and the electrical leads 717 may be plated with tin (approximately 150 micro inches) and then plated with gold (approximately 40 micro-inches). The body 713 may be formed of an injection molded insulating material (such as a plastic material, an elastomeric material, a polymer, a co-polymer, and/or derivatives thereof), and the gasket 715 may be formed of an injection molded flexible sealing material such as rubber, viton, and/or silicone. The gasket 715 may provide a static fluid seal with respect to a main housing of a valve assembly.

More particularly, the body 713 may be formed by injection molding an insulating material (such as a plastic material, an elastomeric material, a polymer, a co-polymer, and/or derivatives thereof) with the electrical leads 717 being provided as inserts in the mold. Moreover, the gasket 715 may be formed together with the body 713 using a two-shot molding process and/or an overmolding process. The ledge may be recessed relative to a surrounding portion of the body 713 so that a valve chip can be supported at edges thereof on one side by the ledge with top and bottom surfaces of the valve chip exposed for fluid communication therethrough. In addition, the ledge may be sufficiently recessed so that a subsequently placed valve chip is also recessed within the body 713. Moreover, portions of the electrical leads 717 are exposed adjacent the window for electrical connection (such as by wire bonding, solder bumping, conductive epoxy, or other means known to those having skill in the art) to a subsequently placed valve chip. In addition, notches 725 in the body 713 may be provided adjacent portions of the ledge to allow room for a tool to place a valve chip on the ledge with other portions of the body 713 fitting more closely to the valve chip. Portions of the body 713 surrounding the leads 717 may be angled (for example, at approximately 30 degrees) to provide wire bonding tip clearance.

An adhesive can then be provided in the trough of the body 713, and a valve chip 131 can be placed on the ledge of the body 713 surrounding the window, with the trough providing for placement, retention, and/or control of spreading of the adhesive until it is fully cured. More particularly, an adhesive bead having a width of approximately 0.015 inches may be used. The valve chip may be placed on the ledge of the body 713 with accuracy of approximately 0.005 inches using optical sensor equipment. Accordingly, indication marks may be molded into the body 713 of the packaging frame. More particularly, indication marks may be molded to include perpendicular intersecting lines having an appearance similar to that of a "L", "T", "+", or other similar character. Moreover, the indication marks may have a depth of approximately 0.010 inches.

An adhesive used to secure the valve chip 131 on the ledge of the body 713 may be cured at approximately 150 degrees C. (302 degrees F.) for approximately 1 hour. In an alternative, the adhesive may be cured for a longer time at a lower temperature. Polycarbonate, for example, may be used for the body 713 and polycarbonate may have a melting temperature in the range of approximately 430 degrees F. to approximately 480 degrees F. To reduce deformation of the body 713, however, adhesive cure temperatures may be maintained in the range of approximately 125 degrees F. to approximately 200 degrees F. In an alternative, a UV cured epoxy may be used as an adhesive.

Portions 729 of the body 713 may be deformed around the exposed edges of the valve chip 131 to provide the structure illustrated in FIG. 26. The adhesive may provide a fluid seal between the valve chip 131 and the body 713, and the deformed portions 729 may secure the valve chip within the body 713. More particularly, portions 729 of the body 713 may be deformed using a heated tool (such as a heat stake) to retain the valve chip 131 within the body 713. Accordingly, edges of the valve chip 131 may be supported on one side by the ledge of the body 713 and on the other side by the deformed portions 729 of the body 713. Moreover, a surface of the valve chip 131 adjacent the leads 717 may be recessed approximately 0.010 inches relative to the leads 717 and approximately 0.030 inches relative to a surface of the body 713 surrounding the notches 725, ledge, and trough.

On the valve chip 131, all fixed electrodes may be electrically connected to a first input pad (such as a first gold bond pad), and all flexible electrodes may be electrically connected to a second input pad (such as a second gold bond pad), and the input pads may be electrically connected (e.g., via wire bonding such as gold wire bonding, solder bumping, conductive epoxy, or other means known to those having skill in the art) to exposed portions of respective electrical leads 717 adjacent the window through the body 713. A glob-top potting 731 can be used to protect the electrical connection between the input pads of the valve chip 131 and the electrical leads 717. Portions of the electrical leads 717 are exposed on an edge of the body 713 for electrical coupling to a main housing of a valve assembly.

According to alternate embodiments, the packaging frame 711 may use a chip gasket similar to that discussed above with regard to FIGS. 7 and 8 to provide a fluid seal between the valve chip 131 and the body of the packaging frame. As before, the body 713 may be formed of injection molded insulating material (such as a plastic material, an elastomeric material, a polymer, a co-polymer, and/or derivatives thereof), and the gasket 715 discussed above and the additional chip gasket may be formed of an injection molded flexible sealing material such as rubber, viton, and/or silicone. The gasket 715 may provide a static fluid seal with respect to a main housing, and the chip gasket may provide a static fluid seal with respect to a valve chip placed thereon. Moreover, the gasket 715 and the chip gasket may be formed together with the body 713 using a two-shot molding process and/or an overmolding process. In an alternative to a chip gasket or in addition, a stamped adhesive tape may be used to secure the valve chip to the ledge.

Moreover, the valve chip 131 may be packaged before releasing the valve flaps 117. More particularly, the valve flaps 117 may be formed on a sacrificial oxide, and the sacrificial oxide may be maintained while the valve chip 131 is being assembled in the packaging frame. The sacrificial oxide may then be removed using a dry (vapor) HF release without significantly damaging the packaging frame. More particularly, the packaging frame may be formed of viton and/or other materials which may be resistant to damage from a dry (vapor) HF release.

In an alternative, valve flaps of a valve chip may be released by removing sacrificial oxide using a wet HF acid etch either before dicing from a wafer including a plurality of valve chips, after dicing but before packaging, or after packaging. More particularly, the sacrificial oxide layer may be removed from the valve chip using a 49% HF solution for approximately 10 minutes, and the wet etch may be followed by a de-ionized (DI) water rinse, an isopropyl alcohol rinse, and first and second methanol rinses for 20 minutes each to remove any residual HF and/or water. After the wet processing, the valve chip with the released valve flaps may be primed with methanol for a supercritical dry cycle to reduce any surface tension that may otherwise result in stiction between valve flaps and the substrate.

More particularly, the valve chip may be loaded into a dryer chamber and covered with methanol, and liquid $CO_2$ may then be used to displace the methanol from the chamber at a pressure of approximately 1200 psig. Once all of the methanol is displaced, the chamber is heated past the supercritical point (approximately 31 degrees C.) to transition the $CO_2$ from the liquid to gas phase, and the pressure is released to vent the system of $CO_2$ vapor. Because supercritical $CO_2$ has extremely low surface tension, $CO_2$ is less likely to pull the valve flaps down as it transitions from liquid to gas. Commercially available and/or custom supercritical dryers may be used.

Visual inspection can be used to determine that an acceptable number of the valve flaps on a valve chip are successfully released. In particular, a surface of the valve chip has a different color than exposed silicon under the flappers which is visible when the valve flaps are released and the valve chip is unpowered, and the color variations could be inspected. In an alternative, light can be projected through the wafer after release, and an optical detector could detect light differences between the unreleased (closed) and released (open) valve chip. In either example, machine vision systems could be used to perform the inspections.

Moreover, tooling used to mold packaging frames according to some embodiments of the present invention illustrated in FIGS. 24-26 may be adaptable so that packaging frames with the same outer dimensions are molded with different window dimensions using substantially the same mold tooling. For example, a same mold base could be used to form different packaging frames with different mold lids being used to provide different window sizes, shapes, and/or locations. Accordingly, packaging frames may be efficiently fabricated for valve chips of different sizes. More particularly, a smaller window may be provided for a smaller valve chip for an application requiring a lower fluid flow capacity, and the smaller window may be provided adjacent the electrical leads (instead of being centered) to provide proximity for wire bonding. By providing the packaging frames with the same outer dimensions for different valve chip sizes, a same main housing may receive packaged valve chips of different capacities/sizes to provide different operating characteristics.

As further shown in FIGS. 24-26, a wedge shaped baffle 741 may be provided on the body 713 of the frame 711 to deflect pressure spikes and/or reduce stress on the electrostatic valve flaps of the valve chip 131. More particularly, the baffle 741 may be provided on the body 713 adjacent the side of the valve chip 131 including the flexible valve flaps and input pads. By including the baffle 741, valve flaps 117 of the valve chip 131 may be protected during handling and subsequent assembly. In addition, the baffle 741 may provide a more laminar flow though the valve chip 131, increase a speed of sequencing a valve assembly including packaged valve chips with the baffle, and/or eliminate a need for sequencing. While the baffle 741 is illustrated with four generally circular orifices 743, different shapes, configurations, and/or orientations may be provided, and/or lesser numbers of orifices such as a single orifice may be provided.

The baffle 741 may attach to the body 713 of the frame 711 using four pins 745*a-b* and 747*a-b* and a heat stake operation. More particularly, the pins 745*a-b* may be molded onto the body 713 of the frame 711 and configured to mate with through holes 749*a-b* molded into the baffle 741. The pins 747*a-b* may be molded onto the baffle 741 and configured to mate with through holes 751*a-b* molded into the body 713 of the frame 711. By arranging the pins 745*a-b* and 747*a-b* and through holes 749*a-b* and 751*a-b* as illustrated in FIGS. 24-26, a desired orientation of the baffle 741 relative to the body 713 can be provided thereby reducing assembly errors. In other words, the placement of pins and holes illustrated in FIGS. 24-26 can facilitate that a relatively thin portion of the wedge shaped baffle 741 is arranged adjacent the electrical leads 717, and a relatively wide portion of the wedge shaped baffle 741 is arranged distant from the electrical leads 717. The baffle 741 may be molded from a same material used for the body 713, or a different material may be used.

The through holes 749*a-b* in the baffle 741 may be provided with counter-bores (i.e., wider portions) opposite the body 713, and the through holes 751*a-b* in the body 713 may be provided with counter-bores opposite the baffle 741. Accordingly, the pins 745*a-b* and 747*a-b* may be mated with respective through holes 749*a-b* and 751*a-b*, and a heat stake operation on the pins may be used to secure the baffle 741 to the body 713. By providing counter-bores for the through holes, room for movement of heat staked material from the pins may be provided so that outside faces of the baffle 741 and/or the body 713 are not significantly deformed as a result of the heat stake operation.

As further shown in FIGS. 24-26, the baffle 741 may include a plurality of orifices 743 therethrough. Moreover, the baffle 741 may be provided adjacent a flapper side of the valve chip 131, and the gasket 715 may be provided adjacent a backside of the valve chip 131. A backside of the valve chip 131 may thus communicate with a high pressure environment (such as a chamber), the orifices 743 of the baffle 741 may communicate with a relatively low pressure environment (such as a chamber), and the valve chip 131 may allow or block flow from the high pressure environment through the valve chip and through the orifices 743 in the baffle 741 to the low pressure environment. Accordingly, the baffle 741 may protect the flapper side of the valve chip 131 during handling and/or subsequent assembly.

In addition, the baffle 741 may control a pressure differential across the valve chip 131, so that the flappers of the valve chip 131 are not required to open and/or close against sonic air flow and/or against full input pressure. By providing the baffle 741, a reservoir is provided between the baffle 741 and the valve chip 131 so that a flow may be restricted and/or so that a pressure against which the valves must close may be reduced. Stated in other words, a total pressure drop across the packaged valve chip may be split between a first pressure drop across the valve chip 131 and a second pressure drop across the baffle 741 so that the total pressure drop is not felt across the valve chip 131. Because the baffle 741 may allow valve flaps of the valve chip 131 used in a valve assembly to open and/or close in relative short periods of time (e.g., in less than 100 microseconds) against a reduced pressure, fluid flow through the valve chip 131 may be directed "at will" without requiring particular sequencing steps as discussed above, for example, with regard to FIGS. 4A-F. In other embodiments, sequencing operations of FIGS. 4A-F may be used together with valve chips 131 packaged with baffles 741 to provide operation at even higher pressures.

Sizes, locations, and numbers of the orifices 743 may be used to control back pressures and fluid flows thorough the valve chip 131 and assembly. As shown in FIGS. 24-26, the orifices 743 may be provided adjacent outside corners of the valve chip 131, but other orientations, positions, shapes, etc. of orifices 743 may be provided. With the baffle 741, valve flappers of the valve chip 131 may open and/or close against only a fraction of a total pressure across the assembly including the baffle 741 and the valve chip 131, and periods of turbulent flow may be reduced. Accordingly, response times to open and/or close the valve flaps may be reduced, improved functionality may be provided, and/or reliability may be improved. Moreover, a need for sequencing may be eliminated.

The wedge shape of the baffle 743 may also facilitate assembly of the packaged valve chip into a main housing. More particularly, the wedge shape may allow the packaged valve chip to be inserted approximately ¾ (i.e., 75%) of the way into a corresponding wedge shaped enclosure of a valve housing before the gasket 715 begins to compress. Accordingly, damage to the gasket 715 during subsequent assembly may be reduced.

As shown in FIGS. 24-26, the gasket 715 may be provided on a side of the body 713 adjacent the backside of the valve chip 131 and opposite the baffle 741. The gasket 715 may thus be protected from adhesives, heat stake operations, etc. used to secure the valve chip 131 in the body 713 during assembly. By placing the gasket 715 as shown in FIGS. 24-26, interference between the gasket 715 and the baffle 741 may be reduced.

Moreover, the electrical leads 717 may be formed as shown in FIG. 27 so that wire bond portions 717*a* of the leads are substantially parallel to the valve chip 131 and so that external portions 717*b* of the leads are substantially perpendicular with respect to the valve chip 131. Moreover, dimples 717*c* may be provided on the external portions 717*b* of the leads to improve interconnection with leads of a main housing.

The packaged valve chips of FIGS. 24-26 can be plugged in and out of a main housing as discussed in greater detail with respect to FIGS. 28-34. Accordingly, a valve assembly including one or more packaged valve chips may be repairable and/or adaptable. A valve assembly with a malfunctioning valve chip may thus be repaired by removing the packaged valve chip that is not working and inserting a new packaged valve chip. In addition, functionality of a valve assembly may be changed by replacing original packaged valve chips with new packaged valve chips having a different characteristic (such as different flow capacity and/or size of valve chip).

Figure 28:
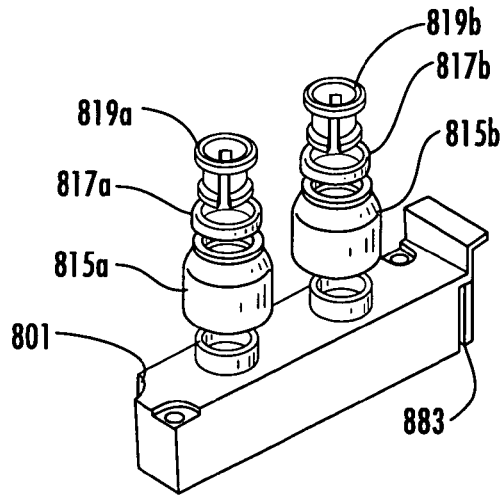
FIG. 28 is an exploded view of a main housing according to some embodiments of the present invention.
Figure 29:
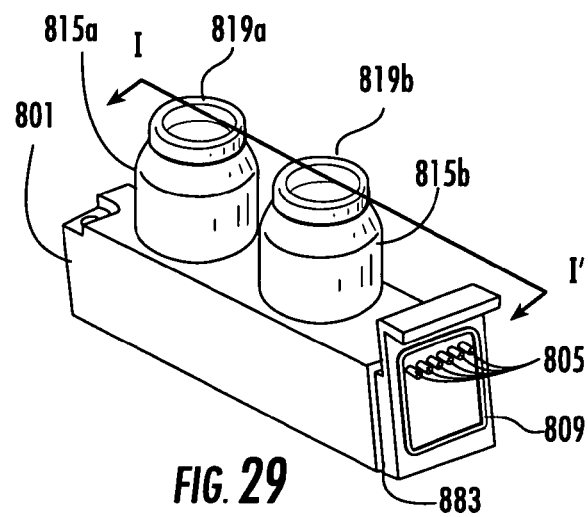
FIG. 29 is a back perspective view of an assembled main housing according to some embodiments of the present invention.
Figure 30:
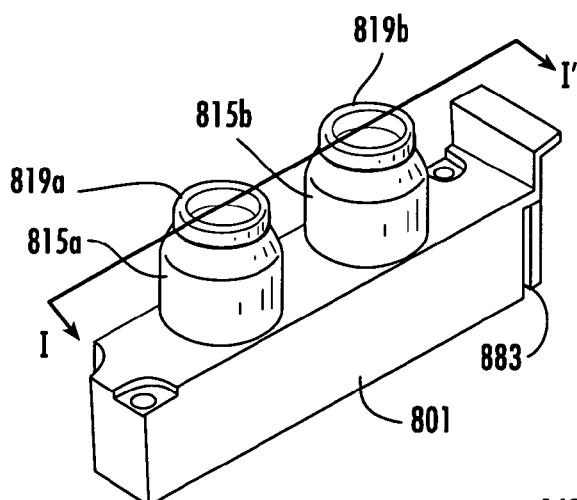
FIG. 30 is a front perspective view of an assembled main housing according to some embodiments of the present invention.
Figure 31:
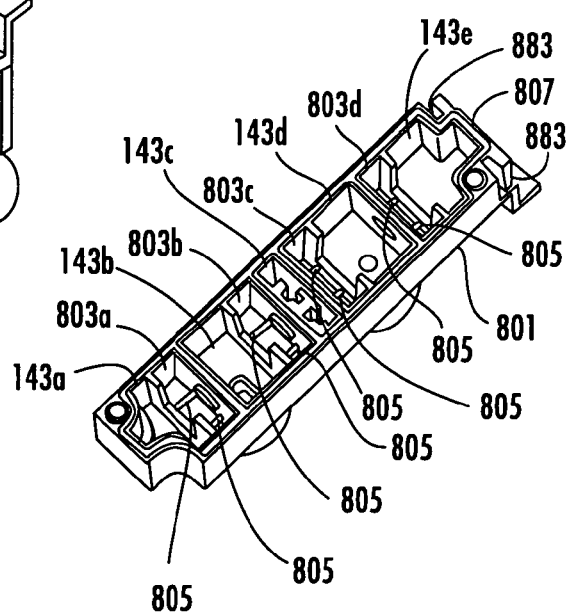
FIG. 31 is a bottom perspective view of a main housing according to some embodiments of the present invention.

A main housing 801 according to some embodiments of the present invention is illustrated in FIGS. 28-31. More particularly, an exploded view of a main housing 801 and associated components is illustrated in FIG. 28, and a bottom perspective view of the main housing is illustrated in FIG. 31. As shown in the bottom view of FIG. 31, the main housing 801 defines valve assembly chambers 143*a-e* discussed above with respect to FIGS. 3 and 4A-F. The main housing 801 also includes enclosures 803*a-d* configured to receive packaged valve chips (such as discussed above with respect to FIGS. 24-27) perpendicular to a length of the main housing. In addition, main housing 801 includes conductive leads 805 therein used to transmit signals to metal leads 717 of the packaged valve chips in enclosures 803*a-d*. A perimeter base gasket 807 may be included to provide a fluid seal with respect to a base of the assembly (illustrated, for example in FIGS. 37 and 38), and a PCB gasket 809 may be included to provide a seal for an external connection to the leads 805 of the main housing.

The main housing 801 may be formed by injection molding an insulating material (such as a plastic material, an elastomeric material, a polymer, a co-polymer, and/or derivatives thereof) with conductive leads 805 insert molded therein, and the gaskets 807 and/or 809 may be formed of a flexible sealing material using a two-shot molding process and/or an over-molding process. More particularly, the molding tool creates the five separate chambers 143*a-e* for high pressure air supply and low pressure exhaust as discussed above with respect to FIGS. 3 and 4A-F. When injection molding the main housing, a hole may be included in the outside of the housing to accommodate formation of interior holes between chambers 143*a-e*, and the hole in the outside of the housing may be sealed with a plug that may be glued, welded or otherwise affixed to seal the hole.

As shown in FIGS. 28-30, the main housing 801 may also have banjo fittings 815*a-b*, O-rings 817*a-b*, and collets 819*a-b* (also referred to as quick connect fittings and/or cartridges) affixed thereto. More particularly, the collets 819*a-b* may be push-in style cartridges. More particularly, the banjo fittings 815*a-b* may be affixed to the main housing 801, for example, using ultrasonic welding and/or an adhesive, and the banjo fittings 815*a-b* are in fluid communication with the chambers 143*b* and 143*d* of the valve assembly. The O-rings 817*a-b* and the collets 819*a-b* may then be inserted in the banjo fittings 815*a-b* for retention of air-tubes providing fluid communication with the pneumatic actuator chambers 163*a-b* (shown in FIG. 3). The main housing 801 can be used to provide either a three-way valve or a five-way valve depending on the number of packaged devices used and locations thereof to control fluid flow.

As discussed above, a microelectromechanical systems (MEMS) valve chip 131 may be packaged in a frame to provide a packaged valve chip as illustrated, for example, in FIGS. 24-26. Packaged valve chips may be selectively plugged in and out of respective enclosures 803*a-d* of the main housing 801 so that the valve assembly is adaptable and/or repairable. The gasket 715 of the packaged valve chip provides a fluid seal with the respective enclosure 803*a-d* so that fluid communication between enclosures is only provided through openings in respective valve chips. Moreover, the valve chip 131 in a packaged valve chip is directional and the gasket 715 should mate with a predetermined side of the particular enclosure so that the packaged valve chip is oriented in the main housing 801 to provide the fluid flows between chambers 143*a-e* discussed above with respect to FIGS. 4A-F.

Figures 32, 33:
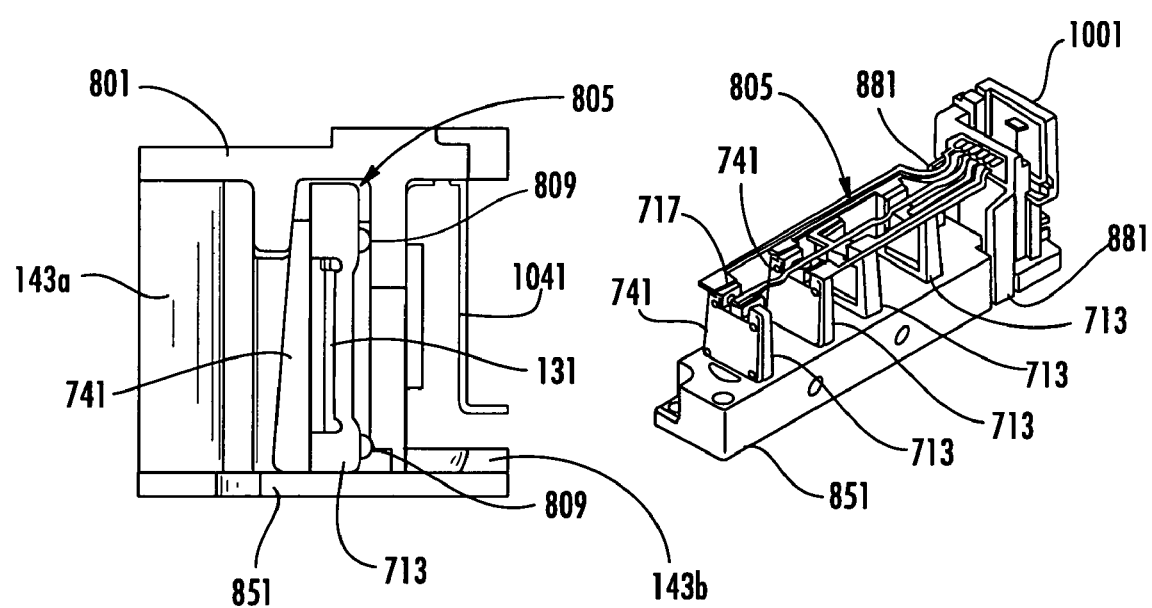
FIG. 32 is an enlarged cross-sectional view of an enclosure of a main housing and a packaged valve chip taken along portions of section line I-I' of FIGS. 29 and 30 according to some embodiments of the present invention.
FIG. 33 is a perspective view of a valve assembly according to some embodiments of the present invention with non-metallic portions of the main housing excluded to show an orientation of leads of the main housing relative to the valve chip assemblies.

As shown in FIG. 32, each of the enclosures 803*a-d* (shown in FIG. 31) may have a wedge shaped profile to accept a respective packaged valve chip including a wedge shaped baffle 741 as discussed above with regard to FIGS. 24-27. More particularly, each of the enclosures 803*a-d* may have a profile that is relatively wide adjacent a base 851 for the housing 801 and that becomes more narrow as the enclosure extends away from the base 851. Accordingly, each of the enclosures 803*a-d* may be configured to receive a respective packaged valve chip (including a wedge shaped baffle 741) with a narrow portion of the packaged valve chip and leads 717 extending into the housing and with a wide portion of the packaged valve chip adjacent the base 851 for the housing 801.

The possibility that a packaged valve chip is incorrectly inserted into the housing can be reduced because a wide portion of the wedge shaped package cannot be inserted into the housing first. For example, the wedge shape of the enclosure may reduce the possibility that the wedge shaped chip assembly can be inserted upside down or sideways. Moreover, complete insertion may not be possible if the wedge shaped chip assembly is inserted into the enclosure backwards so that the base 851 may not properly mate and/or form a seal with the housing 801.

In addition, the wedge shaped package may be inserted a significant portion (e.g., greater than 50%, and frequently as much as 75%) of the way into the respective wedge shaped enclosure before the gasket 715 of the package begins to compress. Accordingly, damage to the gasket 715 can be reduced, and/or an improved fluid seal may be provided between the wedge shaped package and the wedge shaped enclosure.

As discussed above, an interior dimension of a window of a frame used to package a valve chip can be varied to accommodate valve chips of different sizes without varying outer dimensions of the packaged valve chip assembly. A same main housing 801 may thus receive packaged valve chip assemblies in enclosures 803*a-d* having different flow capacity characteristics. Stated in other words, the size of a MEMS valve chip may be varied to provide different flow characteristics (for example, in the range of approximately 0.001 Cv to approximately 10 Cv) while maintaining a same envelope geometry of the packaged valve chip.

In addition, exposed portions of the metal leads 717 on an edge of the packaged valve chip may mate with corresponding leads 805 of the main housing 801 to provide communication of electrical signals from outside the main housing with fixed and flexible electrodes of the valve chips plugged into enclosures 803*a-d* of the main housing 801.

FIG. 33 illustrates a valve assembly including four packaged valve chips, an electronics sub-assembly 1001, and a base 851 with non-metallic portions of the main housing 801 omitted. Accordingly, the electrical leads 805 of the main housing 801 are visible, and a coupling of the electrical leads 805 of the main housing and the electrical leads 717 of the packaged valve assemblies is also visible.

As shown in FIG. 33, a bend may be provided in each of the electrical leads 805 so that portions (or tabs) of the electrical leads 805 making contact with the leads 717 of the packaged chip assembly may be provided parallel with respect to a length of the leads 805 (and parallel with respect to a length of the main housing 801). Accordingly, the portions of the electrical leads 805 making contact with the leads 717 may be supported on both ends thereof for added strength. Moreover, as the packaged chip assembly is inserted into the enclosure of the main housing, the leads 717 of the packaged chip assembly may slide back and/or forth along the tabs of the leads 805 as the gasket 715 is compressed during insertion. A reliability of electrical coupling between the leads 717 and 805 can thus be improved.

Figure 34:
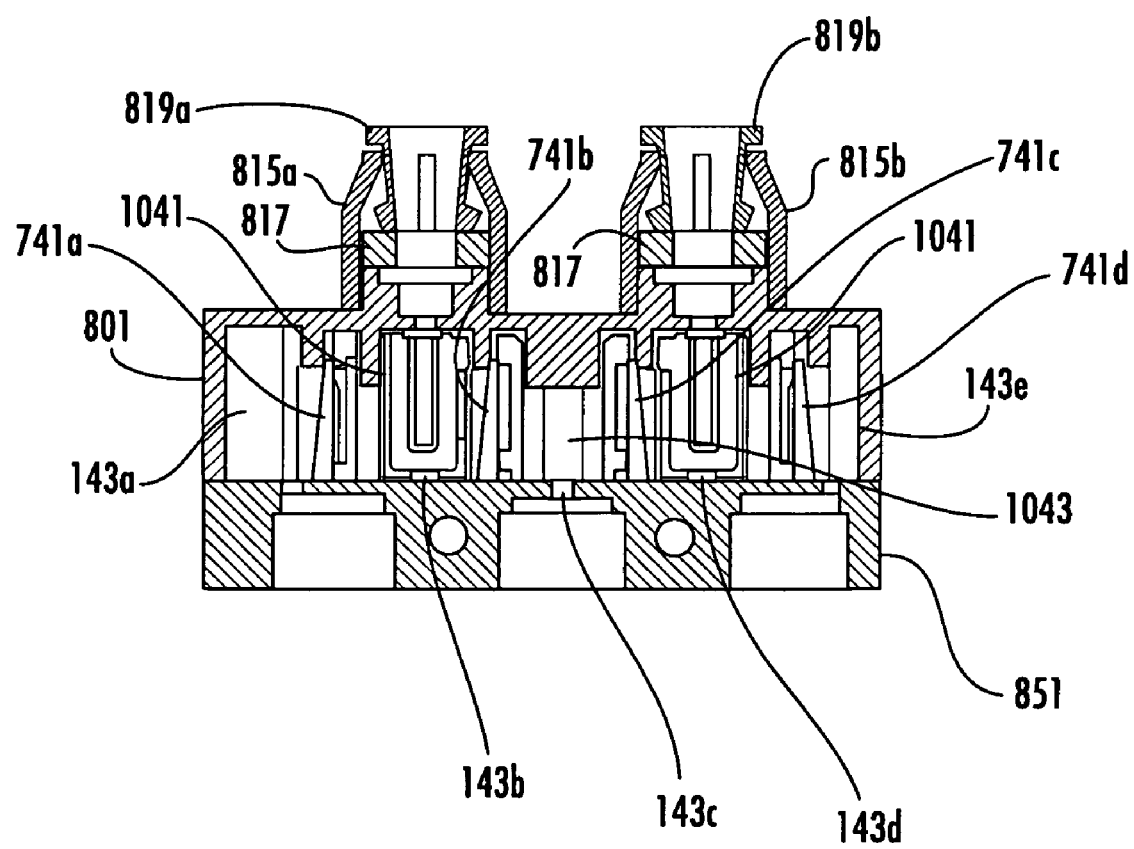
FIG. 34 is a cross-sectional view of a valve assembly taken along section line I-I' of FIGS. 29 and 30 including filters according to some embodiments of the present invention.

In addition, filters may be provided in one or more of the chambers 143*a-e* to protect the microvalves. For example, exhaust filters 1041 may be provided in chambers 143*b* and 143*d*, and input filter 1043 may be provided in chamber 143*c*, as shown in FIG. 34. A filter in chamber 143*c* may protect microvalves from particles and/or other debris from a high pressure supply, and filters in chambers 143*b* and 143*d* may protect microvalves from particles and/or other debris introduced from ports to the actuator. The filters 1041 and/or 1043 may be manufactured integrally with the housing 801, and/or the filters 1041 and/or 1043 may be manufactured separately from the housing 801. One or more of the filters, for example, may be porous plastic filters, porous metal filters, paper filters, desiccant filters, coalescing filters, fiber filters, membrane filters, mesh filters/separators, mist separators, vane separators, cyclonic separators, down flow separators, rain out separators, vertical flow separators, and/or horizontal separators.

The input filter 1043 may be used to filter a high pressure supply provided by the customer. While the high pressure supply may be filtered outside the housing 801, damaging particles may be introduced into the high pressure supply during valve installation, and/or particles may otherwise be introduced downstream from any external filtering. By way of example, the input filter 1043 may be configured to catch materials such as particles of Teflon® tape, pipe sealant, and/or other particles that may be in a high pressure supply pipe downstream from the customer's high pressure supply filter/regulator. Accordingly, damage to valve chips in supply paths may be reduced. Moreover, the input filter 1043 may be configured to allow air flow in all directions. Accordingly, if one area of a filter becomes clogged with contaminants, air can flow through adjacent areas of the filter without significantly limiting flow. While the supply filter 1043 is shown in the housing 801, other filters may be provided in place of and/or in addition to the supply filter 1043. For example, a supply filter may be provided in the base 851, and/or in a supply line coupled to the base.

The exhaust filters 1041 may be used to filter actuator exhaust that may include particles generated as a result of actuation. Actuator exhaust, for example, may include minute particles of dried lubricant, seal, rod bearing, and/or actuator body material. By filtering any such particles from the actuator, damage to the valve chips in exhaust paths can be reduced. Moreover, the exhaust filters 1041 may be configured to allow air flow in all directions. Accordingly, if one area of a filter becomes clogged with contaminants, air can flow through adjacent areas of the filter without significantly limiting flow. While the exhaust filters 1041 are shown in the housing 801, other filters may be provided in place of and/or in addition to the exhaust filters 1041. For example, exhaust filters may be provided in banjo fittings 815*a-b*, in collets 819*a-b*, and/or in the pneumatic actuator.

The use of a baffle 741 may provide a baffle chamber between the baffle and the associated valve chip with the valve flaps of the valve chip physically protected in the baffle chamber during handling and/or assembly. Moreover, an orifice(s) in the baffle may sufficiently restrict fluid flow so that a maximum force applied to the valve flaps of the valve chip may be reduced. In addition, a volume of the baffle chamber may be sufficiently small relative to the associated chamber of the valve housing so that a laminar fluid flow through the valve chip can be attained more quickly and so that fatigue of the valve flaps can be reduced. Baffles and sequencing operations (as discussed with respect to FIGS. 4A-F) can thus be used separately or in combination to increase pressures against which the valve chips can operate, to reduce fatigue, to improve flows, etc.

Moreover, baffles with orifices of different sizes may be provided for different valve chips in a same valve assembly. The 5-way valve of FIG. 34, for example, may be provided with baffles 741*b-c* providing greater flows into actuator ports and with baffles 741*a* and 741*d* providing more restricted flows out of actuator ports. Relatively smooth piston motion may be provided, and/or maximum piston velocities may be reduced.

Figures 35, 36:
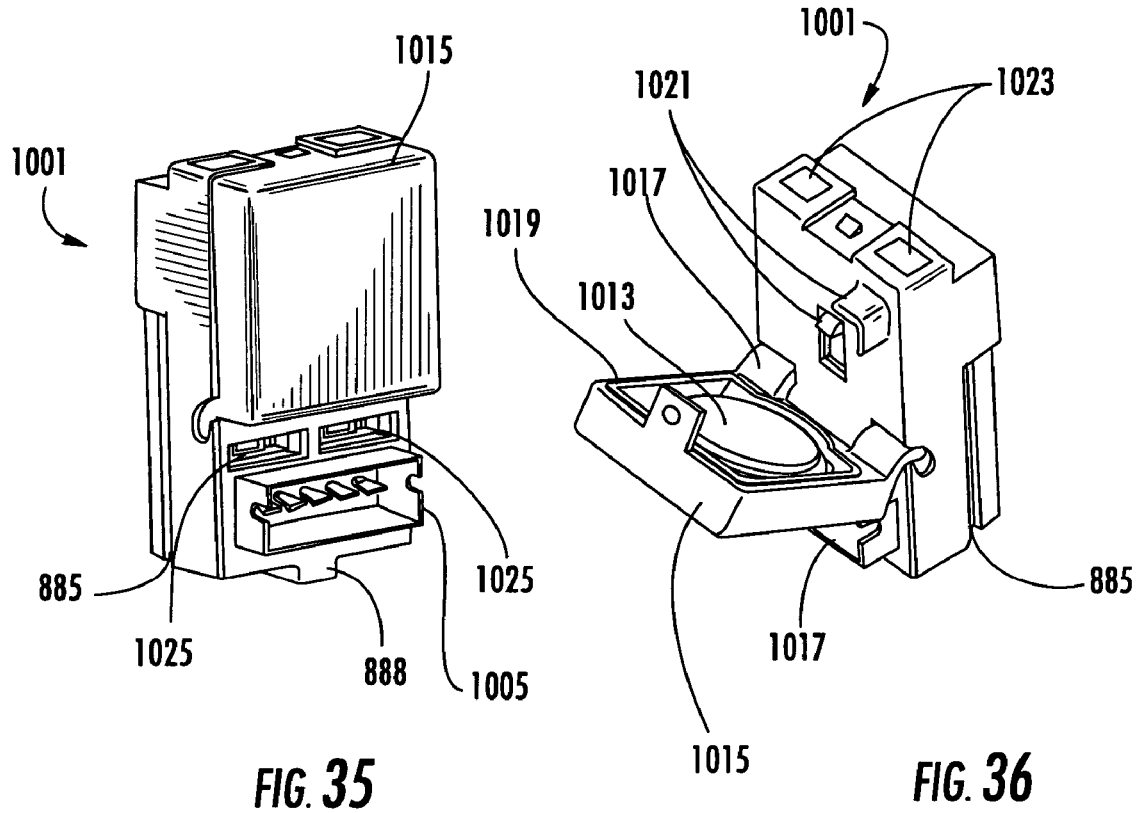
FIGS. 35 and 36 are perspective views of an electronics sub-assembly with a battery cover respectively closed and open according to some embodiments of the present invention.

An electronics sub-assembly 1001 for valve assemblies according to some embodiments of the present invention is illustrated in FIGS. 35-36. More particularly, a printed circuit board within the electronics sub-assembly 1001 may include electronic circuitry and/or software and/or firmware used to control operations of the valve chips 131 included in the main housing 801. For example, the printed circuit board may include electronic circuitry and/or software to control and/or drive the valve chips 131 in accordance with operations discussed above with respect to FIGS. 4A-F as instructed by a remote device such as a programmable logic controller (PLC).

The printed circuit board may include integrated circuit chips, resistors, capacitors, and/or inductors thereon. In addition, leads on the printed circuit board may provide electrical coupling with leads 805 of the main housing 801, and a connector 1005 (such as a 5-pin Molex connector) may provide electrical connection to a remote controller such as a PLC. The electronics sub-assembly may be configured to provide a plurality of different operating characteristics defined in memory (such as ROM, PROM, EPROM, EEPROM, etc.) with one particular programming characteristic being selected using means such as a jumper(s), a dip switch(es), shunt(s), etc. More particularly, the printed circuit board may include one or more custom circuits (for example, including one or more application specific integrated circuit ASIC devices) as discussed below with respect to FIGS. 41-44, 45A-B, and 46A-B. Additional operations of valve assemblies and/or electronic sub-assemblies thereof are discussed in the U.S. Provisional Application No. 60/590,699 to Kevin Douglas et al., entitled "Methods Of Operating Electrostatically Actuated Microvalve Assemblies And Related Structures" and filed Jul. 23, 2004 (hereinafter "Douglas et al."). The disclosure of this provisional application is hereby incorporated herein in its entirety by reference.

During normal operation, the electronics sub-assembly 1001 may receive operating power along with control signals through connector 1005. An alternate power source such as a battery 1013 may also be provided so that the electronics sub-assembly can sequence the valve chips 131 to a predetermined default condition in the event of a power outage. While a battery is shown in FIGS. 35 and 36, other alternate power sources (such as a capacitive storage device and/or a fuel cell) could be used. As shown in FIGS. 35 and 36, the battery 1013 may be provided in a hinged compartment cover 1015 so that the battery may be replaced. Hinges 1017 may provide that the compartment cover opens and closes, and gasket 1019 may protect the battery 1013 from contamination and/or moisture outside the battery compartment. The battery compartment may be formed using a two-shot process to provide an integral cover 1015 and gasket 1019. With a disk type battery, terminals 1021 may provide electrical coupling between electronics of the sub-assembly 1001 and the battery 1013. Moreover, the electronics sub-assembly may include circuitry configured to charge the battery during normal operations using externally provided power. Accordingly, a life of a battery may be extended.

Moreover, indicator lights 1023 (such as light emitting diodes) may provide indication of a current mode of operation, an external power supply status, a battery status, etc. In addition, pairs of manual override contacts 1025 may be used to manually drive an associated actuator to either the extended or retracted position. For example, a first pair of manual override contacts may be electrically shorted with the tip of a screwdriver or other tool to manually drive the associated actuator to a retracted position, and a second pair of manual override contacts may be electrically shorted with the tip of a screwdriver (or other tool) to manually drive the associated actuator to an extended position.

The electronics sub-assembly 1001 may also include a high voltage drive circuit (such as a multiple stage charge pump) used to drive the valve chip electrodes. For example, a 24V external power supply may be provided through the connector 1005, and a high voltage drive circuit may generate a 150V output used to drive the valve chip electrodes through leads 805 of the housing 801 and leads 717 of the valve chips. The printed circuit board may also include a transient voltage suppressor (TVS) such as a pair of serially connected and opposing zener diodes.

A controller of the electronics sub-assembly may be configured to monitor the external power supply, and upon detecting interruption of the external power supply, to advance the valve chips 131*a-d* to a predetermined default condition and to hold that default condition using energy provided from the alternate power source. Upon detecting interruption of the external power supply, for example, the current condition of the valve chips 131*a*-*d* may be maintained. In an alternative, upon detecting interruption of the external power supply, the controller may close the valve chips 131*a*-*d* so that fluid communication is blocked between each of the chambers 143*a*-*e*. In another alternative, upon detecting interruption of the external power supply, the controller may close valve chips 131*b*-*c* and open valve chips 131*a* and 131*d*. In still another alternative, upon detecting interruption of the external power supply, the controller may close valve chips 131*a* and 131*d* and open valve chips 131*b*-*c*.

The electronics sub-assembly 1001 including a printed circuit board may be encapsulated in an insulating material (such as a plastic material, an elastomeric material, a polymer, a co-polymer, and/or derivatives thereof) as illustrated in FIGS. 35 and 36, for example, using an over-molding process. More particularly, an epoxy may be used that can be cured at a relatively low temperature and pressure to protect the electronics therein. An external geometry of the encapsulated electronics sub-assembly may be provided that fits on the main housing 801 so that the leads of the electronics sub-assembly mate with the leads 805 of the main housing 801.

The five pin connector 1005, for example, may provide an electrical power (Vcc) input connection, a ground (GND) input connection, A and B input control connections, and a power status output connection. Moreover, each pair of manual override contacts 1025 may be recessed in the over-molded housing to reduce the possibility of accidental contact therewith. In addition, the pairs of manual override contacts may be respectively labeled "2" and "4" on adjacent portions of the battery cover to correspond with actuator port numbers of the housing.

In addition, an extension 888 of the over-mold may be configured to guide placement of the electronics sub-assembly 1001 with respect to a base and a housing during subsequent assembly. More particularly, the extension 888 may mate with a corresponding slot of a base discussed below with respect to FIGS. 37-38. Moreover, the grooves 885 of the electronics sub-assembly 1001 may be configured to mate with a retaining clip as discussed with respect to FIGS. 39 and 40.

Figures 37, 38:
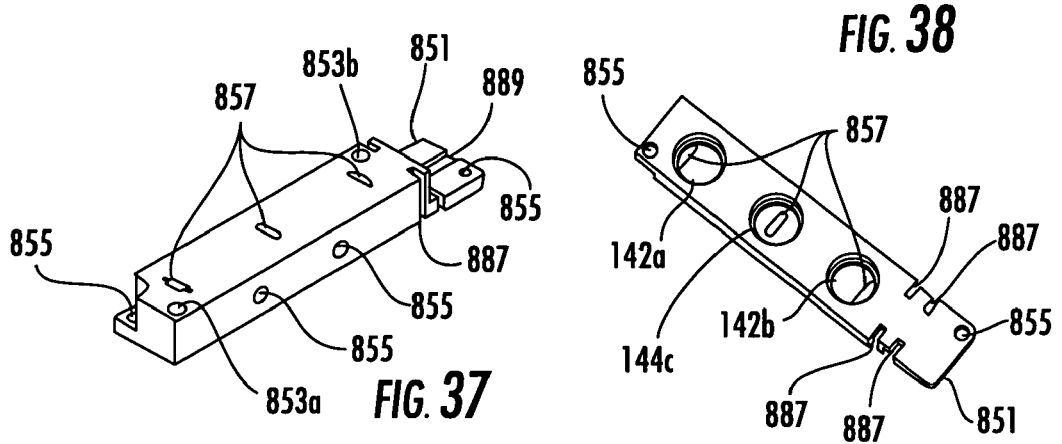
FIGS. 37 and 38 are top and bottom perspective views of a base for valve assemblies according to some embodiments of the present invention.

A base 851 for valve assemblies according to some embodiments of the present invention is illustrated in FIGS. 37 and 38. The base 851 may be formed using a metal casting process. More particularly, the base 851 may be formed of a metal such as aluminum or stainless steel, and the exhaust ports 142*a*-*b* and the supply port 144*c* may be threaded tapped holes. Additional screw tapped holes 853*a*-*b* may be used to secure the main housing 801 onto the base 851. In addition, clearance and/or mounting holes 855 (perpendicular to and/or parallel with the ports) may be provided in the base for mounting the valve assembly. Moreover, communication slots 857 provide relatively narrow openings between the screw tapped holes and the respective chambers in the main housing 801.

By using a cast metal as the base, an integrity of the threads in the holes may be more easily maintained. Moreover, an epoxy finish may be provided on a cast aluminum base for protection and/or aesthetic purposes. In an alternative, the base 851 may be formed from injection molded material (such as a plastic material, an elastomeric material, a polymer, a co-polymer, and/or derivatives thereof) using metallic inserts at threaded locations. As shown in FIG. 37, a groove 889 may be formed in a tang of the base 851, and the groove 889 may be configured to receive the extension 888 of the electronics sub-assembly 1001. Grooves 887 may also be formed in the base 851 to couple with a retaining clip as discussed below with respect to FIGS. 39 and 40.

Moreover, the exhaust ports 142*a*-*b* and the supply port 144*c* may be flat bottom tap drilled and then tapped. In addition, the communication slots 857 for the exhaust ports 142*a*-*b* may be formed off-center. Accordingly, a length of the valve assembly may be reduced because the exhaust ports do not need to be centered relative to the respective valve chambers.

Figures 39, 40:
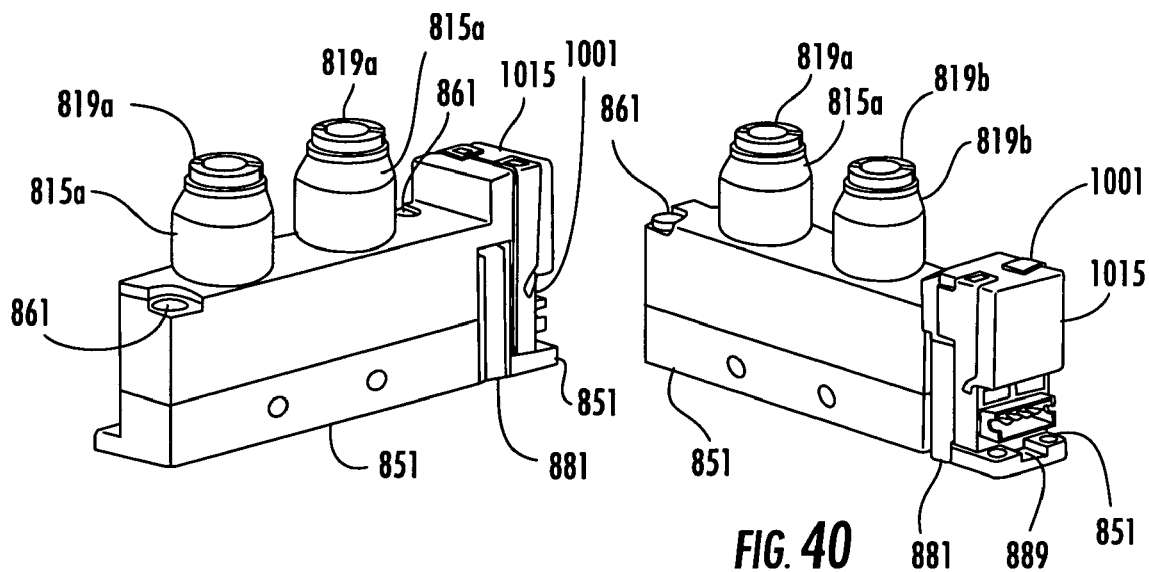
FIGS. 39 and 40 are perspective views of valve assemblies according to some embodiments of the present invention.

The valve assembly may be completed by plugging packaged valve chips (such as illustrated in FIGS. 24-26) into enclosures in the bottom of the main housing 801 (as shown in FIGS. 31 and 32); securing the main housing (including the packaged valve chips therein) to the base 851 using screws 861; and attaching the electronics sub-assembly 1001 onto the main housing 801 and base 851 using a U-shaped retaining clip 881 as shown in FIGS. 39 and 40. More particularly, the U-shaped retaining clip 881 may be configured to couple with grooves 883 of the main housing 801, with grooves 885 of the electronics sub-assembly 1001, and with grooves 887 of the base 851 to fasten the components together. Moreover, the extension 888 of the electronics sub-assembly 1001 may be configured to mate with the slot 889 of the base 851 to provide alignment therebetween.

The same main housing, base, and electronics sub-assembly can be configured for 5-way, 4-way, 3-way, or 2-way valve operations. For 5-way operations, as discussed above with respect to FIGS. 4A-F, four packaged valve chips may be plugged into respective enclosures in the bottom of the main housing as shown, for example, in FIG. 34. For 3-way valve operations, a packaged valve chip may be plugged into each of the two enclosures most distant from the electronics sub-assembly, and a sealing plug may be plugged into the two enclosures closest to the electronics sub-assembly so that chambers 143*d*-*e* are permanently sealed. As discussed above, a same electronics sub-assembly may be configured to provide one of a plurality of modes of operation defined in memory (such as ROM, PROM, EPROM, EEPROM, etc.) depending on a selection made using a jumper(s), a switch(es), a shunt(s), a fuse(s), or other selection device that can be set during and/or after manufacture. For example, a same electronics sub-assembly can be used to control either 5-way, 4-way, 3-way, or 2-way operations depending on a switch, shunt, fuse, and/or jumper setting. For example, 3-way and 5-way valve operations are discussed in Douglas et al.

In further alternatives, a main housing, base, and electronics sub-assembly can be configured for 4-way and/or 2-way valve operations. For 4-way operations, the base may be modified so that fluid coupling is provided between exhaust chambers 143*a* and 143*e* and a same exhaust port. Otherwise, 4-way operations may be provided with four valve chips as discussed above with respect to FIGS. 4A-F. In an alternative, 2-way operations may be provided using a single valve chip to provide a unidirectional on/off flow device. A 2-way device could be provided using the components of FIGS. 28-31 with one valve chip and plugs substituted for other valve chips. In an alternative, a 2-way device could be provided using a smaller housing with one input port, one output port, and one enclosure for a single valve chip.

Figure 41:
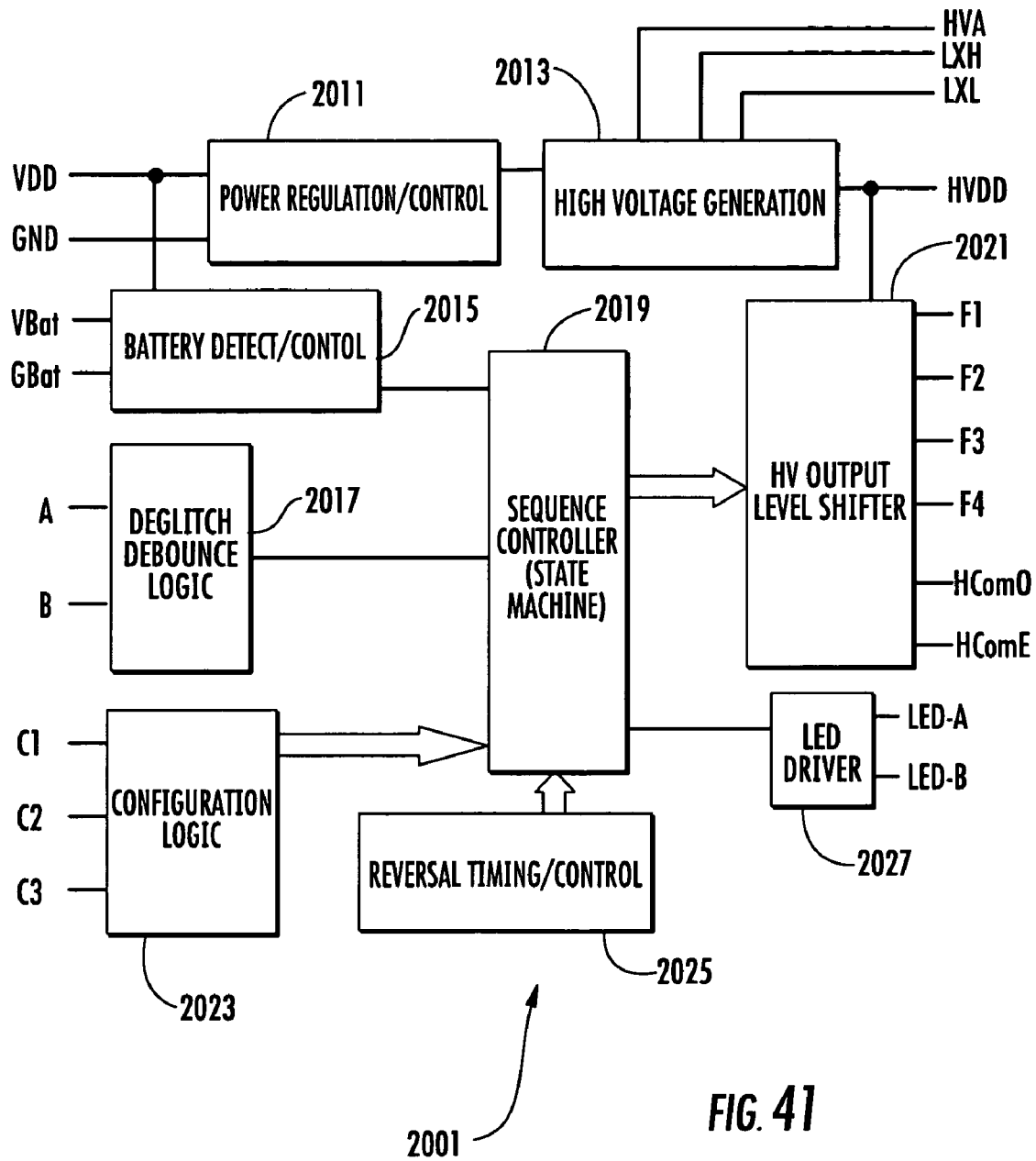
FIG. 41 is a block diagram illustrating functionalities of a custom circuit such as an Application Specific Integrated Circuit (ASIC) for electronic sub-assemblies according to some embodiments of the present invention.
Figure 42:
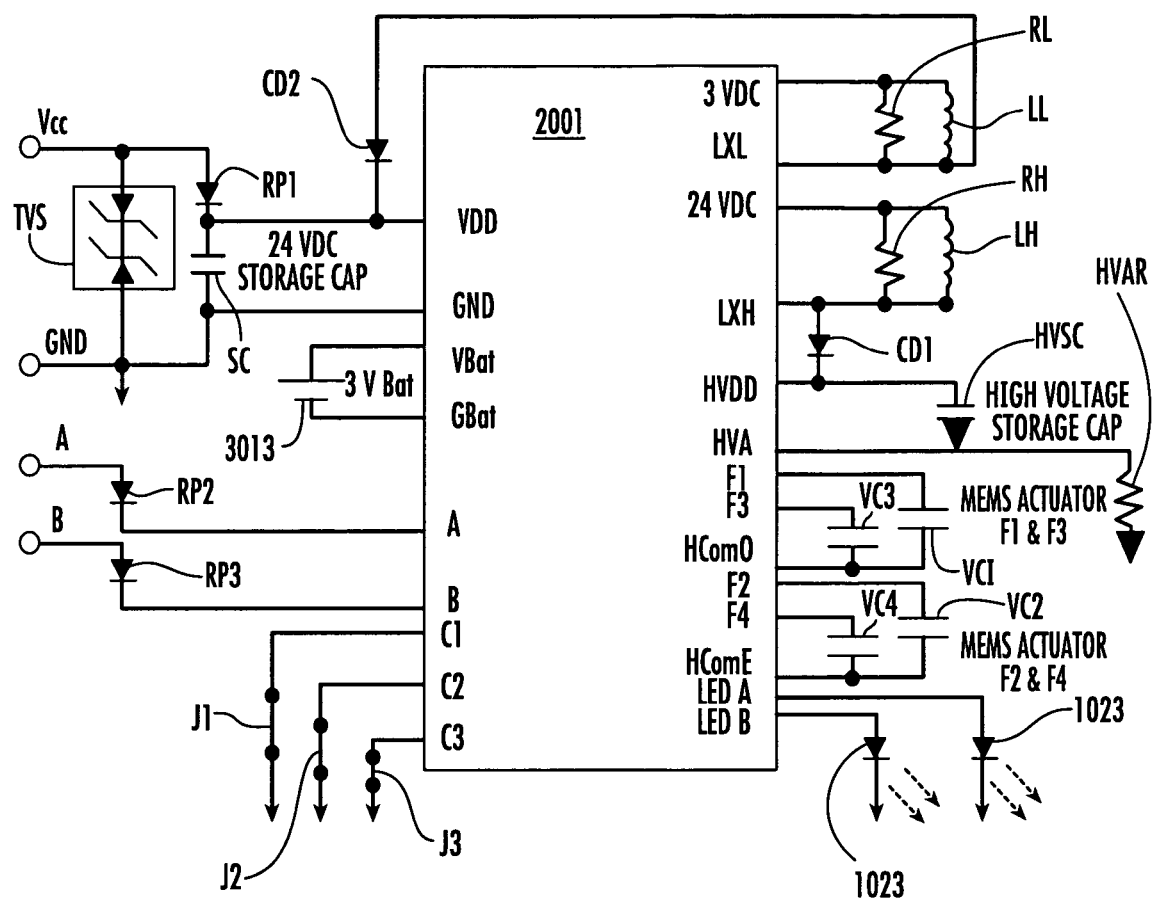
FIG. 42 is a schematic diagram of electronic sub-assemblies including a custom circuit according to some embodiments of the present invention.

According to some embodiments of the present invention, electrical functionalities of the electronics sub-assemblies discussed above with regard to FIGS. 14-17 and/or 35-36 may be provided using a custom circuit (for example, including one or more Application Specific Integrated Circuits also referred to as ASICs). FIG. 41 is a block diagram illustrating functional blocks of a circuit 2001 according to some embodiments of the present invention, and FIG. 42 is a schematic diagram illustrating elements of a printed circuit board including the circuit 2001 of FIG. 41.

As shown in FIG. 41, the circuit 2001 may include a power regulation/control circuit 2011, a high voltage generation circuit 2013, a battery detect/control circuit 2015, a deglitch/debounce logic circuit 2017, a sequence controller (state machine) circuit 2019, a high voltage (HV) output level shifter circuit 2021, a configuration circuit 2023, a reversal timing/control circuit 2025, and a light emitting diode (LED) driver circuit 2027. As shown, the power regulation/control circuit 2011 may receive external power supply VDD and ground GND signals through respective ones of the connectors 509 of FIGS. 14-17, or through respective ones of the connectors 1005 of FIGS. 35-36. Similarly, the deglitch/debounce logic circuit 2017 may receive input controls signals A and B through respective ones of the connectors 509 of FIGS. 14-17, or through respective ones of the connectors 1005 of FIGS. 35-36. The battery detect/control circuit 2015 may receive the battery power supply VBat and ground GBat signals from a battery (such as battery 513 of FIGS. 14-17 or battery 1013 of FIGS. 35 and 36).

The outputs F1-F4 and HComO and HComE of the HV output level shifter circuit 2021 are used to drive the valve chips of the valve assembly with the outputs F1-F4 and HComO and HComE being coupled to respective valve chips through leads of the main housing (such as through leads 405 of FIGS. 13 and 20 or through leads 805 of FIGS. 31 and 33). More particularly, the valve chips of the valve assemblies may be identified as first (most distant from the electronics sub-assembly) through fourth (closest to the electronics sub-assembly) with the high voltage outputs F1 to F4 being respectively applied to the first through fourth valve chips, with the High Voltage Common Odd HComO signal being applied to the first and third valve chips, and with the High Voltage Common Even HComE signal being applied to the second and fourth valve chips.

The configuration logic circuit 2023 may receive configuration select signals C1-C3 which may be either grounded or floating. As shown in FIG. 42, the circuit 2001 may be provided on a printed circuit board with each of the configuration select signals/pins C1-C3 either coupled to ground through a respective jumper J1-J3 or floating (by removing the respective jumper). In an alternative, traces to ground for respective configuration select signals/pins C1-C3 may be either maintained or cut before packaging to provide that respective configuration select signals/pins are either grounded or floating. Moreover, the LED driver circuit 2027 outputs LED-A and LED-B may drive respective LEDs 1023.

The custom circuit of FIGS. 41 and 42 may be configured so that the resulting valve assembly can be used as a drop-in replacement for a conventional solenoid driven valve. Accordingly, the physical and electrical interfaces for the electronics sub-assembly may conform to physical and electrical interfaces used for conventional solenoid driven valves. For example, the deglitch/debounce logic circuit 2017 may be configured to receive input controls signals A and B used for solenoid driven valves. As shown in FIGS. 41 and 42, four separate high voltage output signals F1-F4 may be provided, and each valve chip load can effectively be modeled as a capacitor VC1-VC4 with hysteresis. The capacitors VC1-VC4 thus represent valve chips provided in a main valve housing as opposed to elements provided on a printed circuit board in an electronics sub-assembly. Moreover, the high actuation voltages may be generated using charge pumps, inductor circuits, and/or combinations thereof, and/or other circuits known to those having skill in the art.

The high voltage generation circuit 2013 may be configured to convert a low voltage source (such as a 24 Volt external power supply signal VDD and/or a 3 Volt battery power supply signal VBat) to a high voltage signal, such as a 200 Volt DC signal. The HV generation circuit 2013, for example, may include a series of charge pumps provided on the circuit 2001. In addition or in an alternative as illustrated in FIGS. 41 and 42, external inductor coils LL and LH may be provided in parallel with external resistors RL and RH to provide one or more boost converters used to generate high voltage signals while reducing a size and/or cost of the circuit 2001. Moreover, an absolute value of the high voltage(s) thus generated may be adjusted to accommodate different actuation voltages used for different applications and/or to accommodate variations in characteristics of different circuits (such as ASICs) resulting from manufacturing variations. The resulting high voltages may be adjusted using a resistor HVAR as part of a divider used with a comparator of the HV generation circuit 2013 to control when the high voltage generation circuit 2013 is active.

Upon loss of the primary power source (e.g., upon loss of the external power supply signal VDD), an electronic sub-assembly including the circuit 2001 may be configured to provide that the valve assembly can maintain a state or transition to a desired state. Accordingly, the electronic sub-assembly including the circuit may be configured to provide sufficient energy from a battery (such as battery 513 of FIGS. 15-17, battery 1013 of FIG. 36, and/or battery 3013 of FIG. 42) to overcome leakage through the electrostatically actuated valve chips while maintaining the valve chips in a desired state for an indefinite period during loss of the external power supply signal VDD (which may be a 24 Volt supply).

Upon detection of a power loss, energy may also be needed to switch the high voltage output signals F1-F4 to a pre-defined condition, depending upon a particular application and state of the inputs at the time of the power loss. A relatively low-cost 3 Volt lithium primary battery may be used to provide energy to maintain high voltage output signals F1, F2, F3, and/or F4 when the DC external power supply signal VDD is lost and/or interrupted. In an alternative, a rechargeable lithium ion battery having a voltage output in the range of 3.0 to 4.2 Volts may be used, with the circuit 2001 being configured to recharge the battery when the external power supply signal VDD is present.

During normal operation with the external power supply signal VDD available, the deglitch/debounce logic circuit 2017 may receive and/or filter the input control signals A and B, and the deglitch/debounce circuit 2017 may provide the input control signals A and B to the sequence controller 2019. With the external power supply signal VDD available, the sequence controller circuit 2019 directs operation of the HV output level shifter circuit 2021 in accordance with the input control signals A and B and in accordance with a circuit configuration defined by the configuration signals C1-C3. During loss of the external power supply signal VDD, the battery detect/control circuit 2015 may detect the power loss, and a power loss signal may be generated by the detect/control circuit 2015 and provided to the sequence controller circuit 2019. During loss of the external power supply signal VDD, the sequence controller circuit 2019 directs operation of the HV output level shifter circuit 2021 in accordance with a power loss mode defined by the configuration signals C1-C3 (without regard to the input control signals A and B).

Operation during loss of the external power supply signal VDD may impact operations of the various components of the circuit 2001 because of the limited energy available from the battery. Stated in other words, one or more of the components of the circuit 2001 may be configured to operate in a low power mode during loss of the signal VDD to extend life of the battery. For example, the HV output level shifter circuit 2021 may be configured to provide low leakage operation, high voltage generation oscillators of the HV generation circuit 2013 may be operated on an "as-needed" basis during loss of the signal VDD, and/or the LED driver circuit 2027 may be configured to provide a leakage-only mode during loss of the signal VDD. By reducing current drawn from the battery, a period of time can be extended over which the battery can be used during loss of the signal VDD.

In addition, the battery detect/control circuit 2015 may be configured to detect a low battery voltage and to indicate the need for a replacement battery, for example, by flashing one or both of the LEDs 1023. More particularly, the battery detect/control circuit 2015 may periodically sample the battery voltage under a nominal load, and the battery detect/control circuit 2015 may indicate that a replacement battery is needed when the battery voltage signal VBat falls to approximately 2 Volts (to accommodate different battery types). For example, the battery detect/control circuit 2015 may sample the battery voltage using a nominal load of at least approximately 10 M-ohms.

Logical relationships between inputs and outputs (of electronic sub-assemblies including the circuit 2001 illustrated in FIGS. 41 and 42) are provided in Table 1 of FIG. 43. An exponential rise and fall (a capacitor charged and discharged through a transistor) may be sufficient to drive the electrostatically actuated valve chips. Wave shaping (such as an intentional overshoot and settling voltage), however, may be provided according to some embodiments of the present invention. In Table 1 of FIG. 43, X denotes a "don't care" condition for the respective signal. Where a "don't care" condition is indicated for one or both of the input control signals A and/or B, however, the input control signal may be driven to a high or low voltage at all times.

As shown in Table 1 of FIG. 43, a 5-way, 3-position, cylinder ports exhausted configuration may be provided by providing that the configuration signals C1 and C2 are grounded (indicated as 0). During normal operations when the signal VDD is present, the high voltage output signals F1-F4 (with 0 indicating valve open and with 1 indicating valve closed) and the LED output signals LED-A and LED-B (with 0 indicating off and 1 indicating on) may be driven responsive to the input control signals A and B as indicated. When the configuration signal C3 is grounded and the signal VDD is interrupted, the HV output signals F1-F4 may be driven to the "00" state such that the first and fourth valve chips are opened and the second and third valve chips are closed (i.e., both cylinder ports are exhausted) without regard to the conditions of the input signals A and B. When the configuration signal C3 is floating (indicated as 1) and the signal VDD is interrupted, the HV output signals F1-F4 may be held in their last state at the time of the power interruption without regard to the conditions of the input signals A and B.

A 5-way, 3-position, all ports blocked configuration may be provided by providing that the configuration signal C1 is grounded (indicated as 0) and that the configuration signal C2 is floating (indicated as 1). During normal operations when the signal VDD is present, the high voltage output signals F1-F4 (with 0 indicating valve open and with 1 indicating valve closed) and the LED output signals LED-A and LED-B (with 0 indicating off and 1 indicating on) may be driven responsive to the input control signals A and B as indicated. When the configuration signal C3 is grounded and the signal VDD is interrupted, the HV output signals F1-F4 may be driven to the "00" state such that all of the valve chips are closed (i.e., both cylinder ports are isolated from high pressure and exhaust ports) without regard to the conditions of the input signals A and B. When the configuration signal C3 is floating (indicated as 1) and the signal VDD is interrupted, the HV output signals F1-F4 may be held in their last state at the time of the power interruption without regard to the conditions of the input signals A and B.

A 5-way, 3-position, cylinder ports energized configuration may be provided by providing that the configuration signal C1 is floating (indicated as 1) and that the configuration signal C2 is grounded (indicated as 0). During normal operations when the signal VDD is present, the high voltage output signals F1-F4 (with 0 indicating valve open and with 1 indicating valve closed) and the LED output signals LED-A and LED-B (with 0 indicating off and 1 indicating on) may be driven responsive to the input control signals A and B as indicated. When the configuration signal C3 is grounded and the signal VDD is interrupted, the HV output signals F1-F4 may be driven to the "00" state such that the first and fourth valve chips are closed and the second and third valve chips are opened (i.e., both actuator ports are energized) without regard to the conditions of the input signals A and B. When the configuration signal C3 is floating (indicated as 1) and the signal VDD is interrupted, the HV output signals F1-F4 may be held in their last state at the time of the power interruption without regard to the conditions of the input signals A and B.

A 5-way, 2-position configuration may be provided by providing that the configuration signals C1 and C2 are floating (indicated as 1). Here, only one input control signal B is used, and the input control signal A is thus in a "don't care" condition. During normal operations when the signal VDD is present, the high voltage output signals F1-F4 (with 0 indicating valve open and with 1 indicating valve closed) and the LED output signals LED-A and LED-B (with 0 indicating off and 1 indicating on) may be driven responsive to the input control signal B as indicated. When the configuration signal C3 is grounded and the signal VDD is interrupted, the HV output signals F1-F4 may be driven to the "0" state such that the first and third valve chips are opened and the second and fourth valve chips are closed without regard to the conditions of the input signals A and B. When the configuration signal C3 is floating (indicated as 1) and the signal VDD is interrupted, the HV output signals F1-F4 may be held in their last state at the time of the power interruption without regard to the conditions of the input signals A and B.

When a voltage is applied to an electrostatically actuated valve chip continuously for a sufficient period of time, charge build-up may cause deactivation delays. As applications according to some embodiments of the present invention may require that a given state be maintained for days or even weeks, charge build-up may need to be reduced. By periodically reversing the polarity of the applied voltage in this situation, residual charges can be reduced thereby reducing charge build-up and associated actuation delays. Because the valve chip is electrostatic, the polarity of the applied voltage does not matter. Moreover, if the polarity can be reversed before the valve chip can fully open, physical operation of the device may not be significantly affected.

Accordingly, the circuit may be configured to periodically reverse the polarity of a HV output signal (e.g., F1, F2, F3, and/or F4) applied to a valve chip being held closed for a significant period of time to thereby reduce charge build-up. With an on-chip oscillator used in the high voltage generation circuit 2013, a signal can be derived for timing of the polarity switching. An absolute period of the oscillation may not be critical for any of the functions of the high voltage generation circuit.

A minimum length of time ($t_{rev}$) to wait between polarity reversals may be determined based on characteristics of the valve chips being used. Since charge build-up may also occur when the battery is being used to hold the valve chip states during loss of the external power supply signal VDD, polarity reversals may also be provided throughout power interruptions. Accordingly, polarity reversals may be triggered when the HV generation circuit 2013 is periodically activated during power outages so that continuous operation of oscillators of the HV generation circuit is not required during power outages. Moreover, if the input control signals A and B change state during a polarity reversal operation, the polarity reversal may be completed before responding to the new input control signal command.

When switching from one state to another, product functionality may require that the sequence controller circuit 2019 provide a controlled sequence of deactivations and/or activations during a transition from one operational state to the next as discussed above, for example, with respect to FIGS. 4A-F. In other words, a timed sequence of output states may be desired after a control input signal changes and/or after a power status changes. Moreover, polarity reversals may include sequencing through a series of intermediate states during execution thereof. More particularly, sequencing through intermediate states may provide that specific output combinations do not occur for even an instant, and that certain intermediate conditions are given sufficient time to settle.

As shown in Table 1 of FIG. 43, there may be 5 unique operational states of the HV output signals F1-F4 (0101, 1010, 1111, 0110 and 1001) and 14 different transition from one operational state to another. Examples of sequences for all 14 state changes are shown in FIG. 44 according to some embodiments of the present invention. FIG. 44 also illustrates sequences that may be used to execute the 5 polarity reversal transitions (for each of the five operational states). In addition, a minimum time delay ($t_{del}$) may be provided before switching to the states indicated in bold. In addition, the polarity reversal sequences of FIG. 44 may occur during power loss modes. Accordingly, high voltage signal transitions may be required using battery power during power outages.

A valve chip having its polarity reversed first goes through a state where zero volts is applied across it. These points of zero crossings are indicated with over-line (i.e., "$\overline{0}$") in FIG. 44. After the circuit 2001 achieves an over-lined state where both HV output signals of a pair (e.g., F1 and F3, or F2 and F4) are driven with zero potential difference relative to the respective shared common signal (e.g., HComO or HComE), the polarity of the shared common signal relative to the respective HV output signal pair can be reversed. If the HV output signals were initially at a high voltage potential relative to the respective shared common signal at the beginning of the polarity reversal operation, the pair of high voltage output signals and the respective shared common signal may all be pulled to the high voltage potential during the transition, and then the pair of high voltage output signals may be pulled to a low voltage potential relative to the respective shared common signal. If the HV output signals were initially at a low voltage potential relative to the respective shared common signal at the beginning of the polarity reversal operation, the pair of high voltage output signals and the respective shared common signal may all be pulled to the low voltage potential during the transition, and then the pair of high voltage output signals may be pulled to a high voltage potential relative to the respective shared common signal.

FIGS. 45A-B provide a summary of input/output signals and/or pins of the circuit 2001. Multiple bond pads may be provided for some of these pins to accommodate potential current surges.

Electrostatic Discharge (ESD) circuit protection may be provided within the circuit 2001 on all input/output pins of the circuit 2001 in compliance with IEC 61000-4-2, Compliance Level 2 (4 kV for contact). In addition, the input control signal pins (A and B) and the power supply pins (VDD and GND) may be provided with external Electrical Fast Transients (EFT) circuits per IEC 61000-4-4, to Compliance Level 4. In particular, a transient voltage suppressor TVS (for example, including two zener diodes) and/or a storage capacitor SC may be provided between the main power supply signal/pin VDD and the ground signal/pin GND. In addition, a diode RP1 may be provided between the external power supply Vcc and the main power supply signal/pin VDD. In addition, diodes RP2 and RP3 may be provided for the input control signals/pins A and B. FIGS. 46A-B provide design parameters for the circuit 2001 according to some embodiments of the present invention.

A Transient Voltage Suppressor TVS may include a pair of zener diodes connected between the input power supply signal Vcc/VDD and ground GND. The zener diodes may be placed in series with their cathodes connected as shown in FIG. 42. The transient voltage suppressor TVS may provide over-voltage protection and may provide protection from relatively large, fast transients. The transient voltage suppressor TVS may be located relatively distant from the circuit 2001 on the printed circuit board for the electronics sub-assembly to facilitate reliable transient protection. Volumes, thicknesses, widths, lengths, and materials for traces of the printed circuit board from the electronics sub-assembly may be selected to provide effective signal paths for normal operations and also to provide transient protection at elevated temperatures.

A reverse polarity diode RP1 may also be provided in series with the circuit 2001 between the power supply pin VDD and the external power supply Vcc (such as a 24 Volt DC external power supply), and the reverse polarity diode RP1 may provide reverse polarity protection for the circuit 2001. Additional diodes RP2 and RP3 may provide reverse polarity protection for input control signals/pins A and B. A storage capacitor SC may be provided in parallel with the transient voltage suppressor TVS, and the storage capacitor SC may provide low pass filtering. The storage capacitor SC may also act as a storage device to provide power to the circuit 2001 during loss of external power. After external power (i.e., Vcc) is lost, the storage capacitor SC may source sufficient electrical current so that the circuit 2001 may detect the power loss and/or begin transition to a power loss operational mode until the circuit can switch to the battery 3013.

The high voltage generation circuit 2013 may generate the high voltage HVDD using resistors RL and/or RH and inductors LL and/or LH to create inductive kickback used to charge the storage capacitor HVSC. The resistors RL and/or RH may be used to limit a maximum kickback voltage, to thereby generate a sufficiently high voltage without damaging switching circuits of the high voltage generation circuit 2013.

A rate of current change in an inductor is dependent on a voltage applied across it. A voltage across an inductor can be calculated using the equation: V=L (di/dt), and providing a voltage across an inductor may cause the current through the inductor to rise as a ramp. If a switch sourcing/sinking current to/from the inductor is opened, a voltage across the inductor will rise because the current through the inductor cannot change suddenly due to the inductor property that V=L di/dt.

When the switch is opened, the voltage across the inductor will suddenly rise to a level sufficient to force current to flow. By providing the resistors RL and RH in parallel with the inductors LL and LH, a maximum current generated by the inductors can be limited and the possibility of damaging the circuit 2001 can be reduced. As shown in FIG. 41, the inductive kickback circuit including inductor LH and resistor RH may be used to charge the high voltage storage capacitor HVSC through the charging diode CD1. During power outages, the inductive kickback circuit including inductor LL and resistor RL may be used to charge the storage capacitor SC through the charging diode CD2.

Figure 47A:
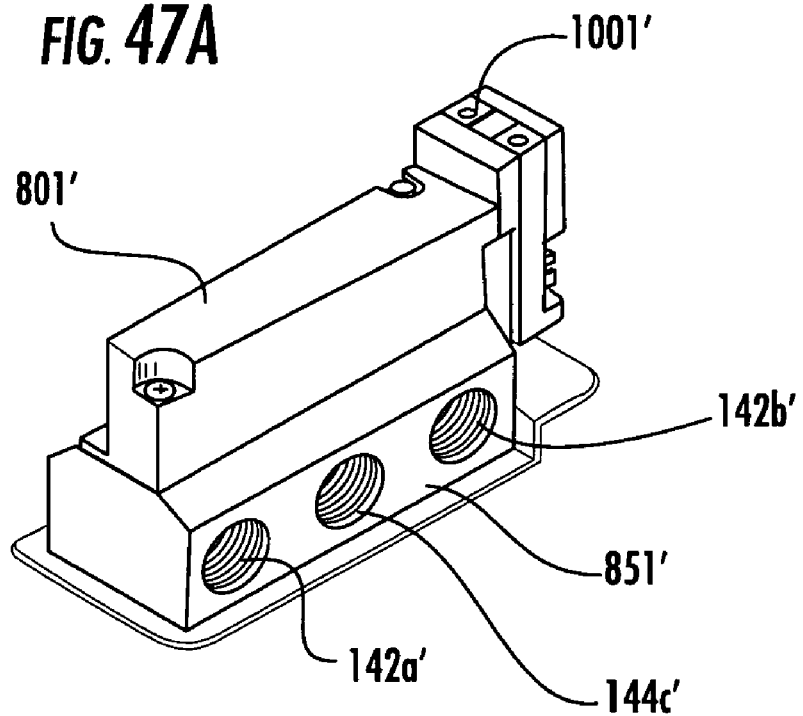
FIGS. 47A and 47B are front and back perspective views of a valve assembly including a valve housing, a base, and an electronics sub-assembly according to some embodiments of the present invention.
Figure 47B:
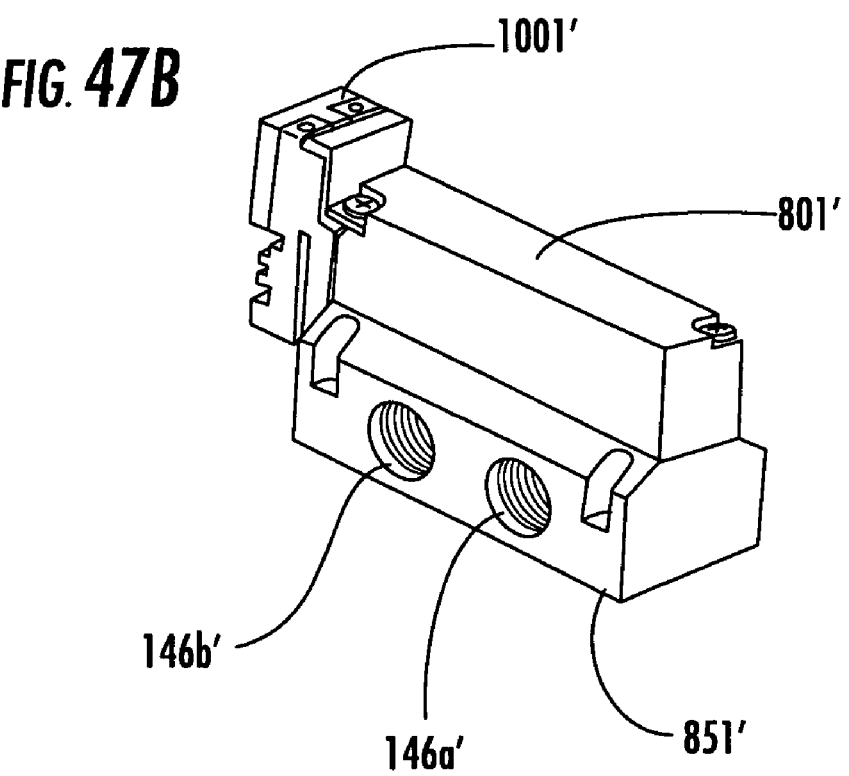

FIGS. 47A and 47B are front and back perspective views of a valve assembly including a valve housing 801', a base 851', and an electronics sub-assembly 1001' according to some embodiments of the present invention. In the assembly of FIGS. 47A-B, all couplings to supply, exhaust, and actuator ports may be provided through the base 851'. As shown, threaded couplings 146a' and 146b' may provide actuator ports for a pneumatic cylinder, threaded couplings 142a' and 142b' may provide exhaust ports; and threaded coupling 144c' may provide a high pressure supply port. The valve assembly of FIGS. 47A-B may thus provide the same functionalities as discussed above with respect to valve assemblies and components of FIGS. 28-40. Moreover, the electronics sub-assembly 1001' may be identical to electronic sub-assemblies discussed above with respect to FIGS. 33, 35-36, and 39-40.

Moreover, the valve housing 801' may be identical to the valve housings 801 of FIGS. 28-34 and 39-40 with the exception that there are no ports (i.e., banjo fittings 815a-b or collets 819a-b) on the surface of the valve housing 801' opposite the base 851'. As shown in FIGS. 47A-B a surface of the valve housing 801' opposite the base 851' may be flat with no openings therein. The interior of the valve housing 801', however, may include chambers, valve enclosures, leads, etc. as discussed above with respect to FIGS. 28-34 and 39-40.

The valve housing 801' of FIGS. 47A-B and the valve housing 801 of FIGS. 28-34 and 39-40 may be produced using some shared tooling. More particularly, a same lower molding tool may be used to mold lower portions of the valve housings 801 and 801', wherein the same lower molding tool defines the chambers and valve enclosures of the valve housings 801 and 801'. Different upper molding tools may be used to mold different upper portions of the valve housings 801 and 801'. More particularly, the same lower molding tool may be used together with a first upper molding tool to mold the valve housing 801 including the banjo fittings 815a-b, and the same lower molding tool may be used together with a second upper molding tool to mold the valve housing 801' without openings in the surface of the valve housing 801' opposite the base 851'.

Figure 48:
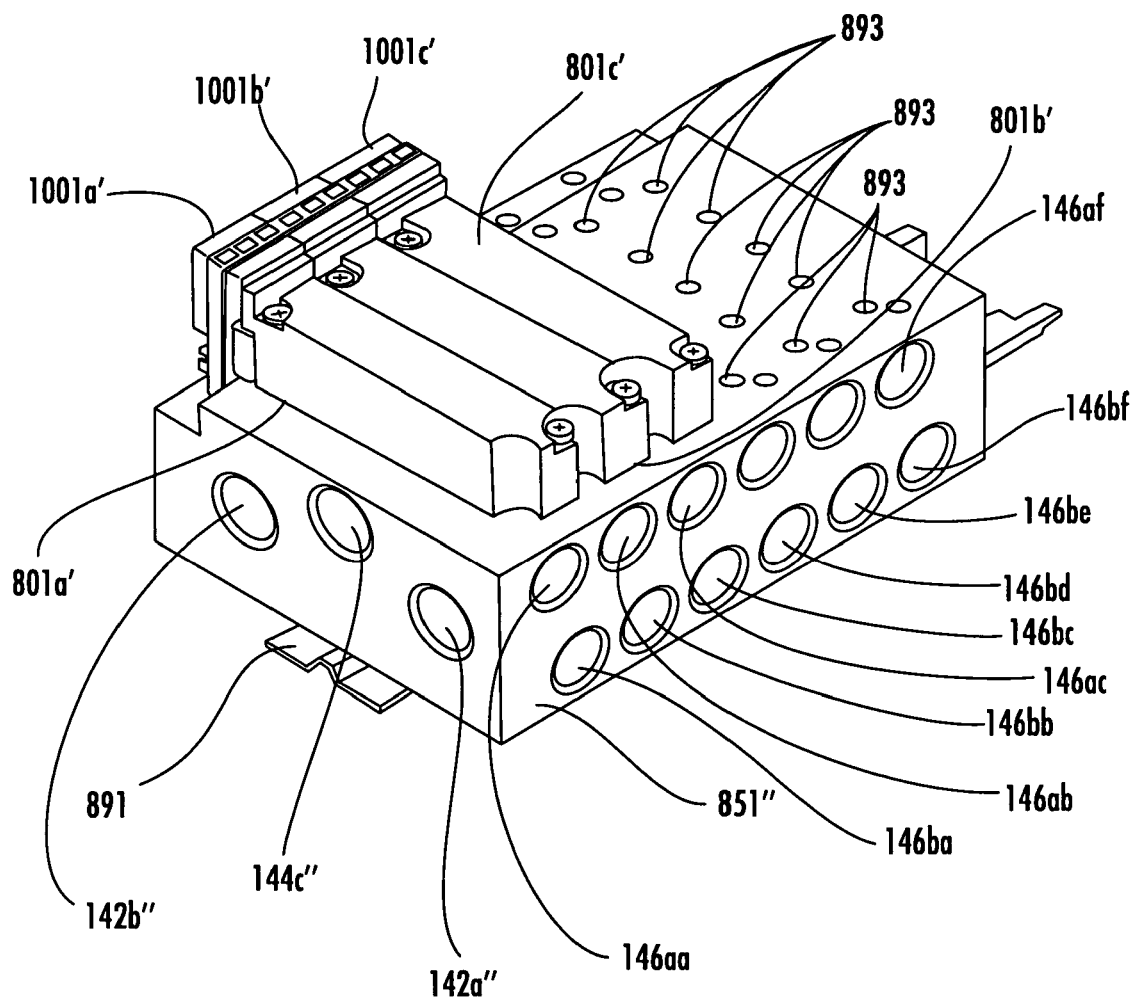
FIG. 48 is a perspective view of a common base configured to receive a plurality of valve housings and electronics sub-assemblies according to some embodiments of the present invention.

As shown in FIG. 48, an extruded aluminum manifold base 851" may provide the same supply port 144c" and exhaust ports 144a-b' for a plurality of valve housings 801a' to 801c' and electronic sub-assemblies 1001a' to 1001c', with the valve housings and electronic sub-assemblies provided as discussed above with respect to FIGS. 47A-B. Moreover, the manifold base 851" may provide separate pairs of actuator ports 146aa to 146af and 146ba to 146bf for each valve housing. Fluid coupling may thus be provided between the supply port 144c" and supply chambers of each of the valve housings 801a' to 810c'. Similarly, fluid coupling may be provided between the exhaust ports 142a" and 142b" and respective exhaust chambers of each of the valve housings 801a' to 810c'. In contrast, actuator ports 146aa and 146ba may be coupled to respective actuator chambers of the valve housing 801a'; actuator ports 146ab and 146bb may be coupled to respective actuator chambers of the valve housing 801b'; and actuator ports 146ac and 146bc may be coupled to respective actuator chambers of the valve housing 801c'.

Additional actuator ports 146ad to 146af and 146bd to 146bf may be provided for additional valve housings coupled to the manifold base 851". The manifold base 851" illustrated in FIG. 48, for example, is configured to accept six valve assemblies. If fewer than six valve housings are used with the manifold base 851" of FIG. 48, unused valve housing positions may be capped to reduce leakage from the supply port 144c". As shown in FIG. 48, each valve housing position on the manifold base 851" includes couplings 893 to the respective actuator ports and to the supply and exhaust ports. If a valve housing is not provided at a valve housing position of the manifold base 851", the couplings 893 (or at least the coupling to the supply port 144c") may be capped to reduce leakage(s). In addition, the manifold base 851" may be provided with a standard connector such as a connector for a DIN rail 891 (according to the Deutsche Industry Norm standard).

The manifold base 851", for example, may be may be machined from an extruded aluminum profile, and may be mounted on a DIN Rail. The supply port 144c" and the exhaust ports 142a" and 142b" may be formed by extrusion. The actuator ports 146aa to 146af and 146ba to 146bf may be machined into the manifold base 851" from a direction perpendicular to the supply and exhaust ports. The couplings 893 for the valve housings to the supply port, the exhaust ports, and the actuator ports may be machined into the manifold base from a direction perpendicular to the supply and exhaust ports and perpendicular to the actuator ports.

Valve chips and/or valve assemblies according to embodiments of the present invention may also be used in vacuum applications. As shown in FIGS. 49A and 49B, for example, a valve assembly 4141 may define three chambers 4143a-c separated by two valve chips 4131a-b supported in valve enclosures of the valve assembly. In addition, a vacuum port 4142 may be coupled to a vacuum pump, a relief port 4144 may be coupled to a pressure relief source (such as the atmosphere), and the output port 4146 may be coupled to a vacuum tool 4148 (such as a vacuum wand used in microelectronics fabrication industries to handle microelectronic wafers).

As shown in FIG. 49A, a vacuum may be applied by the vacuum tool 4148 by opening valve flaps of the valve chip 4131a while closing valve flaps of the valve chip 4131b so that the output port 4146 is coupled with the vacuum port 4143a through valve chip 4131a. As shown in FIG. 49B, a vacuum may be removed from the vacuum tool 4148 by opening valve flaps of the valve chip 4131b while closing valve flaps of the valve chip 4131a so that the output port 4146 is coupled with the relief port 4143b through valve chip 4131b. While not shown in FIGS. 49A-B, the valve chips 4131a-b may be operated under control of a controller responsive to user and/or other inputs.

The valve assembly 4141 may be provided, for example, using the valve housing 801 of FIGS. 28-30 with plugs used to seal valve enclosures 803c-d closed. In an alternative, a three chamber valve assembly may be provided. Moreover, filters may be provided in one or more of the chambers 4143a-c to protect the valve chips 4131a-b. Moreover, the valve chips 4131a-b may be packaged as discussed above with respect to FIGS. 6-9 and/or 24-27, and/or baffles may be provided with the valve chips 4131a-b as discussed above with respect to FIGS. 23-26.

According to some embodiments of the present invention, a valve assembly and associated controls may be operated using a relatively low power battery (such as a battery 513 of FIGS. 15-17, battery 1013 of FIG. 36, and/or battery 3013 of FIG. 42) without an external power supply. Moreover, control signals can be provided via optical communication, radio frequency communication, and/or other wireless communication so that no electrical connections are required. Such a valve assembly may thus satisfy Intrinsically Safe (IS) requirement standards for IS applications.

Moreover, microelectromechanical systems (MEMS) valves according to some embodiments of the present invention may operate with lower wear than conventional mechanical valves. MEMS valves according to some embodiments of the present invention may thus generate fewer particulates (resulting from wear). Accordingly, MEMS valves according to some embodiments of the present invention may be especially useful in applications that are most sensitive to contamination, such as in the semiconductor industry, the pharmaceutical industry, the medical industry, the bio-medical industry, etc.

Figure 50A:
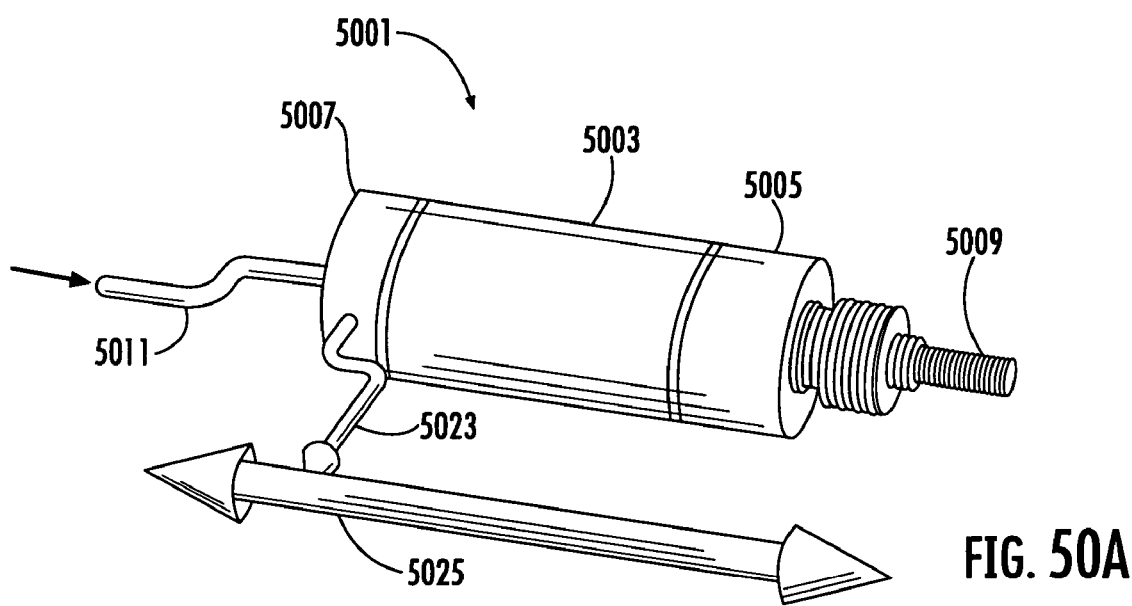
FIGS. 50A and 50B are perspective and cross-sectional views of an integrated pneumatic valve and cylinder assembly according to embodiments of the present invention.
Figure 50B:
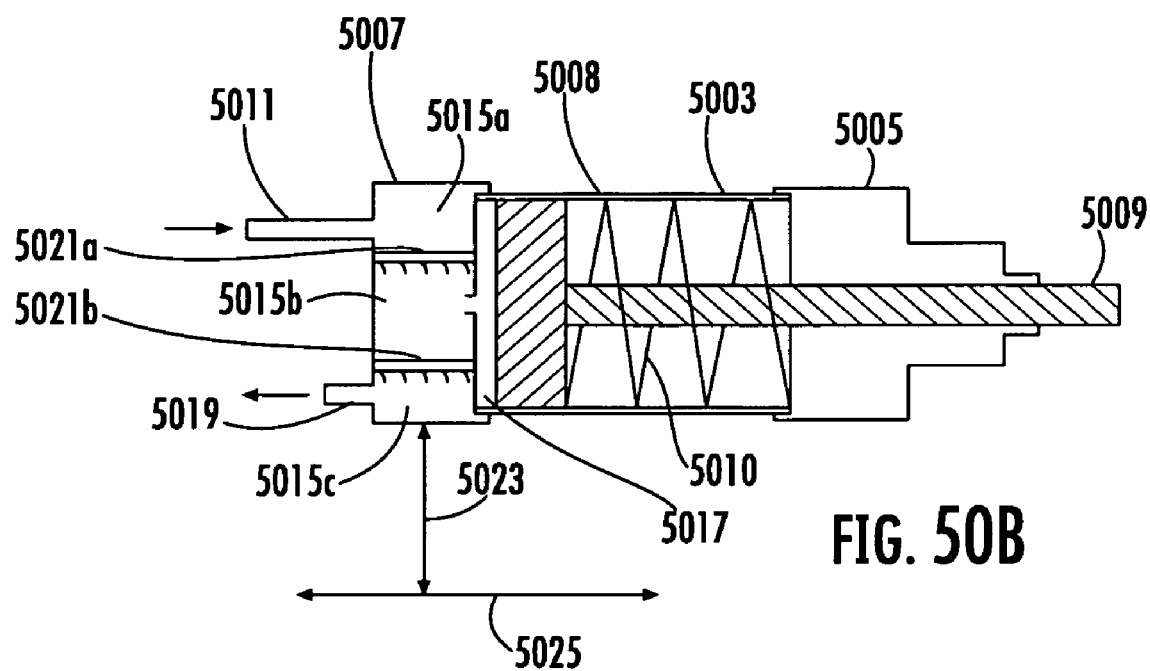

FIG. 50A is a perspective view of an integrated pneumatic valve and cylinder assembly 5001 according to embodiments of the present invention, and FIG. 50B is a cross-sectional view of the assembly 5001 of FIG. 50A. Dimensions of elements of FIGS. 50A-B may be exaggerated for clarity. More particularly, the assembly may include a cylinder tube 5003 (such as a rigid metal cylindrical tube), first and second end caps 5005 and 5007, a piston 5008 in the cylinder tube 5003, and a rod 5009 coupled to the piston 5008 and extending through the first end cap 5005. In addition, a spring 5010 may be provided in the cylinder tube 5003 to push the piston 5008 and rod 5009 to a retracted (default) position in an unpowered (i.e., an exhausted) state.

As shown in FIG. 50B, the second end cap 5007 may define first, second, and third valve chambers 5015a-c. The first valve chamber 5015a may be configured to be coupled to a high pressure supply 5011, the second valve chamber 5015b may be configured to be coupled to a cavity 5017 within the tube cylinder 5003, and the third valve chamber may be configured to be coupled to a low pressure exhaust 5019. In addition, electro-statically actuated valve chips 5021a-b may be provided in the second end cap 5007. More particularly, the valve chip 5021a may be provided between the first and second valve chambers 5015a and 5015b, and the valve chip 5021a may be configured to allow fluid communication from the first valve chamber 5015a to the second valve chamber 5015b or to block fluid communication between the first and second valve chambers 5015a and 5015b responsive to electrical signals applied thereto. Similarly, the valve chip 5021b may be provided between the second and third valve chambers 5015b and 5015c, and the valve chip 5021b may be configured to allow fluid communication from the second valve chamber 5015b to the second third valve chamber 5015c or to block fluid communication between the second and third valve chambers 5015b and 5015c responsive to electrical signals applied thereto.

Electrical signals may be provided to the first and second valve chips 5021a-b via a coupling 5023 to an electrical bus 5025. For example, extend and retract signals may be received at the second end cap 5007 from a programmable logic controller (PLC) over the electronic bus 5025 and coupling 5023 with a control circuit at the second end cap 5007 generating the high voltage signals and/or providing logic for sequencing, power loss operations, polarity reversal, etc. In an alternative, some or all processing of extend and retract signals may occur outside the second end cap 5007.

Accordingly, the valve chips 5021a-b may provide 3-way valve functionality to control extension and retraction of the piston 5008 and rod 5009. In a first condition, the valve chip 5021a may be closed to substantially block fluid communication between the first and second valve chambers 5015a-b, and the second valve chip 5021b may be opened to allow fluid communication between the second and third valve chambers 5015b-c. Accordingly, the cavity 5017 may be coupled through the second valve chip 5021b to the low pressure exhaust 5019 so that the spring 5010 pushes the piston 5008 and rod 5009 to the retracted position.

In a second condition, the valve chip 5021a may be opened to allow fluid communication between the first and second valve chambers 5015a-b, and the second valve chip 5021b may be closed to substantially block fluid communication between the second and third valve chambers 5015b-c. Accordingly, the cavity 5017 may be coupled through the first valve chip 5021a to the high pressure supply 5019 so that the piston 5008 and rod 5009 are pushed to the extended position thereby compressing the spring 5010.

Five-way valve functionality may be provided, for example, by similarly including two valve chips in the first end cap 5005 to thereby control a coupling of supply and exhaust pressures to a second cavity of the cylinder tube 5003 between the piston 5008 and the first end cap 5005. Accordingly, electrical and pressure couplings may be provided at both end caps. In an alternative, 5-way operations may be provided using four valve chips provided at one of the end caps with a pneumatic coupling(s) provided between the two end caps. With five-way valve operations, the spring 5010 may not be required.

The end caps 5005 and 5007 and the cylinder tube 5003 may be formed separately and then assembled. Ends of the cylinder tube 5003, for example, may be threaded to receive female threads of the respective end caps 5005 and 5007, or the tube and end caps may be assembled by other means known to those having skill in the art.

The valve chips 5021a-b may be provided and/or packaged as discussed above with respect to FIG. 1-2, 5-9, and/or 24-27, and the end cap 5007 may be formed of a rigid material by molding, turning (e.g., on a lathe), machining and/or other means known to those having skill in the art. After forming the end cap 5007 including the valve chambers 5015a-c, the valve chips can be inserted into an opening(s) in the end cap 5007, and a base can be secured to the opening(s) in the end cap 5007 before securing the end cap 5007 (with the valve chips and base) to the cylinder tube 5008. The end cap 5007 may thus provide a rigid valve housing, the first and second valves 5015a-b may be provided in the rigid valve housing defined by the end cap 5007, and the rigid valve housing defined by the end cap 5007 may be mounted directly to the cylinder tube 5003. Accordingly, a fluid seal may be provided between the valve housing defined by the end cap 5007 and the cylinder tube 5003.

While embodiments of the present invention have been discussed above with valve assemblies used to control pneumatic actuators including rods, valve assemblies according to embodiments of the present invention can also be used to control pneumatic actuators including rodless cylinders such as magnetically coupled cylinders and/or rotary actuators. For example, the rod 5009 may be eliminated from the structure of FIGS. 50A-B, and a magnet may be coupled to the piston 5008 inside the cylinder tube 5003. Accordingly, movement of the magnet with the piston 5008 inside the cylinder tube 5003 may be used to affect movement of a carriage outside the cylinder tube 5003.

While the present invention has been particularly shown and described with reference to embodiments thereof, it will be understood by those skilled in the art that various changes in form and details may be made therein without departing from the spirit and scope of the invention as defined by the appended claims and their equivalents.

That which is claimed is:

1. A valve comprising:
   a substrate having first and second opposing faces, a hole through the substrate between the first and second faces, and a pair of input pads thereon;
   a movable valve member on the substrate with the movable valve member being associated with the hole in the substrate, wherein the movable valve member is configured to open or substantially block the hole responsive to an electrical signal applied to the pair of input pads;
   a frame surrounding and supporting the substrate at edges thereof so that central portions of the first and second faces of the substrate are exposed through an opening in the frame and so that a fluid seal is provided between the frame and edges of the substrate; and
   a baffle on the frame and spaced apart from the substrate, the baffle having at least one opening therethrough, wherein the baffle and the substrate define a baffle chamber therebetween and wherein the opening through the baffle defines a width that is less than a width of the baffle chamber in a direction parallel with respect to a surface of the substrate.

2. A valve according to claim 1 wherein the movable valve member comprises a flexible valve flap.

3. A valve according to claim 2 wherein the flexible valve flap is mechanically coupled with the substrate along a single continuous segment.

4. A valve according to claim 1 further comprising:
   first and second conductive leads in the frame, the first and second conductive leads being electrically coupled to the respective input pads on the substrate.

5. A valve according to claim 4 wherein portions of the first and second conductive leads are exposed along an outside edge of the frame.

6. A valve according to claim 4 wherein the first and second conductive leads are wire bonded to the respective input pads.

7. A valve according to claim 1 wherein the frame has a thickness greater than a thickness of the substrate and wherein the frame includes a recessed ledge along the opening in the frame with the edges of the substrate being supported by the recessed ledge.

8. A valve according to claim 7 wherein the edges of the substrate are secured to the recessed ledge using an adhesive.

9. A valve according to claim 1 wherein the valve member is between the substrate and the baffle.

10. A valve according to claim 1 wherein the baffle provides a restriction to fluid flow in series with the hole through the substrate.

11. A valve according to claim 1 wherein the baffle, the frame and the substrate define an enclosure with the movable valve member being included in the enclosure.

12. A valve according to claim 1 wherein the frame comprises a rigid polymer material.

13. A valve according to claim 1 wherein the movable valve member comprises an electro-statically actuated valve flap configured to open or substantially block the hole in the substrate in response to the electrical signal applied to the pair of input pads.

14. A valve according to claim 1 further comprising:
   a fixed electrode on/in the substrate wherein the fixed electrode is electrically coupled with a first one of the pair of input pads on the substrate; and
   a movable electrode on/in the movable valve member wherein the movable electrode is electrically coupled with a second one of the pair of input pads on the substrate, wherein the moveable valve member is configured to open or substantially block the hole in the substrate in response to electro-static forces generated between the fixed and movable electrodes.

15. A valve according to claim 1 wherein the substrate has a second hole through the substrate between the first and second faces, the valve further comprising:
   a second movable valve member on the substrate with the second movable valve member being associated with the second hole in the substrate.

16. A valve according to claim 15 wherein the second movable valve member is configured to open or substantially block the second hole responsive to an electrical signal applied to the pair of input pads.

17. A valve comprising:
   a substrate having first and second opposing faces, a hole through the substrate between the first and second faces, and a pair of input pads thereon;
   a movable valve member on the substrate with the movable valve member being associated with the hole in the substrate, wherein the movable valve member is configured to open or substantially block the hole responsive to an electrical signal applied to the pair of input pads;
   a frame surrounding and supporting the substrate at edges thereof so that central portions of the first and second faces of the substrate are exposed through an opening in the frame and so that a fluid seal is provided between the frame and edges of the substrate; and
   first and second conductive leads in the frame, the first and second conductive leads being electrically coupled to the respective input pads on the substrate wherein portions of the first and second conductive leads are exposed along an outside edge of the frame wherein the exposed portions of the first and second conductive leads are oriented in a direction substantially perpendicular with respect to the substrate wherein a length of each of the exposed portions of the leads in the direction substantially perpendicular with respect to the substrate is substantially greater than a width of the exposed portions of each of the leads in a direction substantially parallel with respect to the substrate.

18. A valve according to claim 17 wherein the movable valve member comprises a flexible valve flap.

19. A valve according to claim 17 wherein the exposed portions of the first and second conductive leads are exposed through slots in the frame wherein each slot defines at least one sidewall spaced apart from the respective lead so that a recessed side of each of the leads is exposed adjacent the respective spaced apart sidewall of a respective slot.

20. A valve according to claim 17 wherein the first and second conductive leads are wire bonded to the respective input pads.

21. A valve according to claim 17 wherein the frame has a thickness greater than a thickness of the substrate and wherein the frame includes a recessed ledge along the opening in the frame with the edges of the substrate being supported by the recessed ledge.

22. A valve according to claim 21 further comprising:
   a flexible gasket between the recessed ledge and the edges of the substrate.

23. A valve according to claim 22 wherein the edges of the substrate are secured to the flexible gasket and the recessed ledge with portions of the frame overlapping edges of the substrate opposite the recessed ledge.

24. A valve according to claim 21 wherein the edges of the substrate are secured to the recessed ledge using an adhesive.

25. A valve according to claim 17 further comprising:
   a baffle on the frame and spaced apart from the substrate, the baffle having at least one opening therethrough.

26. A valve according to claim 25 wherein the valve member is between the substrate and the baffle.

27. A valve according to claim 25 wherein the baffle and the substrate define a baffle chamber therebetween wherein the opening through the baffle defines a width that is less than a width of the baffle chamber in a direction parallel with respect to a surface of the substrate.

28. A valve according to claim 25 wherein the baffle provides a restriction to fluid flow in series with the hole through the substrate.

29. A valve according to claim 25 wherein the baffle has a wedge shape.

30. A valve according to claim 29 further comprising:
first and second conductive leads on a first edge of the frame, the first and second conductive leads being electrically coupled to the respective input pads on the substrate, wherein a thin portion of the baffle is adjacent the first edge of the frame and wherein a wide portion of the baffle is adjacent a second edge of the frame opposite the first edge.

31. A valve according to claim 25 wherein the baffle, the frame and the substrate define an enclosure with the movable valve member being included in the enclosure.

32. A valve according to claim 25 further comprising:
a flexible gasket on the frame such that the frame is between the flexible gasket and the baffle.

33. A valve according to claim 17 further comprising:
a flexible gasket on the frame with the substrate being recessed in the frame relative to the gasket, the flexible gasket defining an opening therein having dimensions greater than dimensions defined by a perimeter of the substrate.

34. A valve according to claim 17 wherein the frame comprises a rigid polymer material.

35. A valve comprising:
a substrate having first and second opposing faces, a hole through the substrate between the first and second faces, and a pair of input pads thereon;
a movable valve member on the substrate with the movable valve member being associated with the hole in the substrate, wherein the movable valve member is configured to open or substantially block the hole responsive to an electrical signal applied to the pair of input pads;
a frame surrounding and supporting the substrate at edges thereof so that central portions of the first and second faces of the substrate are exposed through an opening in the frame and so that a fluid seal is provided between the frame and edges of the substrate; and
first and second conductive leads in the frame, the first and second conductive leads being electrically coupled to the respective input pads on the substrate wherein portions of the first and second conductive leads are exposed along an outside edge of the frame wherein the exposed portions of the first and second conductive leads are exposed through slots in the frame wherein each slot defines at least one sidewall spaced apart from the respective lead so that a recessed side of each of the leads is exposed adjacent the respective spaced apart sidewall of a respective slot.

36. A valve according to claim 35 wherein the movable valve member comprises a flexible valve flap.

37. A valve according to claim 35 wherein the exposed portions of the first and second conductive leads are oriented in a direction substantially perpendicular with respect to the substrate wherein a length of each of the exposed portions of the leads in the direction substantially perpendicular with respect to the substrate is substantially greater than a width of the exposed portions of each of the leads in a direction substantially parallel with respect to the substrate.

38. A valve according to claim 35 wherein the first and second conductive leads are wire bonded to the respective input pads.

39. A valve according to claim 35 wherein the frame has a thickness greater than a thickness of the substrate and wherein the frame includes a recessed ledge along the opening in the frame with the edges of the substrate being supported by the recessed ledge.

40. A valve according to claim 39 further comprising:
a flexible gasket between the recessed ledge and the edges of the substrate.

41. A valve according to claim 40 wherein the edges of the substrate are secured to the flexible gasket and the recessed ledge with portions of the frame overlapping edges of the substrate opposite the recessed ledge.

42. A valve according to claim 39 wherein the edges of the substrate are secured to the recessed ledge using an adhesive.

43. A valve according to claim 35 further comprising:
a baffle on the frame and spaced apart from the substrate, the baffle having at least one opening therethrough.

44. A valve according to claim 43 wherein the valve member is between the substrate and the baffle.

45. A valve according to claim 43 wherein the baffle and the substrate define a baffle chamber therebetween wherein the opening through the baffle defines a width that is less than a width of the baffle chamber in a direction parallel with respect to a surface of the substrate.

46. A valve according to claim 43 wherein the baffle provides a restriction to fluid flow in series with the hole through the substrate.

47. A valve according to claim 43 wherein the baffle has a wedge shape.

48. A valve according to claim 47 further comprising:
first and second conductive leads on a first edge of the frame, the first and second conductive leads being electrically coupled to the respective input pads on the substrate, wherein a thin portion of the baffle is adjacent the first edge of the frame and wherein a wide portion of the baffle is adjacent a second edge of the frame opposite the first edge.

49. A valve according to claim 43 wherein the baffle, the frame and the substrate define an enclosure with the movable valve member being included in the enclosure.

50. A valve according to claim 43 further comprising:
a flexible gasket on the frame such that the frame is between the flexible gasket and the baffle.

51. A valve according to claim 35 further comprising:
a flexible gasket on the frame with the substrate being recessed in the frame relative to the gasket, the flexible gasket defining an opening therein having dimensions greater than dimensions defined by a perimeter of the substrate.

52. A valve according to claim 35 wherein the frame comprises a rigid polymer material.

53. A valve comprising:
a substrate having first and second opposing faces, a hole through the substrate between the first and second faces, and a pair of input pads thereon;
a movable valve member on the substrate with the movable valve member being associated with the hole in the substrate, wherein the movable valve member is configured to open or substantially block the hole responsive to an electrical signal applied to the pair of input pads;
a frame surrounding and supporting the substrate at edges thereof so that central portions of the first and second faces of the substrate are exposed through an opening in the frame and so that a fluid seal is provided between the frame and edges of the substrate wherein the frame has a thickness greater than a thickness of the substrate and wherein the frame includes a recessed ledge along the opening in the frame with the edges of the substrate being supported by the recessed ledge; and
a flexible gasket between the recessed ledge and the edges of the substrate.

54. A valve according to claim 53 wherein the edges of the substrate are secured to the flexible gasket and the recessed ledge with portions of the frame overlapping edges of the substrate opposite the recessed ledge.

55. A valve according to claim 53 wherein the movable valve member comprises a flexible valve flap.

56. A valve according to claim 53 further comprising:
first and second conductive leads in the frame, the first and second conductive leads being electrically coupled to the respective input pads on the substrate.

57. A valve according to claim 56 wherein portions of the first and second conductive leads are exposed along an outside edge of the frame.

58. A valve according to claim 57 wherein the exposed portions of the first and second conductive leads are oriented in a direction substantially perpendicular with respect to the substrate wherein a length of each of the exposed portions of the leads in the direction substantially perpendicular with respect to the substrate is substantially greater than a width of the exposed portions of each of the leads in a direction substantially parallel with respect to the substrate.

59. A valve according to claim 5 wherein the exposed portions of the first and second conductive leads are exposed through slots in the frame wherein each slot defines at least one sidewall spaced apart from the respective lead so that a recessed side of each of the leads is exposed adjacent the respective spaced apart sidewall of a respective slot.

60. A valve according to claim 56 wherein the first and second conductive leads are wire bonded to the respective input pads.

61. A valve according to claim 53 wherein the edges of the substrate are secured to the recessed ledge using an adhesive.

62. A valve according to claim 53 further comprising:
a baffle on the frame and spaced apart from the substrate, the baffle having at least one opening therethrough.

63. A valve according to claim 62 wherein the valve member is between the substrate and the baffle.

64. A valve according to claim 62 wherein the baffle and the substrate define a baffle chamber therebetween wherein the opening through the baffle defines a width that is less than a width of the baffle chamber in a direction parallel with respect to a surface of the substrate.

65. A valve according to claim 62 wherein the baffle provides a restriction to fluid flow in series with the hole through the substrate.

66. A valve according to claim 62 wherein the baffle has a wedge shape.

67. A valve according to claim 66 further comprising:
first and second conductive leads on a first edge of the frame, the first and second conductive leads being electrically coupled to the respective input pads on the substrate, wherein a thin portion of the baffle is adjacent the first edge of the frame and wherein a wide portion of the baffle is adjacent a second edge of the frame opposite the first edge.

68. A valve according to claim 62 wherein the baffle, the frame and the substrate define an enclosure with the movable valve member being included in the enclosure.

69. A valve according to claim 62 further comprising:
a flexible gasket on the frame such that the frame is between the flexible gasket and the baffle.

70. A valve according to claim 53 further comprising:
a flexible gasket on the frame with the substrate being recessed in the frame relative to the gasket, the flexible gasket defining an opening therein having dimensions greater than dimensions defined by a perimeter of the substrate.

71. A valve according to claim 53 wherein the frame comprises a rigid polymer material.

72. A valve comprising:
a substrate having first and second opposing faces, a hole through the substrate between the first and second faces, and a pair of input pads thereon;
a movable valve member on the substrate with the movable valve member being associated with the hole in the substrate, wherein the movable valve member is configured to open or substantially block the hole responsive to an electrical signal applied to the pair of input pads; and
a frame surrounding and supporting the substrate at edges thereof so that central portions of the first and second faces of the substrate are exposed through an opening in the frame and so that a fluid seal is provided between the frame and edges of the substrate; and
a baffle on the frame and spaced apart from the substrate, the baffle having at least one opening therethrough wherein the baffle has a wedge shape.

73. A valve according to claim 72 further comprising:
first and second conductive leads on a first edge of the frame, the first and second conductive leads being electrically coupled to the respective input pads on the substrate, wherein a thin portion of the baffle is adjacent the first edge of the frame and wherein a wide portion of the baffle is adjacent a second edge of the frame opposite the first edge.

74. A valve according to claim 72 wherein the movable valve member comprises a flexible valve flap.

75. A valve according to claim 72 further comprising:
first and second conductive leads in the frame, the first and second conductive leads being electrically coupled to the respective input pads on the substrate.

76. A valve according to claim 75 wherein portions of the first and second conductive leads are exposed along an outside edge of the frame.

77. A valve according to claim 76 wherein the exposed portions of the first and second conductive leads are oriented in a direction substantially perpendicular with respect to the substrate wherein a length of each of the exposed portions of the leads in the direction substantially perpendicular with respect to the substrate is substantially greater than a width of the exposed portions of each of the leads in a direction substantially parallel with respect to the substrate.

78. A valve according to claim 76 wherein the exposed portions of the first and second conductive leads are exposed through slots in the frame wherein each slot defines at least one sidewall spaced apart from the respective lead so that a recessed side of each of the leads is exposed adjacent the respective spaced apart sidewall of a respective slot.

79. A valve according to claim 75 wherein the first and second conductive leads are wire bonded to the respective input pads.

80. A valve according to claim 72 wherein the frame has a thickness greater than a thickness of the substrate and wherein the frame includes a recessed ledge along the opening in the frame with the edges of the substrate being supported by the recessed ledge.

81. A valve according to claim 80 further comprising:
a flexible gasket between the recessed ledge and the edges of the substrate.

82. A valve according to claim 81 wherein the edges of the substrate are secured to the flexible gasket and the recessed ledge with portions of the frame overlapping edges of the substrate opposite the recessed ledge.

83. A valve according to claim 80 wherein the edges of the substrate are secured to the recessed ledge using an adhesive.

84. A valve according to claim 72 wherein the valve member is between the substrate and the baffle.

85. A valve according to claim 72 wherein the baffle and the substrate define a baffle chamber therebetween wherein the opening through the baffle defines a width that is less than a width of the baffle chamber in a direction parallel with respect to a surface of the substrate.

86. A valve according to claim 72 wherein the baffle provides a restriction to fluid flow in series with the hole through the substrate.

87. A valve according to claim 72 wherein the baffle, the frame and the substrate define an enclosure with the movable valve member being included in the enclosure.

88. A valve according to claim 72 further comprising:
a flexible gasket on the frame such that the frame is between the flexible gasket and the baffle.

89. A valve according to claim 72 further comprising:
a flexible gasket on the frame with the substrate being recessed in the frame relative to the gasket, the flexible gasket defining an opening therein having dimensions greater than dimensions defined by a perimeter of the substrate.

90. A valve according to claim 72 wherein the frame comprises a rigid polymer material.

91. A valve comprising:
a substrate having first and second opposing faces, a hole through the substrate between the first and second faces, and a pair of input pads thereon;
a movable valve member on the substrate with the movable valve member being associated with the hole in the substrate, wherein the movable valve member is configured to open or substantially block the hole responsive to an electrical signal applied to the pair of input pads;
a frame surrounding and supporting the substrate at edges thereof so that central portions of the first and second faces of the substrate are exposed through an opening in the frame and so that a fluid seal is provided between the frame and edges of the substrate;
a baffle on the frame and spaced apart from the substrate, the baffle having at least one opening therethrough; and
a flexible gasket on the frame such that the frame is between the flexible gasket and the baffle.

92. A valve according to claim 91 wherein the movable valve member comprises a flexible valve flap.

93. A valve according to claim 91 further comprising:
first and second conductive leads in the frame, the first and second conductive leads being electrically coupled to the respective input pads on the substrate.

94. A valve according to claim 93. wherein portions of the first and second conductive leads are exposed along an outside edge of the frame.

95. A valve according to claim 94 wherein the exposed portions of the first and second conductive leads are oriented in a direction substantially perpendicular with respect to the substrate wherein a length of each of the exposed portions of the leads in the direction substantially perpendicular with respect to the substrate is substantially greater than a width of the exposed portions of each of the leads in a direction substantially parallel with respect to the substrate.

96. A valve according to claim 94 wherein the exposed portions of the first and second conductive leads are exposed through slots in the frame wherein each slot defines at least one sidewall spaced apart from the respective lead so that a recessed side of each of the leads is exposed adjacent the respective spaced apart sidewall of a respective slot.

97. A valve according to claim 93 wherein the first and second conductive leads are wire bonded to the respective input pads.

98. A valve according to claim 91 wherein the frame has a thickness greater than a thickness of the substrate and wherein the frame includes a recessed ledge along the opening in the frame with the edges of the substrate being supported by the recessed ledge.

99. A valve according to claim 98 further comprising:
a flexible gasket between the recessed ledge and the edges of the substrate.

100. A valve according to claim 99 wherein the edges of the substrate are secured to the flexible gasket and the recessed ledge with portions of the frame overlapping edges of the substrate opposite the recessed ledge.

101. A valve according to claim 98 wherein the edges of the substrate are secured to the recessed ledge using an adhesive.

102. A valve according to claim 91 wherein the valve member is between the substrate and the baffle.

103. A valve according to claim 91 wherein the baffle and the substrate define a baffle chamber therebetween wherein the opening through the baffle defines a width that is less than a width of the baffle chamber in a direction parallel with respect to a surface of the substrate.

104. A valve according to claim 91 wherein the baffle provides a restriction to fluid flow in series with the hole through the substrate.

105. A valve according to claim 91 wherein the baffle has a wedge shape.

106. A valve according to claim 105 further comprising:
first and second conductive leads on a first edge of the frame, the first and second conductive leads being electrically coupled to the respective input pads on the substrate, wherein a thin portion of the baffle is adjacent the first edge of the frame and wherein a wide portion of the baffle is adjacent a second edge of the frame opposite the first edge.

107. A valve according to claim 91 wherein the baffle, the frame and the substrate define an enclosure with the movable valve member being included in the enclosure.

108. A valve according to claim 91 further comprising:
a flexible gasket on the frame with the substrate being recessed in the frame relative to the gasket, the flexible gasket defining an opening therein having dimensions greater than dimensions defined by a perimeter of the substrate.

109. A valve according to claim 91 wherein the frame comprises a rigid polymer material.

110. A valve comprising:
a substrate having first and second opposing faces, a hole through the substrate between the first and second faces, and a pair of input pads thereon;
a movable valve member on the substrate with the movable valve member being associated with the hole in the substrate, wherein the movable valve member is configured to open or substantially block the hole responsive to an electrical signal applied to the pair of input pads;

a frame surrounding and supporting the substrate at edges thereof so that central portions of the first and second faces of the substrate are exposed through an opening in the frame and so that a fluid seal is provided between the frame and edges of the substrate; and a flexible gasket on the frame with the substrate being recessed in the frame relative to the gasket, the flexible gasket defining an opening therein having dimensions greater than dimensions defined by a perimeter of the substrate.

111. A valve according to claim 110 wherein the movable valve member comprises a flexible valve flap.

112. A valve according to claim 110 further comprising:
first and second conductive leads in the frame, the first and second conductive leads being electrically coupled to the respective input pads on the substrate.

113. A valve according to claim 112 wherein portions of the first and second conductive leads are exposed along an outside edge of the frame.

114. A valve according to claim 113 wherein the exposed portions of the first and second conductive leads are oriented in a direction substantially perpendicular with respect to the substrate wherein a length of each of the exposed portions of the leads in the direction substantially perpendicular with respect to the substrate is substantially greater than a width of the exposed portions of each of the leads in a direction substantially parallel with respect to the substrate.

115. A valve according to claim 112 wherein the exposed portions of the first and second conductive leads are exposed through slots in the frame wherein each slot defines at least one sidewall spaced apart from the respective lead so that a recessed side of each of the leads is exposed adjacent the respective spaced apart sidewall of a respective slot.

116. A valve according to claim 112 wherein the first and second conductive leads are wire bonded to the respective input pads.

117. A valve according to claim 110 wherein the frame has a thickness greater than a thickness of the substrate and wherein the frame includes a recessed ledge along the opening in the frame with the edges of the substrate being supported by the recessed ledge.

118. A valve according to claim 117 further comprising:
a flexible gasket between the recessed ledge and the edges of the substrate.

119. A valve according to claim 118 wherein the edges of the substrate are secured to the flexible gasket and the recessed ledge with portions of the frame overlapping edges of the substrate opposite the recessed ledge.

120. A valve according to claim 117 wherein the edges of the substrate are secured to the recessed ledge using an adhesive.

121. A valve according to claim 110 further comprising:
a baffle on the frame and spaced apart from the substrate, the baffle having at least one opening therethrough.

122. A valve according to claim 121 wherein the valve member is between the substrate and the baffle.

123. A valve according to claim 121 wherein the baffle and the substrate define a baffle chamber therebetween wherein the opening through the baffle defines a width that is less than a width of the baffle chamber in a direction parallel with respect to a surface of the substrate.

124. A valve according to claim 121 wherein the baffle provides a restriction to fluid flow in series with the hole through the substrate.

125. A valve according to claim 121 wherein the baffle has a wedge shape.

126. A valve according to claim 125 further comprising:
first and second conductive leads on a first edge of the frame, the first and second conductive leads being electrically coupled to the respective input pads on the substrate, wherein a thin portion of the baffle is adjacent the first edge of the frame and wherein a wide portion of the baffle is adjacent a second edge of the frame opposite the first edge.

127. A valve according to claim 121 wherein the baffle, the frame and the substrate define an enclosure with the movable valve member being included in the enclosure.

128. A valve according to claim 121 further comprising:
a flexible gasket on the frame such that the frame is between the flexible gasket and the baffle.

129. A valve according to claim 110 wherein the frame comprises a rigid polymer material.

* * * * *

UNITED STATES PATENT AND TRADEMARK OFFICE
CERTIFICATE OF CORRECTION

PATENT NO. : 7,448,412 B2  Page 1 of 1
APPLICATION NO. : 11/188294
DATED : November 11, 2008
INVENTOR(S) : Teach et al.

It is certified that error appears in the above-identified patent and that said Letters Patent is hereby corrected as shown below:

On the Title Page:
Item [56], Other Publications, page 3:
"Lisec et al. "A Bistable Pneumatic Microswitch for Driving Fluidic Components" $8^{th}$ *International Conference on Solid-State Sensors* ans *Actuators, and Eurosensors IX* pp. 309-312 (1995)."
Please correct "ans Actuators" to read -- and Actuators --

In the Claims:
Column 47, Claim 59, Line 31: Please correct "A valve according to claim 5"
To read -- A valve according to claim 57 --

Signed and Sealed this

Tenth Day of March, 2009

JOHN DOLL
*Acting Director of the United States Patent and Trademark Office*